US006757323B1

(12) United States Patent
Fleming et al.

(10) Patent No.: US 6,757,323 B1
(45) Date of Patent: Jun. 29, 2004

(54) RAPID SIGNAL ACQUISITION BY SPREAD SPECTRUM TRANSCEIVERS

(76) Inventors: Robert Alan Fleming, 5950 Lucas Valley Rd., Nicasio, CA (US) 94946; Cherie Elaine Kushner, 5950 Lucas Valley Rd., Nicasio, CA (US) 94946

( * ) Notice: Subject to any disclaimer, the term of this patent is extended or adjusted under 35 U.S.C. 154(b) by 702 days.

(21) Appl. No.: 09/721,116

(22) Filed: Nov. 22, 2000

Related U.S. Application Data
(60) Provisional application No. 60/205,933, filed on May 16, 2000.

(51) Int. Cl.[7] .......................... H04B 15/00; H04K 1/00; H04L 27/30
(52) U.S. Cl. ....................................... 375/142; 375/150
(58) Field of Search ................................ 375/142, 130, 375/133, 134, 140, 141, 145, 147, 149, 150, 152; 370/330, 347

(56) References Cited

U.S. PATENT DOCUMENTS

| | | | | | |
|---|---|---|---|---|---|
| 5,509,027 | A | * | 4/1996 | Vook et al. .................. | 375/134 |
| 5,513,210 | A | * | 4/1996 | Vook et al. .................. | 375/133 |
| 5,515,366 | A | * | 5/1996 | Chieu et al. ................. | 370/347 |
| 6,002,708 | A | * | 12/1999 | Fleming et al. ............. | 375/130 |
| 6,366,599 | B1 | * | 4/2002 | Carlson et al. ............. | 375/130 |
| 6,519,460 | B1 | * | 2/2003 | Haartsen .................. | 455/452.1 |

OTHER PUBLICATIONS

Spread Spectrum Systems with Commerical Applications, Chapter 3 (Coding For Communications and Ranging, pp. 60–113), Robert C. Dixon, Wiley–Interscience, John Wiley & Sons, Inc. New York 1994.
An Introduction to Linear Recursive Sequences in Spread Spectrum Systems, Richard Schwarz, SIGTEK Inc., web published, prior to Jun. 1999.
An Introduction to Linear Recursive Sequences in Spread Spectrum Systems, Richard Schwarz, SIGTEK Inc., web published, revised Dec. 2001.
Crosscorrelation Properties of Pseudoreandom and Related Sequences, Proceedings of the IEEE, vol. 68, No. 5, pp. 593–619, Dilip V. Sarwate & Michael B. Pursley, May 1980.
Filtering in the Time and Frequency Domains, p. 366, Herman J. Blinchikoff & Anatol I Zverev, Robert E. Krieger Publishing Co., Malabar, Florida, prior to Dec. 1976.
Surface Acoustic Wave Devices and Their Signal Processing Applications, pp. 308–310, Colin Campbell, Academic Press, Inc. Boston, 1989.

* cited by examiner

*Primary Examiner*—Phoung Phu
(74) *Attorney, Agent, or Firm*—Intergral Patent Associates; Laurence J. Shaw

(57) ABSTRACT

Spread spectrum transceivers communicate using code sequences having low cross-correlations and well-peaked autocorrelations. The initial communications involve broadcasting a beacon signal consisting of a beacon packet repeated at regular intervals (the cycle time). The code sequences may be period-($2^n-1$) Small Kasami sequences; the beacon packet is a repeated series of ($2^{n/2}+1$) period-($2^{n/2}-1$) progenitor maximal sequences, and behaves like a member of the Kasami family. The acyclic autocorrelation of the beacon packet has regularly-spaced sharp peaks modulated by a pyramidal envelope. The initial communications involve calculating the correlation between the received signal and delayed versions of an internally-generated beacon packet. The length of the initial communications is proportional to the square of the cycle time divided by the width of the acyclic autocorrelation. Synchronization involves locating the peak of the pyramidal envelope, and has a length related to the cycle time times the number of peaks in the acyclic autocorrelation.

23 Claims, 19 Drawing Sheets

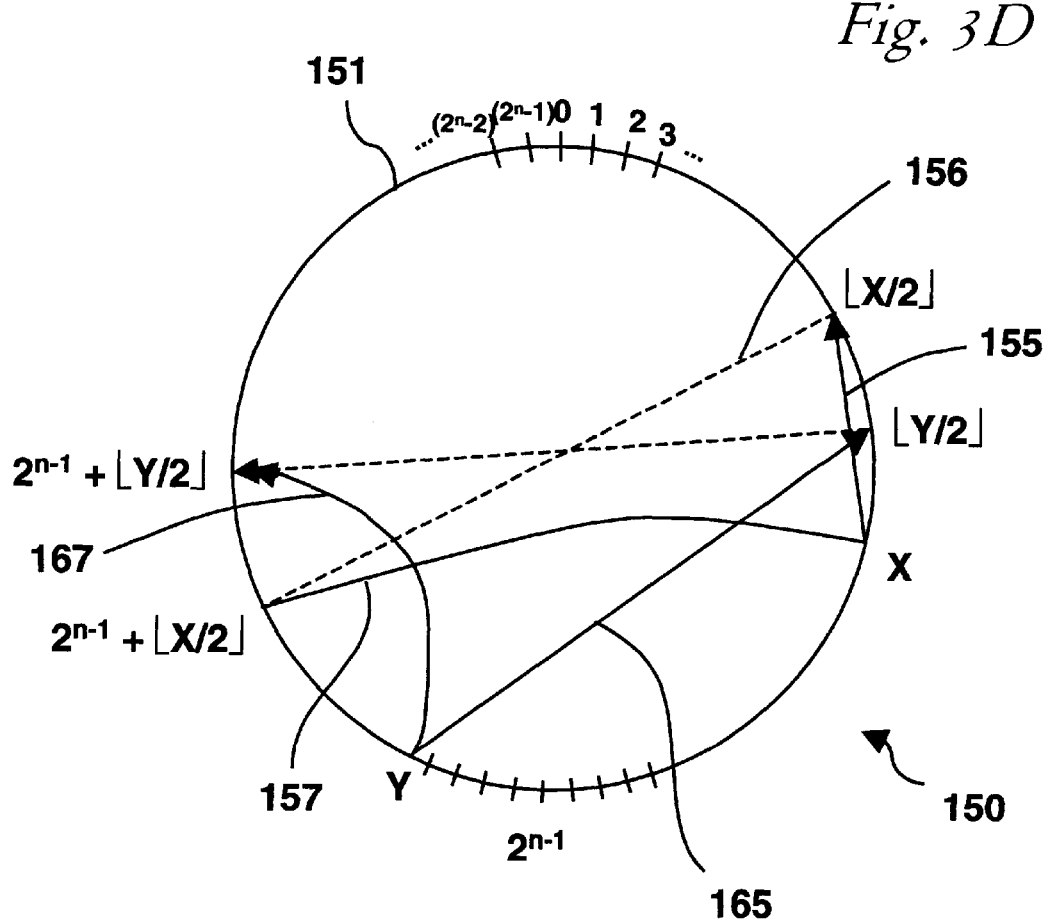

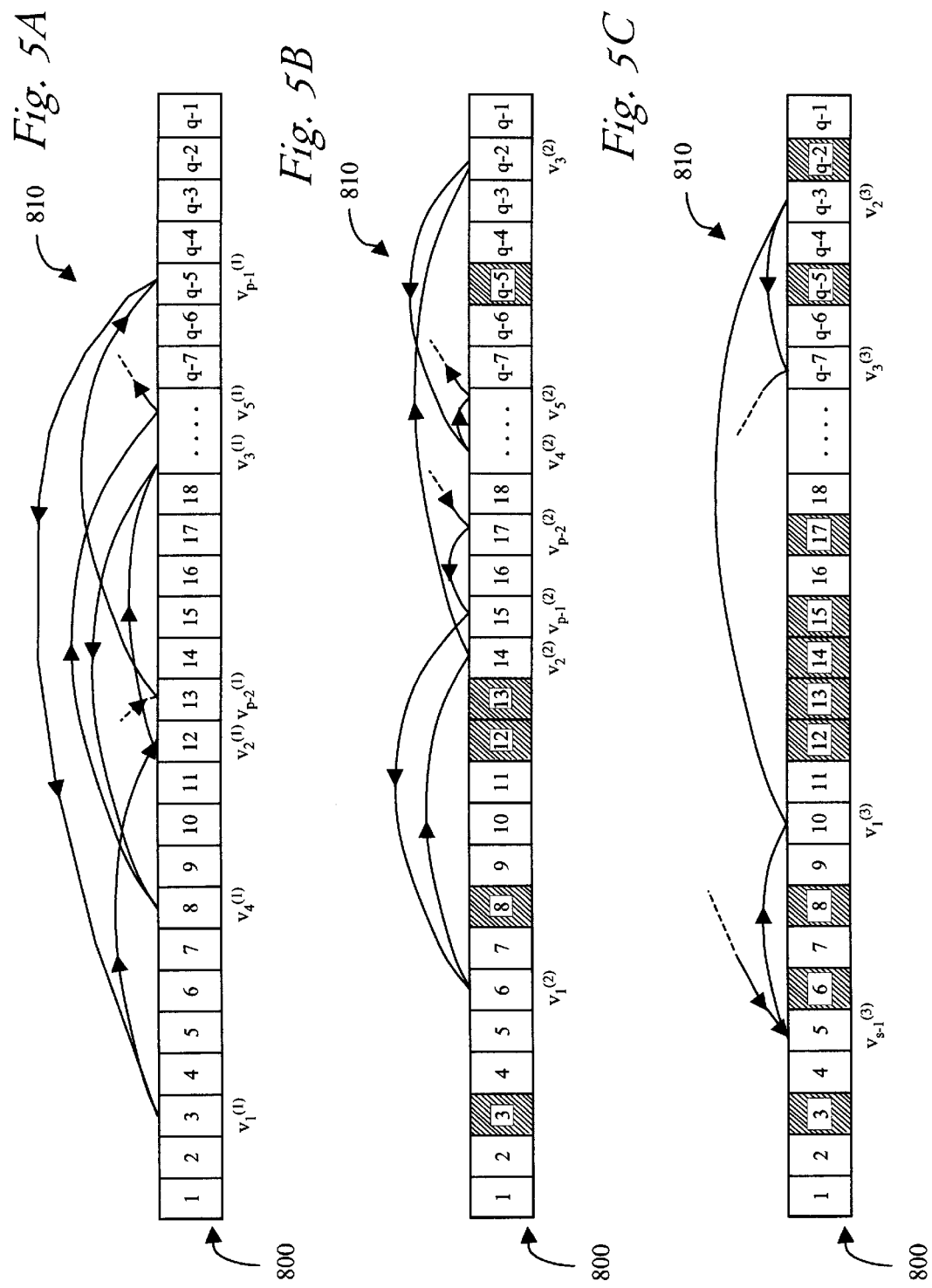

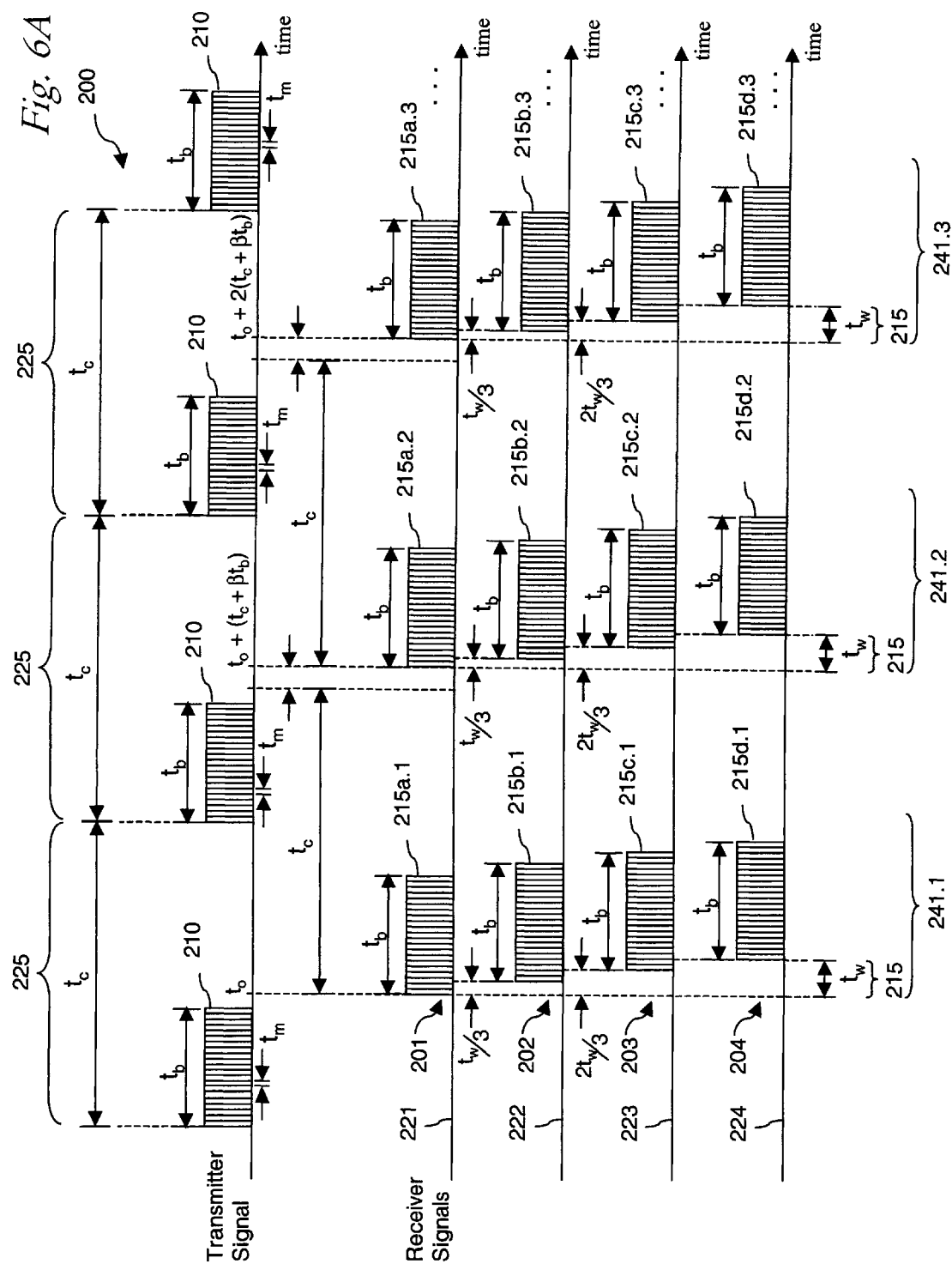

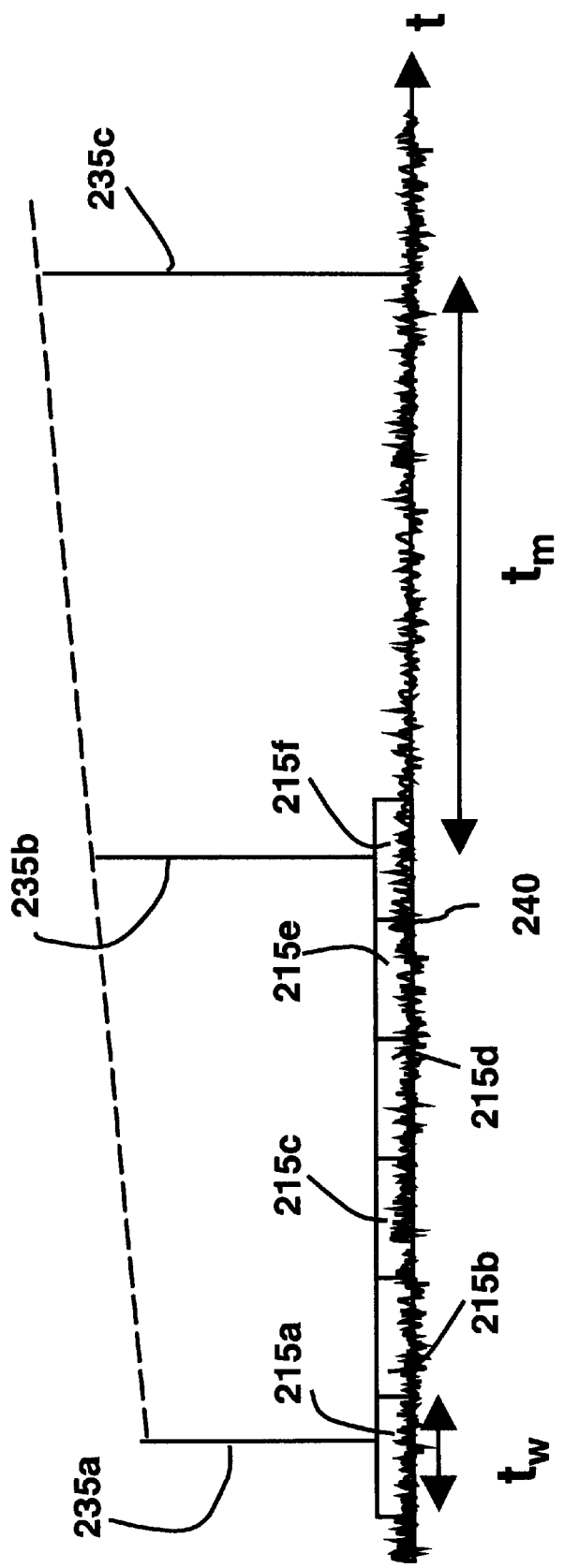

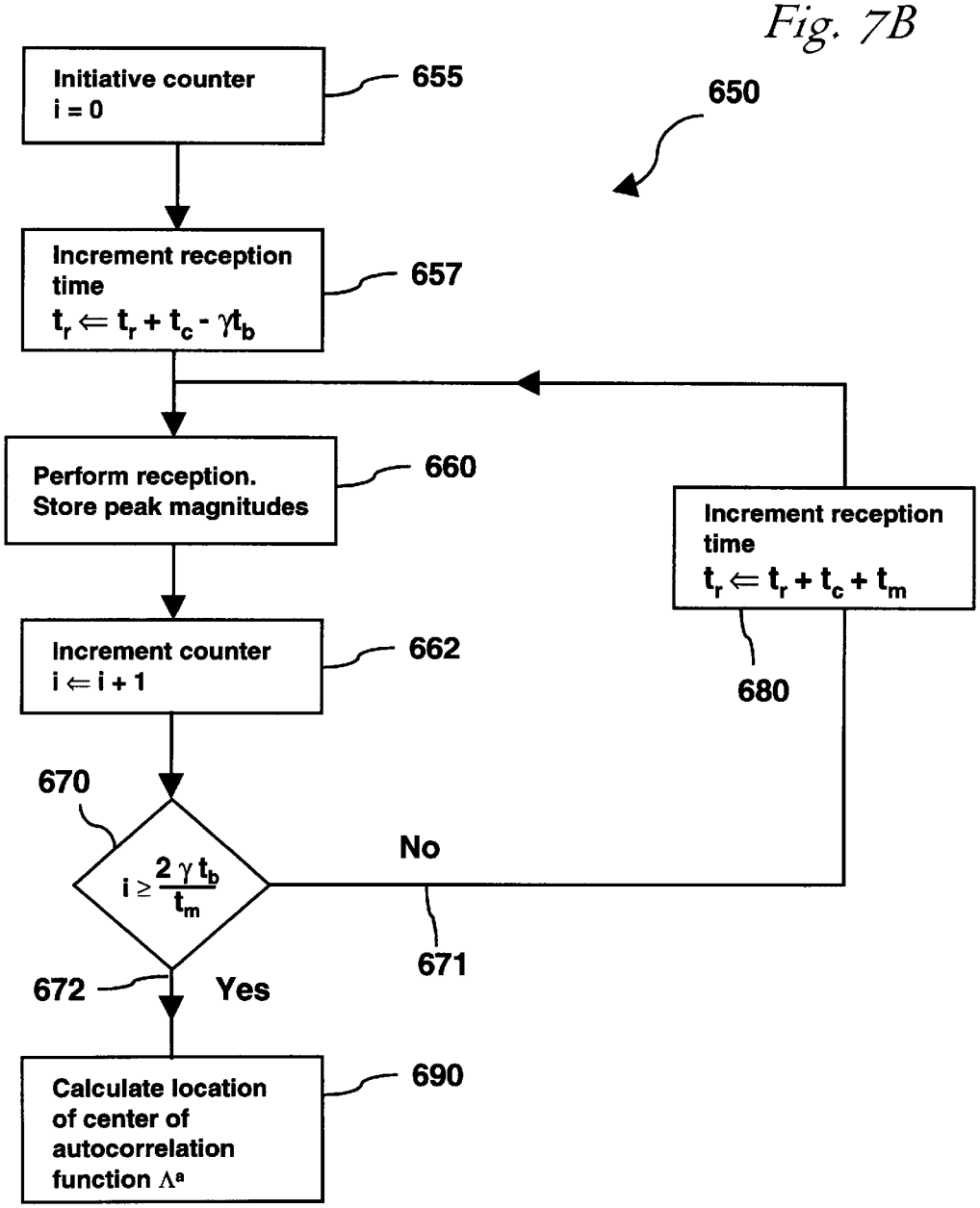

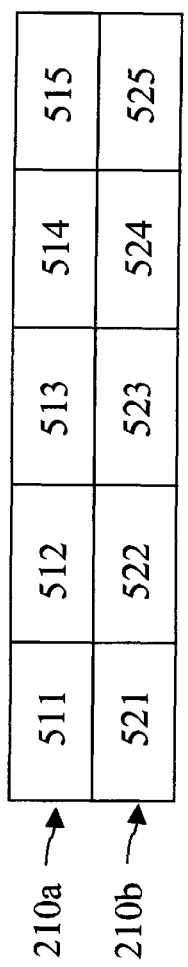
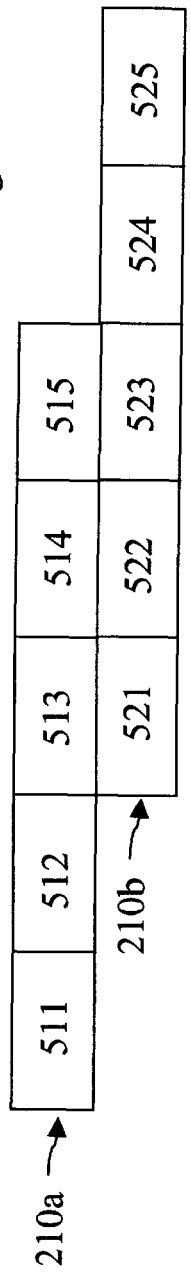
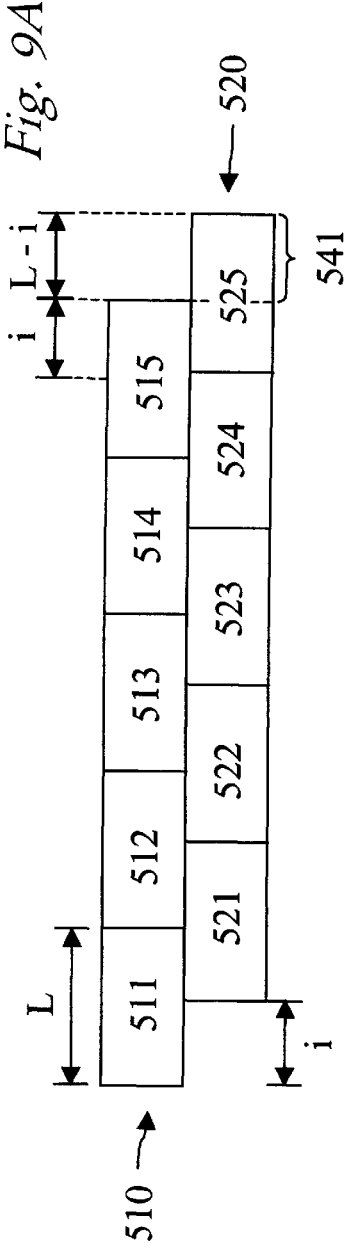
Fig. 8A
Fig. 8B
Fig. 9A

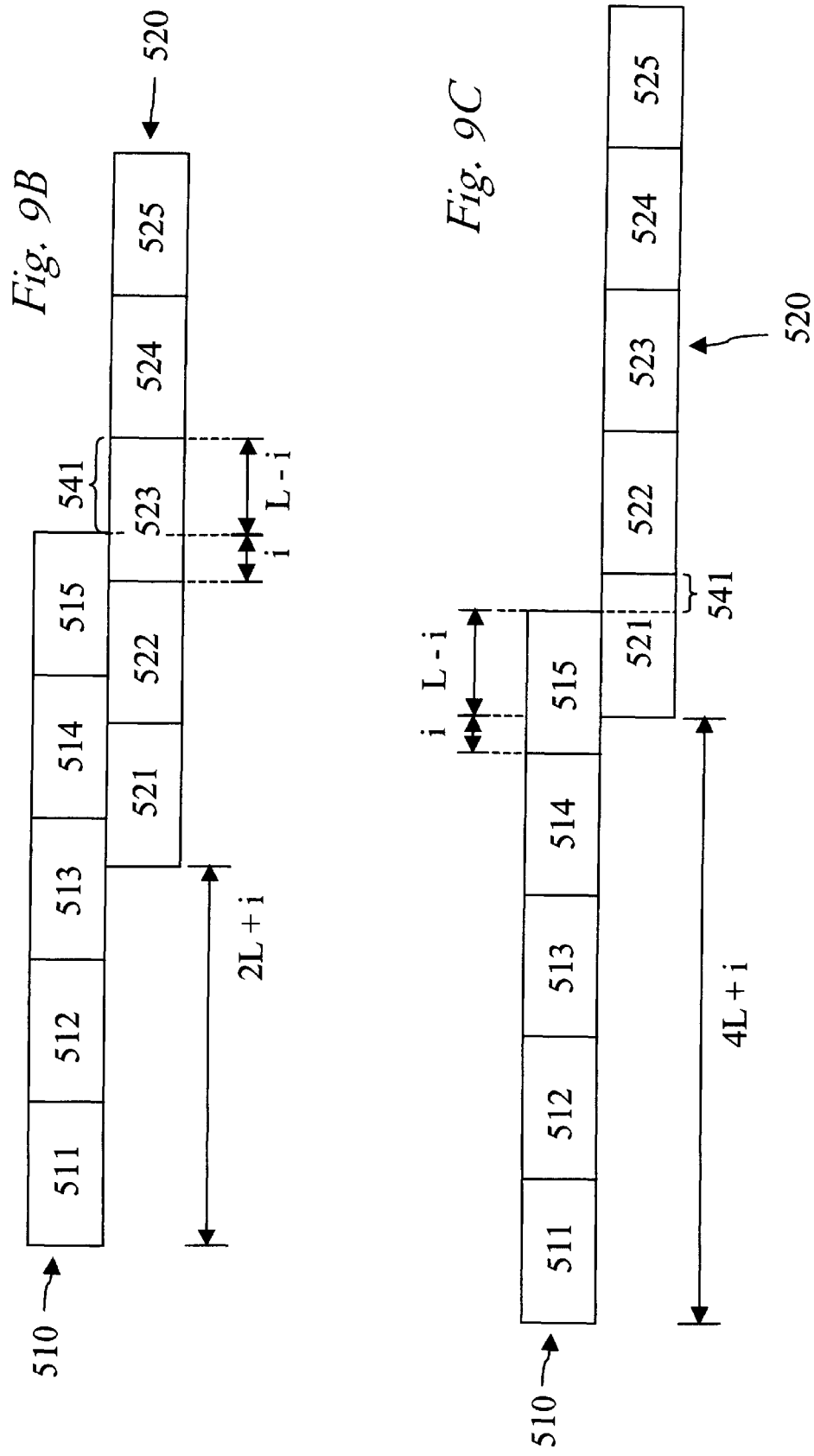

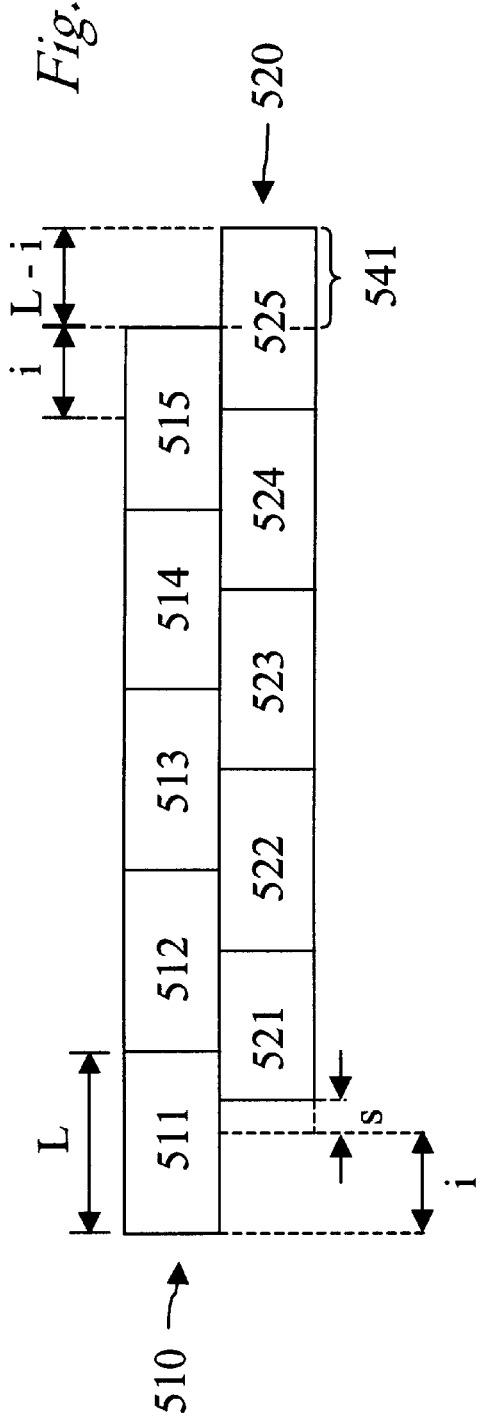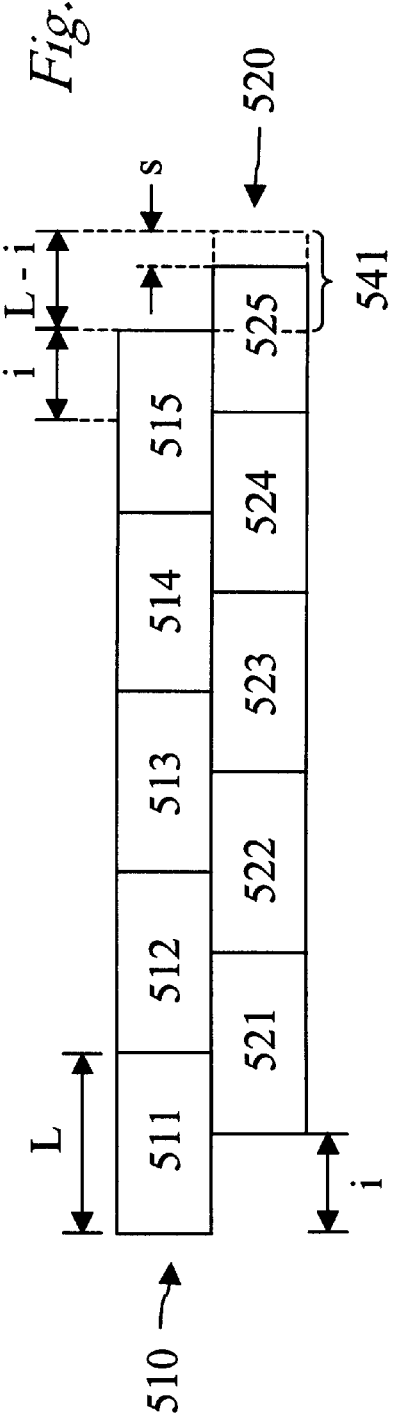

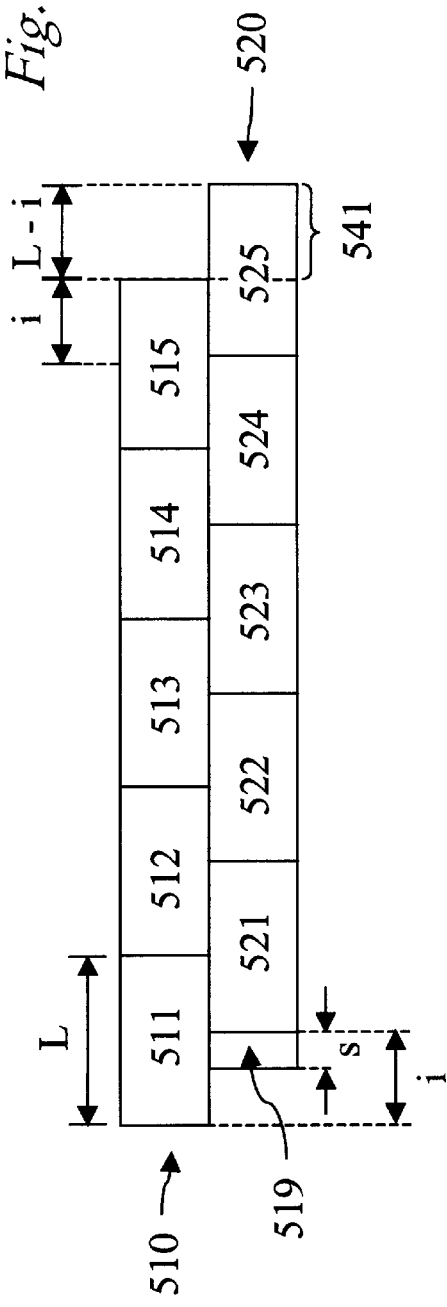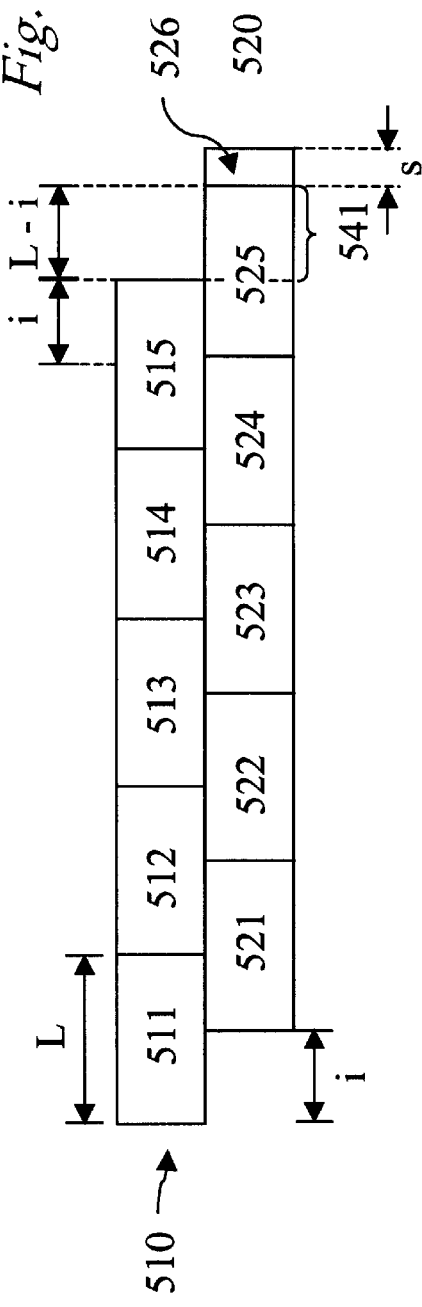

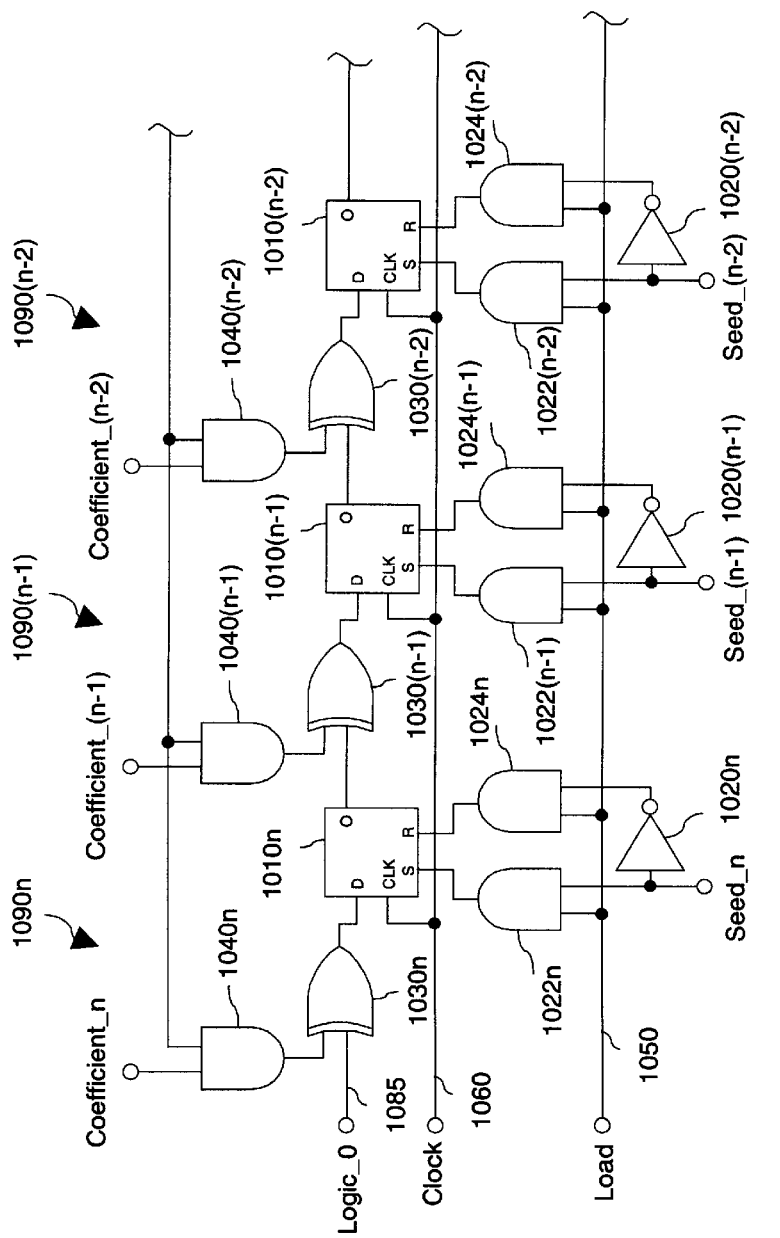
Fig. 10 (Left)

RAPID SIGNAL ACQUISITION BY SPREAD SPECTRUM TRANSCEIVERS

CROSS-REFERENCE TO RELATED APPLICATIONS

The present nonprovisional patent application is based on provisional patent application serial No. 60/205,933, filed May 16, 2000 by the same inventors, and having the same title as above.

FIELD OF THE INVENTION

The present invention is related generally to nonsinusoidal spread spectrum radio communication systems, and more particularly to signal acquisition by nonsinusoidal spread spectrum radio transceivers.

BACKGROUND OF THE INVENTION

In contrast with traditional sinusoidal-carrier radio communication systems where the transmitted electromagnetic power is concentrated in a narrow frequency band, in spread spectrum communication systems the power is distributed over a relatively large bandwidth. Spread spectrum radio communications are used in place of traditional systems to circumvent communications jamming by interference signals, prevent detection and interception by unwanted receivers so as to provide privacy, provide tolerance to multipath transmissions, send multiple independent signals over a frequency band, and/or provide accurate ranging information.

Nonsinusoidal spread spectrum (NSS) transmissions a(t) relevant to the present invention are of the form $$a(t)=\Psi(t)*d(t), \quad (1.1)$$

where t is time, d(t) is a data function with data values of positive and negative unity where the data values of the data function d(t) have a bit width $t_s$, and $\Psi(t)$ is a pseudorandom code sequence consisting of a repeated series of a pseudorandom code $\Phi(t)$ of length $t_s$, i.e., $$\Psi(t)=\Phi(t \bmod t_s), \quad (1.2)$$

where the pseudorandom code $\Phi(t)$ has a value of zero for t<0 and t>$t_s$. The data function d(t) changes value at integer multiples of $t_s$, and one bit of data from d(t) is therefore encoded on each repetition of the pseudorandom code $\Phi(t)$.

An exemplary NSS transmission a(t) based on a pseudorandom code $\Phi(t)$ having a length of seven bits is shown in FIG. 1A. The first five bits of the data function d(t) are (1, −1, 1, 1, −1, ... ) and the pseudorandom code $\Phi(t)$ consists of the bits (1, 1, 1, −1, 1, −1, −1). Therefore, as shown in FIG. 1A, the product of the data function d(t) and the pseudorandom code sequence $\Psi(t)$, which consists of bits (1, 1, 1, −1, 1, −1, −1, 1, 1, 1, −1, 1, −1, −1, ... ), is the transmission a(t) consisting of bits (1, 1, 1, −1, 1, −1, −1, −1, −1, −1, 1, −1, 1, 1, 1, 1, 1, −1, 1, −1, −1, 1, 1, 1, −1, 1, −1, ...).

The cross-correlation $\Lambda(t)$ between a first function A(t) and a second function B(t) is given by $$\Lambda_{A,B}(t)=\int_{-\infty}^{\infty}A(\tau-t)*B(\tau)d\tau. \quad (1.3)$$

When the first function A is the same as the second function B, the above equation provides the autocorrelation $\Lambda_A(t)$, i.e., $$\Lambda_A(t)=\int_{-\infty}^{\infty}A(\tau-t)*A(\tau)d\tau. \quad (1.4)$$

If the first function A(t) and the second function B(t) are both periodic with period T, then the cross-correlation $\Lambda_{A,B}(t)$ and the autocorrelation $\Lambda_A$ also are periodic with period T, i.e., $$\Lambda_{A,B}(t)=\Lambda_{A,B}(t \bmod T), \quad (1.5)$$

and $$\Lambda_A(t)=\Lambda_A(t \bmod T). \quad (1.6)$$

Therefore, if the first and second functions A(t) and B(t) have period T, the integration used to determine the correlation function may be performed over a time t of length T and then normalized, and the starting time for an integration over a time t of length T is immaterial.

If the functions A(t) and B(t) are actually bit sequences $\alpha(i)$ and $\beta(i)$ of length N bits, with each bit having a bit length of $\Delta t$, then $$\Lambda_{A,B}(n\Delta t)=\lambda_{\alpha\beta}(n)\Delta t, \quad (1.7)$$

where $\lambda_{\alpha\beta}$ is the discrete cross-correlation given by $$\lambda_{\alpha,\beta}(n) = \sum_{i=1}^{N} \alpha(i-n)*\beta(i), \quad (1.8)$$

where i and n are integers. Similarly, if the function A(t) is a bit sequence $\alpha(i)$ of length N, with each bit having a bit length of $\Delta t$, then $$\Lambda_A(n\Delta t)=\lambda_\alpha(n)\Delta t, \quad (1.9)$$

where $\lambda_\alpha$ is the discrete autocorrelation given by $$\lambda_\alpha(n) = \sum_{i=1}^{N} \alpha(i-n)*\alpha(i). \quad (1.10)$$

For example, consider the discrete autocorrelation $\lambda_\alpha$ for the five-bit sequence $\alpha=\{1, -1, -1, 1, -1\}$. For instance, the n=1 value of the discrete autocorrelation $\lambda_\alpha$ is calculated by $$\lambda_\alpha(1)=\alpha(0)\alpha(1)+\alpha(1)\alpha(2)+\alpha(2)\alpha(3)+\alpha(3)\alpha(4)+\alpha(4)\alpha(5)=-1-1+-1-1=-3. \quad (1.11)$$

As can be shown by similar such calculations, the discrete autocorrelation $\lambda_\alpha$ has values of 5, −3, 1, 1 and −3 for n equals 0, 1, 2, 3 and 4, respectively. As shown in FIG. 2, the continuous autocorrelation $\lambda_A$ for the corresponding function $A(t)$ is easily generated from the discrete autocorrelation $\lambda_\alpha$ by connecting autocorrelation values at integer multiples of $\Delta t$ by straight lines. It should also be noted that the continuous autocorrelation $\Lambda_A$ is symmetric about t=0, and, of course, periodic with a period of T=5$\Delta t$.

A fundamental class of binary sequences which have useful autocorrelation properties is the maximal sequence class. Any maximal sequence may be generated by a linear feedback shift register (LFSR). (It is important to note that the binary bit values of unity and negative unity, which will be used in the present specification when discussing correlations and autocorrelations, may be directly translated to the binary bit values of zero and unity, which will be used in the present specification when discussing the operation of LFSR's and generating polynomials.) The exemplary LFSR 100 shown in FIG. 3A is a five-stage shift register consisting, from right to left, of five flip-flops 101, 102, 103, 104, and 105. (In the present specification the convention will be that for LFSRs with an output on the right, the rightmost flip-flop will be referred to as the first flip-flop, the second-from-the-right flip-flop will be referred to as the second flip-flop, etc. For instance, the leftmost flip-flop 105 will be referred to as the fifth flip-flop 105.) On each clock pulse, the bit value held in each of the four leftmost flip-flops 102, 103, 104 and 105 of the LFSR 100 is shifted one flip-flop to the right. (A clock and its connections within the LFSR 100 are not shown in FIG. 3A.) Therefore, on a clock pulse the bit value in the fifth flip-flop 105 is shifted into the fourth flip-flop 104, the bit value in the fourth flip-flop 104 is shifted into the third flip-flop 103, etc. The output 111 of the LFSR 100 is produced by the first flip-flop 101. The input value to the fifth flip-flop 105 of the LFSR 100 is provided by a feedback loop 110 which, in the case of this particular LFSR 100, consists of an XOR adder 121 which taps the output 113 of the third flip-flop 103, as well as the output 111 of the first flip-flop 101. (Although the exemplary LFSR 100 of FIG. 3A has only a single XOR adder 121 in the feedback loop 110, it should be understood that, in general, an LFSR may direct taps from the outputs of any of its flip-flops to additional XOR adders in the feedback loop.) The XOR addition, which is typically notated as '⊕', of two binary value inputs is equal to unity when one, and only one, of the binary value inputs is unity, and is zero otherwise, i.e., 0⊕0=0; 0⊕1=1; 1⊕1=1; and 1⊕1=0. This type of flip-flop configuration, with taps from the outputs of some or all of the flip-flops to XORs in a feedback loop (the output of the first flip-flop is necessarily directed to the feedback loop), which is summed and directed to the leftmost flip-flop, is known as a Fibonacci construction LFSR.

For instance, if 'seed' values of {0, 0, 1, 1, 1} are placed in the flip-flops 105, 104, 103, 102 and 101, respectively, then on the next clock pulse the fourth, third, second and first flip-flops 104, 103, 102 and 101 receive the bit values of 0, 0, 1, 1, respectively. The XOR 121 receives the outputs of the first and third flip-flops 101 and 103, and therefore produces an output of zero which is sent to the fifth flip-flop 105. Therefore, the new state of the LFSR is {0, 0, 0, 1, 1}. Similarly, on the next clock pulse the fourth, third, second and first flip-flops 104, 103, 102 and 101 receive the bit values of 0, 0, 0, 1, respectively. The XOR 121 receives the outputs of the first and third flip-flops 101 and 103, and therefore produces an output of unity which is sent to the fifth flip-flop 105. Therefore, the new state of the LFSR is {1, 0, 0, 0, 1}. As can be seen from Table 1, which provides a list of the first ten states and outputs produced by the seed of {0, 0, 1, 1, 1}, the output values from this seed are (1, 1, 1, 0, 0, 0, 1, 1, 0, 1, . . . ).

TABLE 1

States and output values from the Fibonacci LFSR of FIG. 3A.

| State | Output |
|---|---|
| 00111 | 1 |
| 00011 | 1 |
| 10001 | 1 |
| 11000 | 0 |
| 01100 | 0 |
| 10110 | 0 |

TABLE 1-continued

States and output values from the Fibonacci LFSR of FIG. 3A.

| State | Output |
|---|---|
| 11011 | 1 |
| 11101 | 1 |
| 01110 | 0 |
| 10111 | 1 |
| . | . |
| . | . |
| . | . |

Transitions between states of an LFSR may be represented as arrows in a state transition diagram, where the states of the LFSR may be depicted on a linear or a circular axis. A state transition diagram 150 for an n-stage LFSR is shown in FIG. 3D on a circular axis 151 where the state ($2^n-1$) is located adjacent to state 0. For a Fibonacci LFSR in state X, there are only two possibilities for the next state. Either (a) a zero can be output from the LFSR and put into the most significant bit, in which case the state becomes $\lfloor X/2 \rfloor$, or (b) a one can be output from the LFSR and put into the most significant bit, in which case the state becomes ($2^{n-1}+\lfloor X/2 \rfloor$), where the partial brackets "⌊ ⌋" indicate that the greatest integer less than or equal to the value inside the partial brackets is taken. The transition from state X to state $\lfloor X/2 \rfloor$ is represented by an arrow 155 which begins at X and ends approximately halfway between X and 0. The transition from state X to state ($2^{n-1}+\lfloor X/2 \rfloor$) is represented by an arced arrow 157 which begins at X and ends diametrically opposite state $\lfloor X/2 \rfloor$, ie., the end of the arced arrow 157 is located where arrow 155 sums with arrow 156 which spans the diameter of the circular axis 151. Similarly, the transition from state Y, which has a value somewhat greater than $2^{n-1}$, to state $\lfloor Y/2 \rfloor$ is represented by an arrow 165 beginning at Y and ending approximately halfway between Y and 0, and the transition from state Y to state ($2^{n-1}+\lfloor Y/2 \rfloor$) is represented by an arced arrow 167 which begins at Y and ends diametrically opposite state $\lfloor Y/2 \rfloor$.

A mirror image version 110' of the LFSR 100 of FIG. 3A, is shown in FIG. 3B. Although it may seem trivial that the mirror image LFSR 100' functions in exactly the same way as the LFSR 100 of FIG. 3A, due to frequent confusions found in the literature it is important to point out that the "most significant bit" is held in the leftmost flip-flop 105 of the LFSR 100 of FIG. 3A, while the "most significant bit" in the mirror-image LFSR 100' of FIG. 3B is in the rightmost flip-flop 105.

A different type of construction for a five-stage shift register 200 is shown in FIG. 3C. As shown in FIG. 3C, the output 201 from the first flip-flop 201, i.e., the rightmost flip-flop 201, is fed via lead 223 to an XOR adder 233 located between the fourth flip-flop 204 and the third flip-flop 203. The XOR adder 233 also receives the output 214a of the fourth flip-flop 204, and the output 214b of the XOR 233 is directed to the third flip-flop 203. This type of construction, where one or more XOR adders are located in the signal path between the series of flip-flops is known as a Galois construction LFSR. (Again we point out, motivated by confusions found in the literature, that a mirror-image version of the Galois LFSR 200 of FIG. 3C functions exactly as the LFSR 200 of FIG. 3C. Furthermore, the most significant bit is held in the leftmost flip-flop 205 of the LFSR 200 of FIG. 3C, and in the mirror-image version the most significant bit would be held in the rightmost flip-flop.)

Galois construction LFSRs have the advantage of being faster than Fibonacci construction, because the computations required for a Fibonacci construction LFSR will generally have to propagate through more levels of logic, and may therefore require a longer clock cycle. It may be shown that any Fibonacci construction LFSR may be mapped to a Galois construction LFSR which can generate the same sequence of output values. This mapping between Fibonacci and Galois constructions is accomplished by reversal of the ordering of the taps/feeds. For instance, the Galois construction LFSR 200 of FIG. 3C is equivalent to the Fibonacci construction LFSR 100 of FIG. 3A, since the Galois construction LFSR 200 is five flip-flops in length and has a feed to an XOR 233 between the fourth flip-flop 204 and the third flip-flop 203, and the Fibonacci construction LFSR 100 is five flip-flops in length and has a feed to an XOR 121 between the third flip-flop 102 and the second flip-flop 103. Therefore, in general, a Fibonacci LFSR of n flip-flops with m taps from the inputs to the $t_1, t_2, \ldots, t_m$ flip-flops is equivalent to a Galois LFSR of n flip-flops with m feeds to XOR adders following the $(n-t_1), (n-t_2), \ldots, (n-t_m)$ flip-flops.

The equivalence of the LFSRs 100 and 200 of FIGS. 3A and 3C can be verified by noting that both LFSRs 100 and 200 produce the same periodic output. For instance, if flip-flops 205, 204, 203, 202 and 201 of FIG. 3B have the seed values $\{1, 1, 1, 1, 1\}$, respectively, then on the first clock pulse the output 201 of the LFSR 210 is unity, and this value of unity is deposited in the fifth flip-flop 205. Similarly, the fourth, second and first flip-flops 204, 202 and 201 receive the values of unity from the fifth, third and second flip-flops 205, 203 and 202, respectively. The XOR 233 receives the value of unity from the fourth flip-flop 204 and the value of unity from the first flip-flop 201, and so the XOR 233 feeds a value of zero to the third flip-flop 203. Therefore, the new state of the flip-flops 201–205 is $\{1, 1, 0, 1, 1\}$. By the same process described above it is easily verified that the next set of values in the LFSR 200 is $\{1, 1, 0, 0, 1\}$. Table 2 below provides a list of the first ten states of the LFSR 200, showing that both LFSRs 110 and 210 do indeed have the same output values. As can be seen from Table 1, which provides a list of the first ten states and outputs produced by the seed of $\{0, 0, 1, 1, 1\}$, the output values from this seed match the series of output values from listed in Table 1 above.

TABLE 2

States and output values from the Galois LFSR of FIG. 3C.

| State | Output |
|---|---|
| 11111 | 1 |
| 11011 | 1 |
| 11001 | 1 |
| 11000 | 0 |
| 01100 | 0 |
| 00110 | 0 |
| 00011 | 1 |
| 10101 | 1 |
| 11110 | 0 |
| 01111 | 1 |
| . | . |
| . | . |
| . | . |

For certain feedback configurations of Galois or Fibonacci LFSRs, which are termed optimal configurations, the states of the flip-flops of an LFSR cycle through all possible combinations, except the zero state, i.e., $\{0, 0, 0, \ldots, 0\}$. The zero state cannot be included in the sequence of states, because upon the next clock pulse the LFSR remains in the zero state, so all outputs of the LFSR are zero, and the output sequence as well as the sequence of states of the flip-flops have a period of unity. Therefore, for an optimal configuration LFSR of n flip-flops, the output has a period N of $2^{n}-1$ which consists of $2^{n/2}-1$ values of zero and $2^{n/2}$ values of unity. Such an output is termed a maximal sequence. The LFSRs 100 and 100' of FIGS. 3A and 3B are examples of optimal configurations.

Just as Fibonacci-configuration LFSRs can be mapped to Galois-configuration LFSRs and vice versa, it may be shown that each LFSR which generates a maximal sequence can be mapped to a Galois field of order $2^n$. Elements of the Galois field of order $2^n$ are n-tuples of binary digits which can also be represented as polynomials of degree (n-1) with all coefficients being either zero or unity. For instance, the element (1, 0, 0, 1, 1) corresponds to the polynomial $$1 \cdot x^4 + 0 \cdot x^3 + 0 \cdot x^2 + 1 \cdot x^1 + 1 \cdot x^0 = x^4 + x + 1. \quad (2.1)$$

Multiplication in the Galois field is defined as a multiplication of the corresponding polynomials (with coefficients obeying modulo 2 arithmetic) from which the remainder is taken modulo an irreducible polynomial, i.e., a polynomial with no polynomial factors, of degree n. (See, for example, chapter 25 of *Number Theory in Science and Communication, Second Edition*, M. R. Schroeder, Springer-Verlag, Berlin, 1986.) Using this definition of multiplication, the elements of the Galois field are generated by a primitive element ζ. That is, the elements of the Galois field are $$0, \zeta^1, \zeta^2, \zeta^3, \ldots \zeta^{q(n)-2}, \zeta^{q(n)-1}, \quad (2.2)$$

where $q(n)=2^n$. If the irreducible polynomial used to define the multiplication operation is written as $$h(x)=h_0x^n+h_1x^{n-1}+\ldots+h_{n-1}x+h_n, \quad (2.3)$$

where $h^0=h_n=1$, then it can be shown that the most significant bits of the sequence of fields $\zeta^1, \zeta^2, \zeta^3, \ldots \zeta^{q(n)-2}, \zeta^{q(n)-1}$ is a maximal sequence $(u_1, u_2, u_3, \ldots u_{q(n)-1})$ given by $$u_j = h_1 u_{j-1} \oplus h_2 u_{j-2} \oplus \ldots, \oplus h_{n-1} u_{j-n+1} \oplus h_n u_{j-n}. \quad (2.4)$$

By comparing this functional form to the exemplary Fibonacci LFSR 100 of FIG. 3A it can be seen that this is equivalent to the sequence generated by the LFSR 100 when $h_i=1$ if the $i^{th}$ cell from the left has its output fed back to the input 105 of the LFSR 100, and $h_i=0$ if the $i^{th}$ cell from the left does not have its output fed back to the input 105 of the LFSR 100. In the case of the LFSR 100 of FIG. 3A, equation (2.4) becomes $$u_j = u_{j-3} \oplus u_{j-5}, \quad (2.5)$$

and the fifth-order polynomial corresponding to equation (2.5) is $$h(x)=1 \cdot x^5 + 0 \cdot x^4 + 0 \cdot x^3 + 1 \cdot x^2 + 0 \cdot x^1 + 1 = x^5 + x^2 + 1. \quad (2.6)$$

The polynomial of equation (2.6) may be written as (1, 0, 0, 1, 0 1), or, even more conveniently, in octal notation as (45o). (It should be noted that although the five-bit LFSR 100 corresponds to a fifth-order polynomial, the octal representation of the polynomial consists of six bits. Therefore, in this case, according to the terminology of the present specification, the five-bit LFSR 100 has a six-bit octal representation.) According to an analogous notation, the locations of feeds for the Galois LFSR 200 of FIG. 3C is written as (1, 0, 1, 0, 0, 1), or $(51)_o$, where the subscript 'O' indicates an octal number. A primitive polynomial is a polynomial of the form of equation (2.3) that generates a maximal sequence.

A list of all maximal sequences generated by two-bit through sixteen-bit shift registers (i.e., three-bit through seventeen-bit octal representations) is provided as a microfiched appendix to the present specification. The polynomials for the maximal sequences provided in octal Galois form are followed by an "og", and the polynomials for the maximal sequences provided in octal Fibonacci form are followed by an "of". For instance, a maximal sequence for a four-bit Galois-configuration shift register can be produced by the $(31)_o$ polynomial or the $(23)_o$ polynomial. As may be verified by inspection of the primitive polynomials provided in the microfiched appendix to the present specification., the number of configurations which produce maximal sequences for an n-bit shift register is given by $$\phi(2^n-1)/n \quad (2.7)$$

where $\phi(i)$ is Euler's totient function which has a value equal to the number of integers which are less than i and have no common divisors with i. For instance, if n=4, then $(2^n-1)=15$, and there are eight integers, namely 1, 2, 4, 6, 7, 8, 11, and 13, which have no common divisors with 15. Therefore, as the microfiched appendix confirms, there are only two (Fibonacci or Galois) polynomials which generate maximal sequences for four-bit LFSRs. Pages 53–54 of the present specification provides C-language programming code for generating the set of all maximal sequences for an n-bit shift register.

The sequences generated by LFSRs are cyclic, i.e., if $\{u_1, u_2, \ldots, u_N\}$ is a sequence generated by equation (2.3), then $\{u_{mod(N, 1+i)}, u_{mod(N, 2+i)}, \ldots, u_{mod(N, N+i)}\}$ is also a sequence generated by equation (2.3) for any integer i. Therefore, the starting point of a sequence is arbitrary. The sequence $\{u_{mod(N, 1+i)}, u_{mod(N, 2+i)}, \ldots, u_{mod(N, N+i)}\}$ is a phase shift of magnitude i of the sequence $\{u_1, u_2, \ldots, u_N\}$, and this is written as $$\{u_{mod(N, 1+i)}, u_{mod(N, 2+i)}, \ldots, u_{mod(N, N+i)}\} = P^i\{u_1, u_2, \ldots, u_N\}, \quad (2.8)$$

where P is the phase shift operator.

Generally, families of pseudorandom code sequences which have low cross-correlations and sharply peaked autocorrelations are used in NSS communications. Using these types of code sequences, reception of an NSS transmission a(t) is accomplished by circuitry which calculates the correlation between the received signal a(t) and the expected pseudorandom code sequence $\Phi(t)$. To receive the transmission a(t), the transmitted pseudorandom code sequence and the time of its arrival must be known or determined by the receiver. When a receiver calculates the correlation between an incoming signal and an internally-generated signal consisting of the same code sequence and beginning at the time of arrival of the incoming signal, the relatively large value of the calculated correlation indicates that a transmission was indeed received. With low cross-correlations, the communications between one pair of transceivers using one pseudorandom sequence will not interfere with the communications of other transceivers in the vicinity which are using other pseudorandom code sequences.

A maximal sequence has the useful property that its autocorrelation is very sharply peaked. For zero phase shift, the discrete autocorrelation of a maximal sequence has a value of $2^n-1$, and for all other (bit length) phase shifts the discrete autocorrelation has a value of −1. However, the cross-correlation properties of maximal sequences are poor, i.e., the cross-correlation values are not small. (See "Cross-correlation Properties of Pseudorandom and Related Sequences," Dilip V. Sarwate & Michael B. Pursley, Proceedings of the IEEE, Vol. 68, No. 5, May 1980, page. 602, column 1.)

Many types of spread spectrum systems have transceivers which transmit continuous signals and also continually receive incoming signals. In contrast, as specified in detail in U.S. Pat. No. 6,002,708 for Spread Spectrum Localizers, which is incorporated herein by reference, according to the present invention the transmissions of the transceivers are episodic, i.e., not continuous. (According to the terminology of the present specification, an "episodic" transmission may be periodic, i.e., it may consist of one or more transmissions within a period, as long as there are intervals of non-transmission between the transmissions.) According to the present invention, the reception of an episodic transmission a(t) consists of a sequence of operations including: (i) a sequence generator produces an internally-generated integration sequence $\alpha_i(t)$ which resembles the expected pseudorandom sequence $\alpha_e(t)$ of the received signal a(t); (ii) a set of event registers is armed to trigger reception processing circuitry bracketing a finite time interval during which a reception is expected to occur; (iii) during the reception event the received signal a(t) is multiplied by internally-generated integration sequences $\alpha_i(t)$ which are delayed by a number of different time offsets; and (iv) the correlations of the delayed internally-generated integration sequences $\alpha_i(t)$ and the received signal a(t) are calculated and analyzed. As specified in detail in U.S. Pat. No. 6,002,708, the correlations are calculated using a time-integrating correlator circuit. Although the time-integrating correlator output resembles a time sampling of the correlation $\Lambda_{\alpha_i,a}(t)$ between the internally-generated integration sequence $\alpha_i(t)$ and the received signal a(t), it should be noted that the correlation as a function of time is never actually determined by the time-integrating correlator circuit, and therefore it cannot be sampled. The time-integrating correlation circuit only determines values of discrete correlation function $\lambda_{\alpha_i,a}(n)$ at a number of discrete times, which are referred to as the time bins. If the time bins are separated by an interval of $t_s$ seconds, the time-integrating correlator circuit has M integrators, and each time bin has a length of $t_x$ seconds, then the length of the time window during which the time-integrating correlator can detect a signal during a reception event is $[(M-1)*t_s+t_x]$.

However, before a pair of transceivers can begin communications, both transceivers must first determine that the other transceiver is broadcasting from within a distance where reception is possible. The transmissions and attempted receptions that occur up until either of the transceivers actually receives a signal from the other is termed the contact stage of the acquisition process. Once the two transceivers have determined that there is another transceiver in the vicinity, then the two transceivers enter the synchronization stage of the acquisition process where they must synchronize their transmission/reception schedules and arrange any other protocols required for continued communications. Two transceivers involved in the acquisition process are referred to as the acquiring transceivers. Furthermore, transceivers which are not involved in the acquisition process are referred to as nonacquiring transceivers.

An exemplary group of transceivers 30A, 30B, 30C, 30D, 30E, 30F and 30G in various levels of communication is shown in FIG. 1B. Transceivers 30A, 30B, 30C and 30D have already completed the acquisition stage with each of the other transceivers 30A, 30B, 30C and 30D within that group, and are involved in two-way communications 40AB, 40AC, 40AD, 40BC, 40BD, 40CD with each other. (The bi-directionality of the communications 40AB, 40AC, 40AD, 40BC, 40BD, 40CD is illustrated by the arrows at each end of the line segments.) Transceivers 30D and 30E are involved in a two-way communication 40DE with each other, but transceiver 30E is not in communication with any of the other transceivers 30A, 30B, 30C, 30D, 30F and 30G. If transceiver 30E is to begin communications with the other transceivers 30A, 30B, 30C which transceiver 30D is in communication with, synchronization information regarding the other transceivers 30A, 30B, 30C may be communicated to transceiver 30E via communications with transceiver 30D. Alternatively, synchronization of transceiver 30E with any of the other transceivers 30A, 30B, 30C, 30D, 30F and 30G may be accomplished by an acquisition process where transceiver 30E locates a beacon signal broadcast by the other transceivers 30A, 30B, 30C, 30D, 30F and 30G, or vice versa. Transceivers 30C and 30G are involved in a one-way communication 40CG with each other where transceiver 30G has located the beacon signal of transceiver 30C, but transceiver 30C has not located the beacon signal of transceiver 30G and so transceiver 30C is not yet aware of the existence of transceiver 30G. Transceiver 30G may possibly be involved in more accurately determining the schedule of beacon transmissions from transceiver 30C, or may have already completed that process. Since transceiver 30G has located the beacon signal of transceiver 30C, transceiver 30G has timing information regarding transceiver 30C, and to complete the acquisition process transceiver 30G can broadcast a beacon signal when transceiver 30C will be attempting to receive beacon signals. Transceiver 30F is not in communication with any other transceivers 30A, 30B, 30C, 30D, 30E and 30G in the group. However, transceiver 30F is broadcasting beacon signals and attempting to receive beacon signals. Furthermore, all the transceivers 30A, 30B, 30C, 30D, 30E, 30F and 30G (which will generically be assigned the reference numeral 30) have recurrent periods of time during which they listen for beacon signals to determine if transceivers 30 which they are not currently in contact with have come into communication range. It may be physically impossible, due to the finite transmission power of the transceivers 30, for all transceivers 30 to be in direct contact with each other. However, information may be passed from transceivers 30 to transceiver 30, so that transceivers 30 which are beyond the range of direct communications may communicate indirectly.

Typically, beacon signals within a prearranged family of codes are used for acquisition. However, according to the preferred embodiment of the present invention, a single prearranged beacon sequence is used for acquisition. As an example of a system that does not provide the advantages of the present invention, consider the acquisition process for a transmitter which is broadcasting a beacon signal 300 which consists of beacon packets 310 of length $t_b$ seconds once every $t_c$ seconds, as is shown in FIG. 4A, where each beacon packet 310 is a maximal sequence. If the maximal sequences 310 each have a bit length of N then, as shown in FIG. 4B, the central peak 350 of the autocorrelation function $\Lambda_\alpha$345 for these beacon packets 310 has a magnitude of N and a width of roughly $t_b/N$, and in the regions 360 outside the peak 350 the value of the autocorrelation function $\Lambda_\alpha$345 is considerably smaller than the peak value N. (As is shown in FIG. 4B and discussed in more detail below in conjunction with FIGS. 9A–9C, because of the random nature of the bit values in a maximal sequence, the average magnitude of the sidelobes 360 of the autocorrelation function $\Lambda_\alpha$345 of the finite-length beacon packet typically reaches a maximum near the midpoint of the sidelobes 360. Roughly, the sidelobes 360 have an average magnitude of $\sqrt{N}$ at time $t=t_b/2$. It should be noted that, for large values of N, the magnitudes of the values in the sidelobes is exaggerated relative to the magnitude of the peak in FIG. 4B.)

The reception procedure for an exemplary receiver is depicted in FIG. 4A. (For convenience of depiction only four reception bins are depicted in FIG. 4A. However, receivers will typically use more than four reception bins per reception time window.) The internally-generated code sequences 315a.1, 315a.2 and 315a.3 for the first time bin for three reception events 341, 342 and 343 are depicted on a first reception time axis 321, the internally-generated code sequences 315b.1, 315b.2 and 315b.3 for the second time bin for the three reception events 341, 342 and 343 are depicted on a second reception time axis 322, and so on. In the first reception event 341 beginning at time $t_0$ the receiver generates a first internally-generated code sequence 315a.1 of length $t_b$, i.e., the length of the anticipated beacon packet 310. The received signal, i.e., the signal 300 broadcast by the transmitter, is multiplied with the internally-generated code sequence 315a.1 and integrated over time. In this case since there is no beacon packet 310 arriving at the receiver beginning at time $t_0$, so the result of the multiplication and integration produces a relatively small value, which is only non-zero due to received noise. The receiver will therefore determine that a beacon packet 310 is not arriving at the receiver beginning at that time. Also, during the first reception event 341 the receiver generates a second internally-generated code sequence 315b.1 of length $t_b$ beginning at time $[t_0+(t_w/3)]$. The received signal 300 is multiplied with the internally-generated code sequence 315b.1 and integrated over time. Again, the receiver will determine that no beacon packet 310 is arriving at the receiver beginning at that time since the value produced by the integration is relatively small. Similarly, during the first reception event 341 the receiver generates a third and fourth internally-generated code sequences 315c.1 and 315d.1 beginning at times $[t_0+(2t_w/3)]$ and $[t_0+t_w]$ and performs multiplications and time integrations, and will determine that a beacon packet 310 did not arrive beginning at those times either.

Since the time-integrating correlator can only perform one set of measurements per cycle time $t_c$, the beacon signal is searched for by incrementing the starting time of the time window 315 by $t_c+t_w$ and performing another reception. In particular, in the second reception event 342 beginning at time $t_0+t_c+t_w$ the receiver generates a first internally-generated code sequence 315a.2 of length $t_b$, which is multiplied with the received signal 300 and integrated over time. Since, in this case there is no beacon packet 310 arriving at the receiver beginning at time $t_0+t_c+t_w$, the result of the multiplication and integration produces a relatively small value, and the receiver determines that a beacon packet 310 is not arriving at the receiver beginning at that time $t_0+t_c+t_w$. Similarly, during the second reception event 342 the receiver generates a second, third and fourth internally-generated code sequences 315b.2, 315c.2, and 315d.2 of length $t_b$ beginning at times $[t_0+t_c+(t_w/3)]$, $[t_0+t_c+(2t_w/3)]$, and $[t_0+t_c+t_w]$, respectively. The received signal 300 is multiplied with the internally-generated code sequences 315b.2, 315c.2, and 315d.2 and integrated over time and, again, the receiver will determine that no beacon packet 310 is arriving at the receiver beginning at those times since the value produced by the integration is relatively small. The beacon signal is searched for by incrementing the starting time of the time window 315 by an additional $t_c+t_w$ and performing another reception 343, and so on.

Therefore, on average the contact time, i.e., the time required for the receiver to locate the beacon signal, will take the transceiver ½·($t_{c/tw}$) cycle times to locate a beacon packet 310. If the cycle time $t_c$ is approximately one millisecond, and the time windows have a length $t_w$ of around 100 nanoseconds, then it will require approximately 10,000 cycles (ie., on the order of ten seconds) for the transceiver to locate a beacon packet 310. The ten seconds required for the initial stage of the acquisition process is a perceptible length of time by human standards, and it would be desirable to provide improved methods of acquisition which would require less time to perform.

Therefore, it is an object of the present invention to provide a system for rapid acquisition by spread spectrum transceivers.

It is another object of the present invention to provide a system for rapid acquisition by spread spectrum transceivers with finite length reception windows.

It is another object of the present invention to provide a system for rapid acquisition by spread spectrum transceivers using an episodic beacon signal.

It is another object of the present invention to provide a system for rapid acquisition by spread spectrum transceivers using a prearranged beacon signal.

It is another object of the present invention to provide a system which can rapidly perform the contact stage of the acquisition process.

It is another object of the present invention to provide a system which can rapidly perform the synchronization stage of the acquisition process.

Another object of the present invention is to provide a transceiver which broadcasts a beacon signal which has low cross-correlations with code sequences used by other transceivers, where these other transceivers are possibly within the network of transceivers which may communicate with the first transceiver.

Another object of the present invention is to provide a beacon packet which has an autocorrelation function with sidelobes which have a significant time span and are of significant size.

Another object of the present invention is to provide a beacon packet which has an autocorrelation function that has sidelobes with a structure that allows sampling thereof to provide an estimate of the location of the peak of the autocorrelation function.

Furthermore, it is an object of the present invention to provide a transceiver which broadcasts a beacon signal which has low cross-correlations with code sequences used by other transceivers, and which has an autocorrelation function with sidelobes which have a significant time span, are of significant size, and have a structure that allows sampling thereof to provide an estimate of the location of the peak of the autocorrelation function.

In addition, other objects, features and advantages of the present invention will become apparent from the following detailed description when taken in conjunction with the accompanying drawings.

BRIEF SUMMARY OF THE INVENTION

The present invention is directed to a method for two spread spectrum transceivers to perform signal acquisition in the vicinity of a number of additional spread spectrum transceivers which communicate with each other using a class of code sequences which have low cross-correlations and auto-correlations with small off-peak values. A first one of the two spread spectrum transceivers transmits a beacon signal consisting of beacon packets which are transmitted at regularly spaced times separated by a beacon cycle interval. The length of the beacon packets is shorter than the beacon cycle interval so that there is a period of nontransmission between each of the beacon packets. The beacon packets have an acyclic auto-correlation function with sidelobes that are not small relative to a peak value of the acyclic auto-correlation function, and these sidelobes have a structure which allows a sampling of a number of sidelobe values to be used to provide an estimate of a location of the peak of the acyclic auto-correlation.

If the second spread spectrum transceiver fails to receive a beacon packet during a reception window, the second spread spectrum transceiver attempts a reception during a subsequent reception window which begins at a time which is an integer multiple of said beacon cycle interval plus or minus roughly the beacon packet length later than the beginning of the previous reception attempt. Attempted receptions are performed by calculation of correlations between time delayed versions of an internally-generated beacon packet and the received signal.

Once the second transceiver receives a beacon packet during a reception window (ie., the first successful reception window), the second transceiver performs a reception during a reception window which begins at a time which is an integer multiple of the beacon cycle interval plus or minus a fraction of twice the beacon packet length later than the beginning of the first successful reception window.

However, if the second transceiver fails to receive some portion of a beacon packet during that reception window, the second transceiver performs another reception during a reception window which begins at a time which is an integer multiple of the beacon cycle interval minus or plus, respectively, that fraction of twice the beacon packet length later than the beginning of the first successful reception window.

The time (modulo the cycle time) at which the beacon packets are transmitted by the first transceiver is determined by estimating the location of the maximum of the correlation function between the delayed internally-generated beacon packets and the received beacon packets based on the times and values of the successful receptions of beacon packets by the second transceiver.

BRIEF DESCRIPTION OF THE DRAWINGS

FIG. 3D is a circular state-transition diagram illustrating the two types of state transitions that occur in Fibonacci-type linear feedback shift registers.

FIGS. 5A and 5B are two exemplary linear state transition diagrams for Small Kasami codes generated by a 3n/2-bit Galois-construction linear feedback shift register which produces a family of Small Kasami codes.

FIG. 5C is an exemplary linear state transition diagram for a small progenitor code for Small Kasami codes generated by a 3n/2-bit Galois-construction linear feedback shift register which produces the family of Small Kasami codes of FIGS. 5A and 5B.

FIG. 6A depicts a beacon signal consisting of a series of beacon packets transmitted at regular intervals, where each beacon packet consist of a repeated series of base small progenitors w, and illustrates how:the placement of the reception window is incremented in order to locate the beacon signally.

FIG. 6C depicts attempted receptions of the autocorrelation function by six contiguous time windows.

FIG. 7B is a flowchart of the process of the present invention for determining the location of the center of the acyclic autocorrelation function once the beacon signal has been found.

FIG. 8A is a diagram showing two beacon signals which each consists of five contiguous maximal sequences which are time aligned.

FIG. 8B is a diagram showing two beacon signals which each consists of five contiguous maximal sequences, one of which is shifted by two maximal sequence lengths relative to the other.

FIG. 9A is a diagram showing two beacon signals which each consists of five contiguous maximal sequences, one of which is shifted by a fraction of a maximal sequence length relative to the other.

FIG. 9B is a diagram showing two beacon signals which each consists of five contiguous maximal sequences, one of which is shifted by two and a fraction maximal sequence lengths relative to the other.

FIG. 9C is a diagram showing two beacon signals which each consists of five contiguous maximal sequences, one of which is shifted by four and a fraction maximal sequence lengths relative to the other.

FIG. 9D is a diagram showing two beacon signals which each consists of five contiguous maximal sequences, one of which is shifted by a fraction of a maximal sequence length relative to the other, and where the lower left maximal sequence is truncated by S bits.

FIG. 9E is a diagram showing two beacon signals which each consists of five contiguous maximal sequences, one of which is shifted by a fraction of a maximal sequence length relative to the other, and where the lower right maximal sequence is truncated by S bits.

FIG. 9F is a diagram showing two beacon signals which each consists of five contiguous maximal sequences, one of which is shifted by a fraction of a maximal sequence length relative to the other, and where the lower left maximal sequence has S bits of additional maximal sequence appended to it.

FIG. 9G is a diagram showing two beacon signals which each consists of five contiguous maximal sequences, one of which is shifted by a fraction of a maximal sequence length relative to the other, and where the lower right maximal sequence has S bits of additional maximal sequence appended to it.

DETAILED DESCRIPTION OF THE PRESENT INVENTION

Figure 1A:
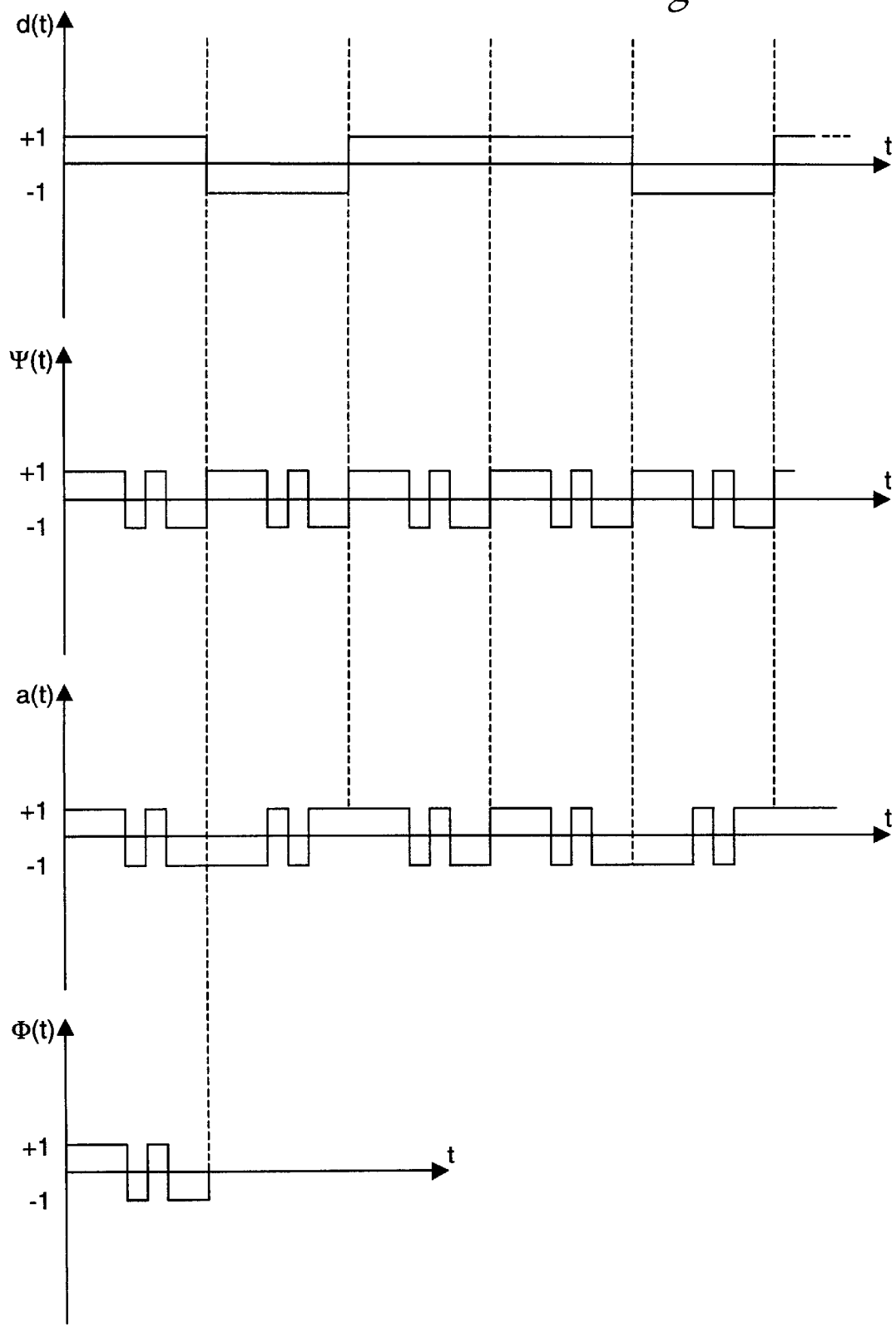
FIG. 1A shows an exemplary data function d(t), a pseudorandom code sequence Ψ(t) which consists of repetitions of a pseudorandom code Φ(t), and data signal a(t) being formed by the product of the data function d(t) and the pseudorandom code sequence Ψ(t).
Figure 1B:
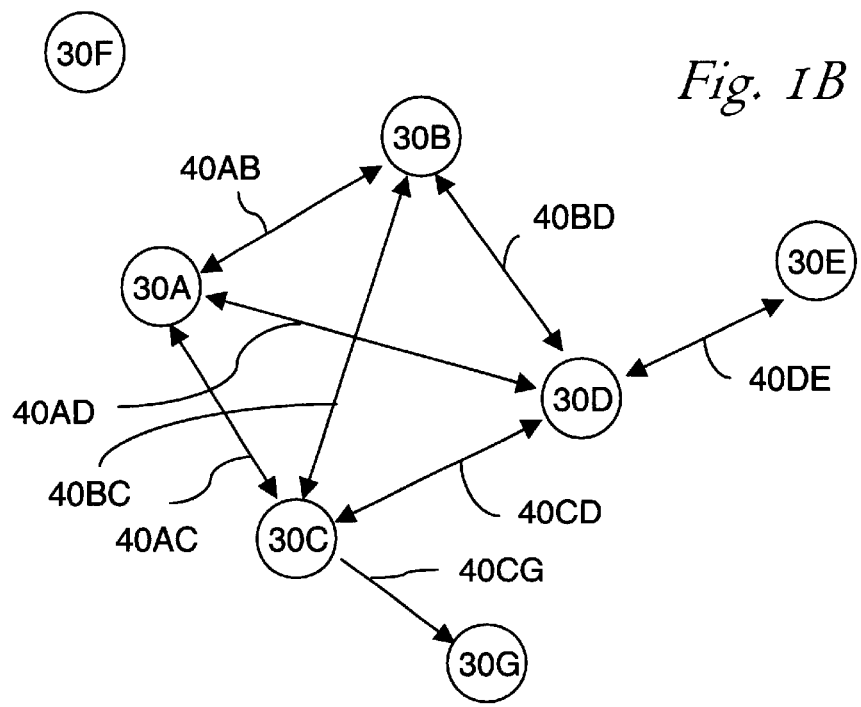
FIG. 1B shows an exemplary group of transceivers which are in various stages of communication with each other.

According to the preferred embodiment of the present invention, the signal acquisition process between two non-sinusoidal spread spectrum (NSS) transceivers is made more rapid than the method described above in reference to FIGS. 4A and 4B by using a beacon packet which consists of a repeated series of M maximal sequences of the type which are used to generate Small Kasami sequences. (It is important to note that, as described in detail below, by convention the maximal sequences used to generate the beacon packets of the present invention are not considered to be Small Kasami codes, although they are closely related to the Small Kasami codes.) As will be shown, the acyclic autocorrelations of these beacon packets have regularly-spaced peaks within a triangular envelope, and the increased width of the autocorrelation due to this triangular envelope allows the contact phase of the acquisition process to be shortened by a factor proportional to the width of the triangular envelope.

There are a number of families of code sequences with useful correlation properties which may be generated by taking the XOR of the output of two or more LFSRs or, equivalently, the product of two or more generating polynomials. For instance, the Small Kasami codes are generated by the multiplication of two polynomials h(x) and h'(x), where h(x) is a primitive polynomial of degree n (where n is even), and h'(x) is a polynomial of degree n/2 which has roots which are the $(2^{n/2}+1)$ powers of the roots of h(x). (It should be noted that this multiplication of polynomials uses mod(2) arithmetic for the coefficients, and generates a product which has degree greater than n. This is to be contrasted with multiplication within a Galois field of degree n, which generates product polynomials which have a degree less than or equal to n.) A particular family of Small Kasami codes is generated by the product of two particular polynomials h(x) and h'(x), where the polynomials h(x) and h'(x) satisfy the above conditions. Because h(x) is a primitive polynomial, the sequences $\{u, Pu, P^2u, P^3u, \ldots\}$ generated by h(x) are maximal and have a period of $(2^n-1)$. It can also be shown that h'(x) is a primitive polynomial of degree n/2, and therefore the sequences {w, Pw, P²w, P³w, ... } generated by h'(x) are also maximal, and have a period of ($2^{n/2}-1$). (For convenience the terms $2^{n/2}$ and $2^n$ will sometimes be written as s(n) and p(n) in the present specification.)

A list of all Small Kasami codes generated for even values of n between four and sixteen is provided in the microfiched appendix to the present specification. The polynomials for LFSRs which generate the Small Kasami codes, when shown in octal Galois form are followed by an "og", and when shown in octal Fibonacci form are followed by an "of".

Since ($2^{n/2}-1$) is a divisor of ($2^n-1$), the XOR of a sequence selected from the set {u, Pu, P²u, P³u, ... } with a sequence selected from the set {w, Pw, P²w, P³w, ... } produces a sequence which has period ($2^n-1$). The set of all such sequences, plus the sequence u alone, is called the set of Small Kasami sequences $K_S$, i.e., the Small Kasami codes are all phases of the sequences $$u,\ u \oplus w,\ u \oplus Pw,\ u \oplus P^2 w,\ \ldots,\ u \oplus P^{s(n)-2} w. \quad (3.1)$$

Clearly, there are $2^{n/2}$ Small Kasami codes within a family generated by a particular primitive polynomial h(x). It may be shown that the maximum magnitude θ of the cross-correlations and off-peak autocorrelations of the Small Kasami sequences in a family is $$\theta = (2^{n/2}+1). \quad (3.2)$$

For instance, for n=10 the period of the Small Kasami codes is 1023, there are a total of 32 Small Kasami codes for a given primitive polynomial h(x), the peak magnitude of the autocorrelation which is 1023, and the maximum magnitude of the cross-correlations and off-peak autocorrelations is 33.

It should be noted that the maximal sequence w, which we shall refer to as the "small progenitor," and its phases, although generated by the product of h(x) and h'(x) (when h(x) is given the seed of a string of zeros), is not considered to be a Small Kasami code. Certainly, the small progenitor w of the Small Kasami codes does not have a period of ($2^n-1$), as is the case with the Small Kasami codes listed in equation (3.1). Furthermore, the small progenitor sequence w does not satisfy the above magnitude bound for the off-peak autocorrelations since, as discussed in detail below, the autocorrelation has 33 peaks of magnitude 1023 per period. (As discussed in detail below, a beacon packet consists of a finite series of small progenitors w, and so the autocorrelation of a beacon packet has a triangular envelope.) However, it is important to note that the maximum magnitude of the cross-correlations of the small progenitor w with the Small Kasami sequences in a family is ($2^{n/2}+1$)—the same bound found on the magnitude of the cross-correlations of the Small Kasami sequences within a family!

Since the product of the two polynomials h(x) and h'(x) of degree n and n/2 is a polynomial of degree 3n/2, the corresponding family of Small Kasami codes may be generated by an (3n/2)-stage LFSR. According to the present invention, the LFSR is programmable, as described below, so the family of codes generated by it may be altered. Again, it is noted that the Small Kasami codes are not maximal sequences, since the period of the Small Kasami codes is ($2_n-1$), not ($2_{3n/2}-1$). However, according to the preferred embodiment of the present invention, the Small Kasami codes of period ($2^{n-}$) are generated by a programmable (3n/2)-stage LFSR, rather than a programmable n-stage LFSR and a programmable n/2-stage LFSR, because of the added flexibility this provides. For instance, a (3n/2)-stage LFSR may be used to generate maximal sequences of period ($2^{3n/2}-1$), while this is not possible using the combination of an n-stage LFSR and an n/2-stage LFSR. (As described below, according to the present invention, Small Kasami codes for a polynomial of degree 3n'/2, where n'<n, may also be generated using a programmable 3n/2-stage LFSR.)

Figure 3A:
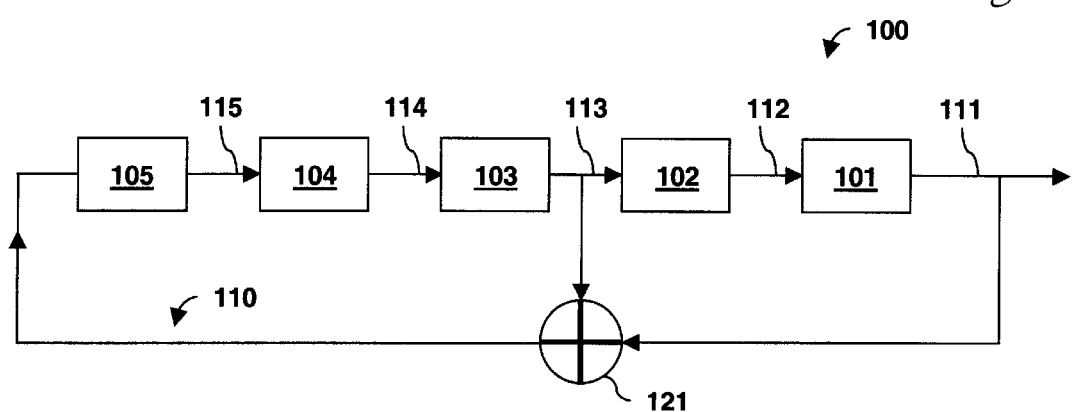
FIG. 3A shows a Fibonacci-type linear feedback shift register.
Figure 3B:
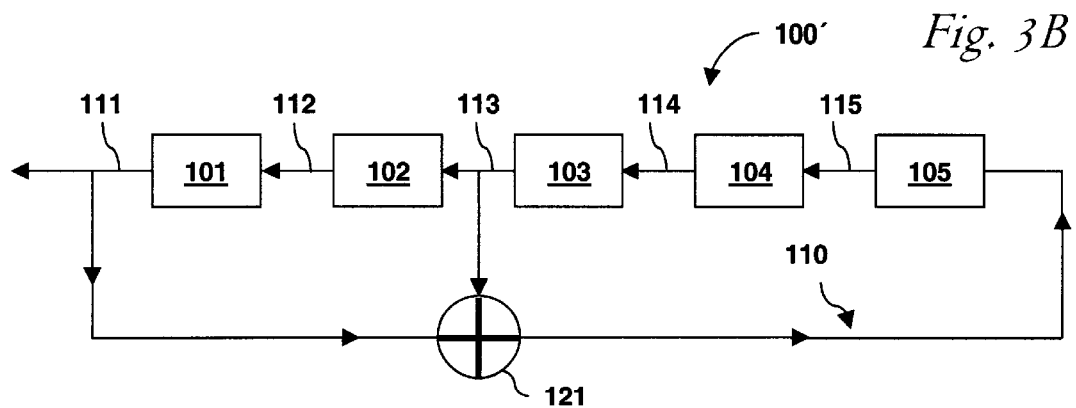
FIG. 3B shows a mirror-image version of the Fibonacci-type linear feedback shift register shown in FIG. 3A.

State transitions are shown in FIGS. 5A, 5B, and 5C on a linear state axis 800 consisting of integers between 1 and ($2^{3n/2}-1$) for an exemplary (3n/2)-stage LFSR which produces a family of Small Kasami codes. (For convenience, $2^{3n/2}$ will sometimes be notated as q, such as in FIGS. 5A, 5B and 5C, and as before $2^{n/2}$ and $2^n$ will sometimes be written as s and p, respectively.) As shown in FIG. 5A, a first seed value $v^{(1)}{}_1$ with which the LFSR is initialized produces the cycle of (3n/2)-bit states $v^{(1)}{}_i$ shown connected in sequence by a series of directed arcs 810. In this exemplary case, the index i takes integer values from 1 to (p-1) since the seed $v^{(1)}{}_1$ happens to be a state which produces a Small Kasami sequence, rather than the small progenitor w of the family of sequences. (It is noted that the exemplary (3n/2)-stage LFSRs which generate the state transition diagrams of FIGS. 5A–5C are Galois construction LFSRs, so the rules regarding the geometry of the transitions presented in conjunction with FIG. 3D do not hold.) In particular, the first state $v^{(1)}{}_1$, is the seed value of 3. The second state $v^{(1)}{}_2$ has a value of 12. The third state $v^{(1)}{}_3$ has a value somewhere between 19 and (q-7) (this range of state values is not depicted in detail due to space limitations), and so on, until the penultimate state $v^{(1)}{}_{p-2}$ which has a value of 13, and the final state $v^{(1)}{}_{p-1}$ of the cycle which has a value of (q-5).

Of course, choosing any of the states $v^{(1)}{}_i$, for i≠1, traversed in FIG. 5A as a seed produces the same Small Kasami code as the one produced with the seed value of $v^{(1)}{}_1$, but with a phase shift of $T^{j-1}$. Therefore, to generate a second distinct Small Kasami code, a seed which is not equal to any of the values $v^{(1)}{}_i$ (for i=1, 2, ..., q) is chosen. The states $v^{(1)}{}_i$ which were generated by the first seed are shown as hatched in FIG. 5B, and in this exemplary case the first state $v^{(2)}{}_1$ (i.e., the seed value) of the cycle of states $v^{(2)}{}_i$ is 6, the second state $v^{(2)}{}_2$ has a value of 14, the third state $v^{(2)}{}_3$ has a value of (q-2), the fourth and fifth states $v^{(2)}{}_4$ and $v^{(2)}{}_5$ have values somewhere between 19 and (q-7), and so on until the penultimate state $v^{(2)}{}_{p-2}$ which has a value of 17, and the final state $v^{(2)}{}_{p-1}$ which has a value of 15. Clearly none of the states $v^{(2)}{}_i$ generated by the second seed are equal to any of the states $v^{(1)}{}_i$ generated by the first seed. In general, $$v^{(j)}{}_i \ne v^{(k)}{}_h \quad (3.3)$$

when j≠k, for every i and h.

All the states $v^{(1)}{}_i$ and $v^{(2)}{}_i$ of the two cycles which were generated by the first and second seeds $v^{(1)}{}_1$ and $v^{(2)}{}_1$ are shown as hatched in FIG. 5C, and a seed for the next Small Kasami code in the family must be chosen from the states which were not generated from the first and second seeds $v^{(1)1}$ and $v^{(2)}{}_1$, i.e., the unhatched numbers of the state transition diagram of FIG. 5C. In this exemplary case the first state $v^{(3)}{}_1$ has a value of 10, the second state $v^{(3)}{}_2$ has a value of (q-3), the third state $v^{(3)}{}_3$ has a value of (q-7), and so on until the final state $v^{(3)}{}_{s-1}$ which has a value of 5. In this case there are only (s-1)=($2^{n/2}-1$) states in the sequence. Therefore, the exemplary seed value $v^{(3)}{}_1$ is a seed which generates the small progenitor w of the Small Kasami family.

Because there are $2^{n/2}$ Small Kasami sequences of length ($2^n-1$), the LFSR state values of all Small Kasami codes in a family occupy $[2^{2n}-1]* 2^{n/2}=(2^{3n/2}-2^{n/2})$ positions on the state axis of FIG. 5. This leaves $(2^{n/2}-1)$ values on the state axis which are not occupied by the Small Kasami codes. This is exactly the number of states occupied by the LFSR in the production of the small progenitor w generated by h'(x). Therefore, by repeatedly selecting seed values from those state values which have not occurred in the production of any other Small Kasami sequences, the small progenitor and the complete set of Small Kasami sequences can be generated.

Another type of code sequence which may be used for acquisition is the Large Kasami codes generated by the multiplication of three polynomials h(x), h'(x) and h"(x), where h(x) is a primitive polynomial of degree n (where n is even) which generates a maximal sequence u, h'(x) is a polynomial of degree n/2 which generates a maximal sequence w produced by decimation of u by $(2^{n/2}+1)$, and h"(x) is a polynomial of degree n which generates a maximal sequence v produced by decimation of u by $(2^{(n+2)/2}+1)$. It should be noted that h"(x) is not a primitive polynomial when n is divisible by four, but that h"(x) is a primitive polynomial when (n+2) is divisible by four. (It should also be noted that the multiplication of binary polynomials mentioned above uses mod(2) arithmetic for the coefficients, and generates a product which has degree greater than n. This is to be contrasted with multiplication within a Galois field of degree n, which generates product polynomials which have a degree less than or equal to n.) A particular family of Large Kasami codes is generated by the product of three particular polynomials h(x), h'(x) and h"(x), where the polynomials h(x), h'(x) and h"(x) satisfy the above conditions. With Large Kasami codes, the maximal sequence w is used as the small progenitor when generating the beacon signal. It may be shown that the maximum magnitude of the cross-correlations and off-peak autocorrelations of the Large Kasami sequences in a family is $(2^{(n+2)/2}+1)$. The number of Large Kasami sequences generated by any given Large Kasami-generating polynomial is $[2^{n/2}(2^n+1)-1]$ if n, which is an even number, is divisible by four, and $[2^{n/2}(2^n+1)]$ if n is not divisible by four. Therefore, the number of n-bit Large Kasami sequences generated by any given Large Kasami-generating polynomial is larger than the number of n-bit Small Kasami sequences generated by a Small Kasami-generating polynomial by a factor of $(2^n+1)$ if n is not divisible by four, and approximately $(2^n+1)$ if n is divisible by four. (Hence the names Large Kasami and Small Kasami.) In fact, the Small Kasami codes are a subset of the Large Kasami codes. For instance, for n=10, there are about 32,800 Large Kasami sequences in a family, and the 32 of those Large Kasami codes are the 10-bit Small Kasami sequences.

It should be noted that when (n+2) is divisible by four, the C-language program LKSeq_Gen.c (which is discussed in detail and listed below) uses both primitive and non-primitive polynomials for h"(x). In consequence, the number of polynomials produced by the C-language program LKS_Gen.c is greater than the number produced by the mathematical method described above and in "Crosscorrelation Properties of Pseudorandom and Related Sequences," Dilip V. Sarwate & Michael B. Pursley, Proceedings of the IEEE, Vol. 68, No. 5, May 1980. The polynomials produced by the C-language program LKSeq_Gen.c which are not the "standard Large Kasami" polynomials described by Sarwate & Pursley will be termed "Large Kasami-like" polynomials, and the sequences generated by the Large Kasami-like polynomials will be termed Large Kasami-like sequences. It is found that the number of sequences generated by each Large Kasami-like polynomial is $2^{3n/2}$. In contrast, as stated above and in the paper by Sarwate & Pursley, for (n+2) divisible by four the standard Large Kasami polynomials each generate $[2^{n/2}(2^n+1)]$ sequences. However, it is important to note that all of the polynomials produced by LKSeq_Gen.c generate sequences which obey the correlation properties discussed above for Large Kasami sequences.

A list of all Large Kasami and Large Kasami-like codes generated for even values of n between four and ten is provided in the microfiched appendix to the present specification. (Large Kasami and Large Kasami-like codes for n=2 have not been listed since they do not exist.) The polynomials for LFSRs which generate the Large Kasami and Large Kasami-like codes, when provided in octal Galois form are followed by an "og", and when provided in octal Fibonacci form are followed by an "of". For (n+2) divisible by four, those polynomials in the microfiched appendix which are marked with an asterisk on the right are generated using only primitive polynomials, while those polynomials in the microfiched appendix which are not marked with an asterisk are generated using two primitive polynomials and one polynomial which is not primitive, i.e., those polynomials which are marked with asterisks are standard Large Kasami polynomials. As can be verified from the microfiched appendix, for a given n value, the number of Large Kasami and Large Kasami-like generating polynomials is much smaller than the number of Small Kasami-generating polynomials. For instance, for n=8 there are 2048 polynomials which generate Small Kasami sequences and only 32 polynomials which generate Large Kasami and Large Kasami-like sequences.

As represented in FIG. 6A, according to the present invention the beacon signal 200 consists of beacon packets 210 of length $t_b$ which are repeated once per beacon cycle 225, where each beacon cycle 225 has a length $t_c$. Between each beacon packet 210 there is a nontransmission period of length $(t_c-t_b)$. According to the present invention, a group of transceivers communicates using codes from a Small Kasami family and the beacon packet 210 used for the acquisition process consists of a repeated series of the small progenitor w of a Small Kasami sequence. Each small progenitor w has a time length tm and a bit length of $L=(2^{n/2}-1)$. Therefore, the bit length of each beacon packet 210 is the bit length of the Small Kasami sequences (i.e., $(2^n-1)$), and there are $M=(2^{n/2}+1)$ repetitions of the small progenitor w in a beacon packet 210 since $$[(2^{n/2}-1)(2^{n/2}+1)]=(2^n-1). \quad (3.4)$$

The time length $t_b$ of each beacon packet 210 is $t_b=(2^{n/2}+1)*t_m$.

Figure 6B:
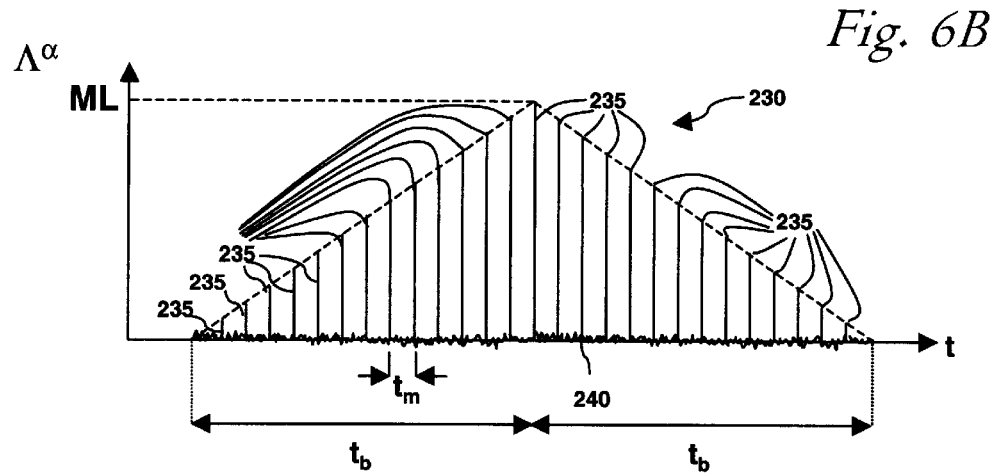
FIG. 6B shows the acyclic autocorrelation function for the beacon packets of the present invention which consist of a repeated series of small progenitors w.
Figure 6D:
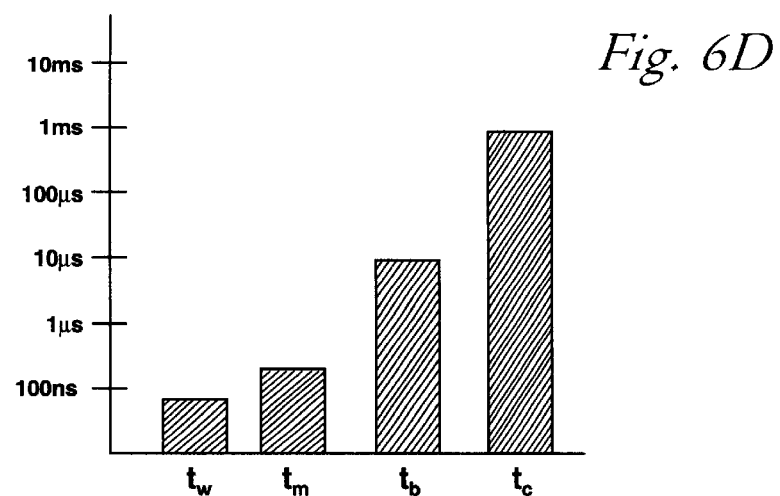
FIG. 6D shows the relative magnitudes of the lengths of the time windows, the small progenitors w used to produce a beacon packet, the beacon packets, and the cycle time, respectively, on a logarithmic scale.

As shown in FIG. 6D, according to the preferred embodiment of the present invention the beacon cycle length $t_c$ is roughly 1 millisecond and the beacon packet length $t_b$ is roughly 10 microseconds. Furthermore, according to the preferred embodiment of the present invention, n=10 so each beacon packet 210 consists of 33 small progenitors w, each of which is 31 bits in length. Therefore, the length of each small progenitor w is approximately $t_m$=310 nanoseconds, and each bit has a bit length of about 10 nanoseconds. (It should be understood that these particular time lengths are presented at this point in the present specification to help make the method of the present invention more concrete to the reader, and their presentation is not meant to imply that the present invention is limited to these values or relative values.)

For the time being let us assume that the time-integrating correlator of a receiving acquiring transceiver has time windows 215 of length $t_w$ which are longer than the length $t_m$ of the small progenitors w which are concatenated to form the beacon 210. As further discussed below, the acyclic autocorrelation $\Lambda^a$ 230 of the beacon signal 210 has the functional form shown in FIG. 6B of a series of regularly spaced peaks separated by a time length $t_m$ and modulated by a triangular envelope of total width $2*t_b$. This is to be compared with the acyclic autocorrelation $\Lambda^a$ of a single maximal sequence of length $t_b$, which has a single peak of width $t_b/N$, as discussed in regards to FIG. 4B. As discussed below, the increased width of the acyclic autocorrelation $\Lambda^a$ 230 of a beacon signal 210 of repeated small progenitors w has the important advantage of allowing a reduction in the acquisition time.

The reception procedure for an exemplary receiver is depicted in FIG. 6A. (For convenience of depiction only four reception bins 215a.n, 215b.n, 215c.n and 215d.n are depicted per reception event 241.n in FIG. 6A, where n at the end of a reference numeral represents an integer. However, receivers will typically use more than four reception bins 215a.n, 215b.n, 215c.n and 215d.n per reception time window.) The internally-generated code sequences 215a.1, 215a.2 and 215a.3 for the first time bin for three reception events 241.1, 241.2 and 241.3 are depicted on a first reception time axis 221, the internally-generated code sequences 215b.1, 215b.2 and 215b.3 for the second time bin for the three reception events 241.1, 241.2 and 241.3 are depicted on a second reception time axis 222, and so on. In the first reception event 241.1 the receiver generates a first internally-generated code sequence 215a.1 of length $t_b$, i.e., the length of the anticipated beacon packet 210, beginning at time to. A received signal 200, i.e., the signal broadcast by the transmitter, is multiplied with the internally-generated code sequence 215a.1 and integrated over time. In this case since there is no beacon packet 210 arriving at the receiver beginning at time to, the result of the multiplication and integration produces a small value, which is non-zero only due to received noise, and so the receiver will determine that a beacon packet 210 is not arriving beginning at that time. Also, during the first reception event 241.1 the receiver generates a second internally-generated code sequence 215b.1 of length $t_b$ beginning at time $[t_0+(t_w/3)]$. The received signal 200 is multiplied with the internally-generated code sequence 215b.1 and integrated over time. Again, the receiver will determine that no beacon packet 210 is arriving at the receiver beginning at that time since the value of the integration is small. Similarly, during the first reception event 241.1 the receiver generates a third and fourth internally-generated code sequences 215c.1 and 215d.1 beginning at times $[t_0+(2t_w/3)]$ and $[t_0+t_w]$ and performs time integrations, and will determine that a beacon packet 310 did not arrive beginning at those times either.

According to the rapid signal acquisition method and apparatus of the present invention, rather than searching for the beacon signal 210 by incrementing the starting time of each successive reception time window 241.n by $(t_c+t_w)$, as is required when the acyclic autocorrelation $\Lambda^a$ has a peak that is narrow relative to the width $t_w$ of the time window 315, the starting time of each successive reception time window 215 is incremented by $[t_c+\beta t_b]$, where $0<\beta<2$, since the acyclic autocorrelation $\Lambda^a$ 230 is wide relative to the width $t_w$ of the time window 215. The magnitude of the factor $\beta$ depends on the level of reception noise relative to the magnitude of the peak of the acyclic autocorrelation $\Lambda^a$ 230. If there is considerable noise, then only regions of the acyclic autocorrelation $\Lambda^a$ 230 near the central peak value can be detected, so $\beta$ must be small. However, if the noise is low relative to the magnitude of the central peak, then $\beta$ can be larger. According to the preferred embodiment of the present invention $0<\beta<2$, more preferably $0.5<\beta<1.5$, still more preferably $0.75<\beta<1.25$, and even m preferably $\beta\approx1$.

Therefore, in the second reception event 241.2 the receiver generates a first internally-generated code sequence 215a.2 of length $t_b$ beginning at time $(t_0+t_c+\beta t_b)$. The received signal 200 is multiplied with the internally-generated code sequence 215a.2 and integrated over time. There is no beacon packet 210 arriving at the receiver beginning at time $(t_0+t_c+\beta t_b)$, so the integration of the product of the received signal 200 and the internally-generated code sequence 215a.2 is small, and the receiver determines that a beacon packet 210 is not arriving at the receiver beginning at that time. Similarly, during the second reception event 241.2 the receiver generates a second, third and fourth internally-generated code sequences 215b.2, 215c.2 and 215d.2 of length $t_b$ beginning at times $[t_0+t_c+\beta t_b+(t_w/3)]$, $[t_0+t_c+\beta t_b+(2t_w/3)]$, and $[t_0+t_c+\beta t_b+t_w]$, respectively. The received signal 200 is multiplied with the internally-generated code sequences 215b.2, 215c.2 and 215d.2 and integrated over time. Again, the receiver will determine that no beacon packet 210 has arrived at the receiver beginning at those times since the value of the integration is relatively small. This method repeats at time increments of the cycle time $(t_c+\beta t_b)$ until the beacon signal 210 is located.

Therefore, (still operating under the assumption made above that the length $t_w$ of the time windows 215 is greater than the length $t_m$ of the small progenitor sequences w) on average it will take the transceiver $\frac{1}{2}(t_c/\beta t_b)$ cycle times of length $t_c$ to locate a beacon packet 210. This is a speed-up of a factor of $(\beta t_b/t_w)$ over the method described above in the Background of the Invention section. For the sake of explanation of the present invention, consider the case where $\beta=1$, the cycle time $t_c$ is approximately 1 millisecond, the time windows have a length $t_w$ of about 100 nanoseconds, and the beacon signals 210 have a length $t_b$ of about 10 microseconds. With these values it will require an average of 50 cycles (i.e., on the order of a twentieth of a second) for the transceiver to locate a beacon packet 210. This therefore provides a speed-up by a factor of one hundred. The one-tenth of a second required for the contact stage of the acquisition process is not a perceptible length of time by human standards, and so is an important improvement relative to the time on the order of seconds required by the method described in the Background of the Invention section.

It should be noted that in the above exposition it was assumed that the width $t_w$ of the time windows 215 is greater than or equal to the separation $t_m$ between the peaks in the acyclic autocorrelation function $\Lambda^a$ 230. However, in the preferred embodiment of the present invention the width $t_w$ of the time windows 215 is less than the separation time $t_m$ between the peaks of the acyclic autocorrelation function $\Lambda^a$ 230. FIG. 6C reflects this by showing three peaks 235a–235c of the acyclic autocorrelation function $\Lambda^a$ 230 and a series of time windows 215a–215f which are displayed on a time axis displaced by integer multiples of $t_c$. (It should be understood that due to the practical operating constraints of the time integrating correlator, the time windows 215 may not actually be concurrent as shown.) As illustrated by FIG. 6C, when the separation $t_m$ between consecutive peaks 235a–235c of the acyclic autocorrelation function $\Lambda^a$ 230 is k times the width $t_w$ of the time windows 215a–215f (k is shown to be approximately five in FIG. 6C) then, before incrementing the reception time $t_r$ by $\beta t_b$ (and a multiple of $t_c$ which may possibly be greater than unity), it is necessary to increment the reception time $t_r$ at least (k+1) times by $t_w$ (and a multiple of $t_c$ which may possibly be greater than unity). Therefore, on average it will take the transceiver $[(t_c/\beta t_b)(t_m/t_w)]$ cycle times to locate a beacon packet 210. This is a speed-up of a factor of $(\beta t_b/t_m)$ over the method described above in the Background of the Invention section.

As discussed above in reference to FIG. 6D, according to the preferred embodiment of the present invention the time window length $t_w$ is roughly 80 nanoseconds, the length $t_m$ of the small progenitor sequence w is roughly 310 nanoseconds, the beacon packet length $t_b$ is roughly 10 microseconds, and the beacon cycle length $t_c$ is roughly 1 millisecond. Furthermore, the time required for the contact stage of the acquisition process for the method of the present invention is roughly $(t_c^2/t_b)$. Therefore, it is apparently advantageous to increase the beacon packet length $t_b$. (It should also be noted that delays due to multipath reflections of the signal are typically up to 50 to 100 nanoseconds in length, so the length $t_b$ of the beacon packets 210 must be substantially larger than this if the structure of the acyclic autocorrelation $\Lambda^a$ is to be useful as described above.) According to the present invention, the ratio of the beacon cycle length $t_c$ and the beacon packet length $t_b$ is preferably between 3 and 3000, even more preferably between 10 and 1000, still more preferably between 30 and 300, and most preferably around 100.

As discussed above, the time required for the contact stage of the acquisition process is also roughly proportional to the length $t_m$ of the small progenitor sequence w divided by the time window length $t_w$ when $t_w < t_m$. The relationship becomes more exactly a true proportionality when $t_w \ll t_m$. (It should be noted that there is no decrease in the time required for the contact stage produced by decreasing the length $t_m$ of the small progenitor sequence w when $t_w > t_m$.) However, there are difficulties which result from making $(t_m/t_w)$ small. Increasing the time window length $t_w$ requires an increase in the number of integrators in the time-integrating correlator. Decreasing the length $t_m$ of the small progenitor sequence w (i.e., decreasing the number of bits L in the small progenitor w) has the disadvantage of decreasing the signal-to-noise ratio since the ratio between the magnitude of the central peak of the acyclic autocorrelation function and the baseline which is equal to (−1) multiplied by the number of small progenitor sequences w in the beacon signal 210. According to the present invention, the ratio of the length $t_m$ of the small progenitor sequence w to the time window length $t_w$ is preferably between 1 and 30, still more preferably between 2 and 12, and most preferably between 3 and 6.

Figure 7A:
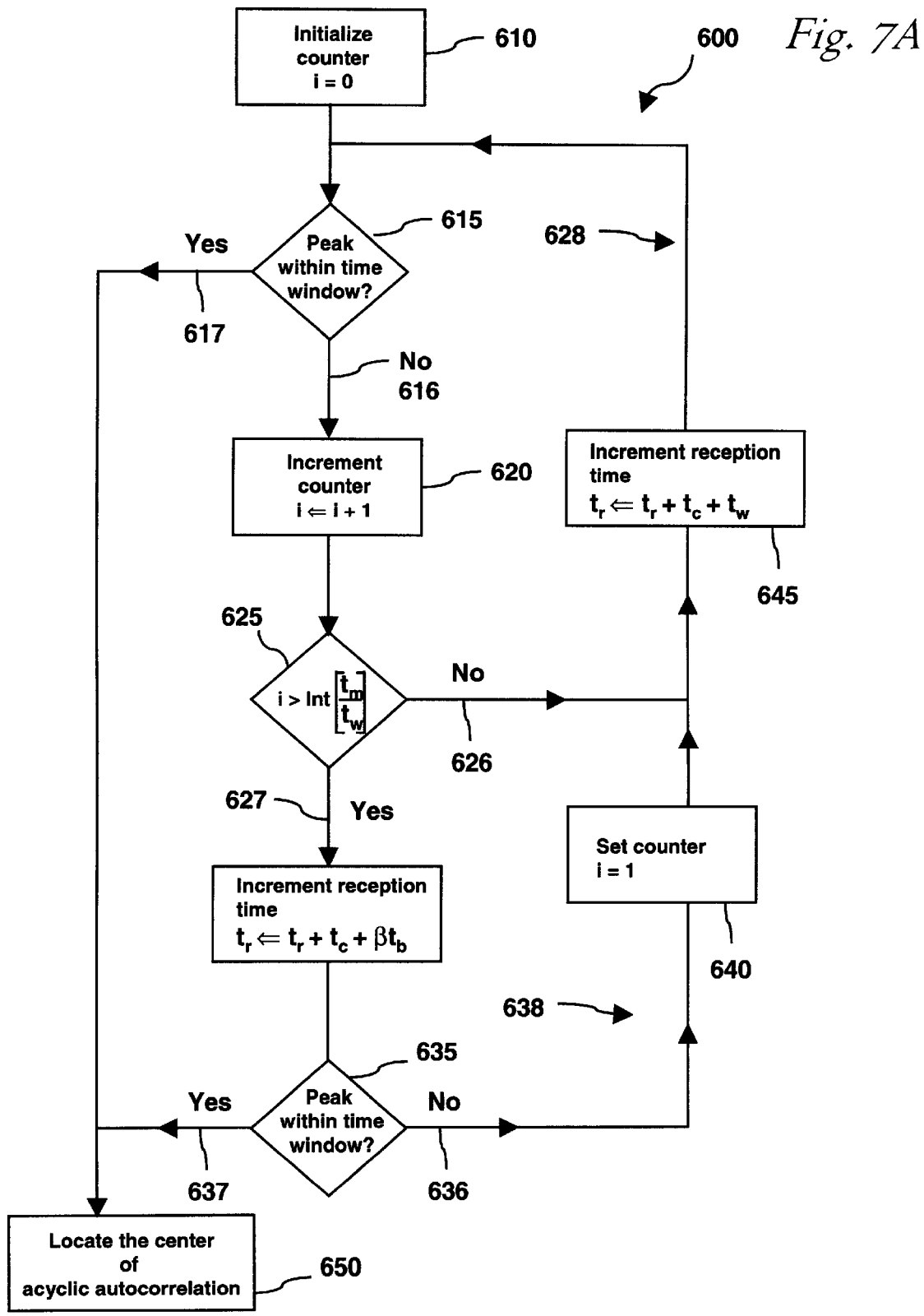
FIG. 7A is a flowchart of the process of the present invention for searching for a beacon signal.

A flow chart depicting the process 600 of the present invention when $t_w < t_m$ is shown in FIG. 7A. The process 600 begins with the initialization 610 of a counter i to have a value of zero. Then a reception is performed and it is determined 615 whether a peak 235 of the acyclic autocorrelation function $\Lambda^a$ 230 is within the time window 215 of the reception. If so 617, then the location of the center of the acyclic autocorrelation function $\Lambda^a$ 230 is determined 650 as described below. However, if a peak 235 of the acyclic autocorrelation function $\Lambda^a$ 230 is not 616 within the time window 215, then the counter i is incremented 620 by unity, and the value of the counter i is tested 625. If the counter i is not 626 greater than the integer part of $(t_m/t_w)$, then the reception time $t_r$ is incremented 645 by $(t_w + t_c)$ and the process 600 returns 628 to the step 615 of determining whether a peak 235 of the acyclic autocorrelation function $\Lambda^a$ 230 is within a time window 215 which begins at the new reception time $t_r$. However, if the counter i is 627 greater than the integer part of $(t_m/t_w)$, then there have been receptions performed at enough consecutive time windows 215 to insure that none of these time windows 215 have fallen between peaks 235 of the acyclic autocorrelation function $\Lambda^a$ 230, so the reception time 4 is incremented 630 by $(\beta t_b + t_c)$ and it is determined 635 whether a peak 235 of the acyclic autocorrelation function $\Lambda^a$ 230 is within a time window 215 which begins at the new reception time $t_r$. If so 637, then the location of the center of the acyclic autocorrelation function $\Lambda_a$ 230 is determined 650 as described below. If not 636, then the counter i is set 640 to unity, and the reception time $t_r$ is incremented 645 by $(t_w + t_c)$ and the process 600 returns 628 to the steps 615, 620, 625 and 645 of performing receptions with incrementations of the reception time $t_r$ by the length $t_w$ of the time windows 215 (and integer multiples of the cycle time $t_c$).

Once the beacon packet 210 is located 617/637, the location of the center of the acyclic autocorrelation function $\Lambda^a$ 230 is calculated based on the magnitudes of a number of peaks of the function 630. According to the preferred embodiment of the present invention, once the beacon packet 210 is located 617/637, a counter i is initialized 655 to zero and the reception time is incremented 657 by $(t_c - \gamma t_b)$, as is shown in the flowchart 650 of FIG. 7B, where $\gamma t_b$ is an integer multiple of $t_m$ so that a peak 235 of the acyclic autocorrelation function $\Lambda^a$ 230 will fall within the new reception time window 215. In the preferred embodiment of the present invention the factor $\gamma$ has a value between 0.25 and 2.00, more preferably a value between 0.5 and 1.5, and still more preferably a value of approximately 1.0. Then a reception is performed 660 and the magnitudes of the peaks 235 of the acyclic autocorrelation function $\Lambda^a$ 230 within the time window 215 are stored. The counter i is then incremented 662 by unity and its value is tested 670 to determine whether it is greater than $(2 \gamma t_b/t_m)$ If so 672, then the stored magnitudes of the peaks 235 are used to calculate 690 the location of the center of the acyclic autocorrelation function $\Lambda^a$ 230. However, if 671 the counter i has a value less than $(2 \gamma t_b/t_m)$, then the reception time is incremented 680 by $(t_m + t_c)$, and another loop through steps 660, 662, and 670 is performed. Using this method the magnitudes of $(2 \gamma t_b/t_m)$ peaks within a time range of $(2 \gamma t_b)$ is stored. The location of the center of the acyclic autocorrelation function $\Lambda_a$ 230 can be performed using a neural network or a linear regression of the peak magnitudes.

Although the above-described preferred method of determining the location of the center of the acyclic autocorrelation function $\Lambda^a$ 230 is implemented by measuring the magnitudes of all the peaks 235 within a time range that is on the order of the width $t_b$ of the acyclic autocorrelation function $\Lambda^a$ 230, according to the present invention a variety of sets of peaks or sets of groups of peaks can be used to calculate the location of the center of the acyclic autocorrelation function $\Lambda_a$ 230 once the beacon signal 210 has been located. Furthermore, as few as two peaks can be used to determine the location of the center of the acyclic autocorrelation function $\Lambda^a$ 230. As illustrated by FIGS. 11A, 11B, 11C and 11D, the center of the acyclic autocorrelation function $\Lambda_a$ 230 may be determined by measuring the magnitudes $m_1$ and $m_2$ of only two peaks 235 in the acyclic autocorrelation function $\Lambda^a$ 230 occurring at measurement times $t_1$ and $t_2$ (where $t_1 < t_2$), and then calculating the position of the t-axis intercept $t_x$ of the line through both points:

$$t_x = (m_1 t_1 - m_2 t_2)/(m_1 - m_2). \tag{3.5}$$

Figure 11A:
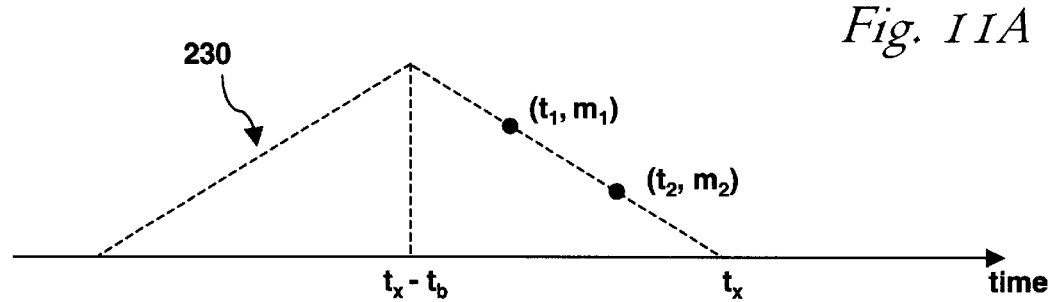
FIGS. 11A and 11B illustrate how the center of the acyclic autocorrelation function is determined using two values which are both located to the same side of the center of the acyclic autocorrelation function.
Figure 11B:
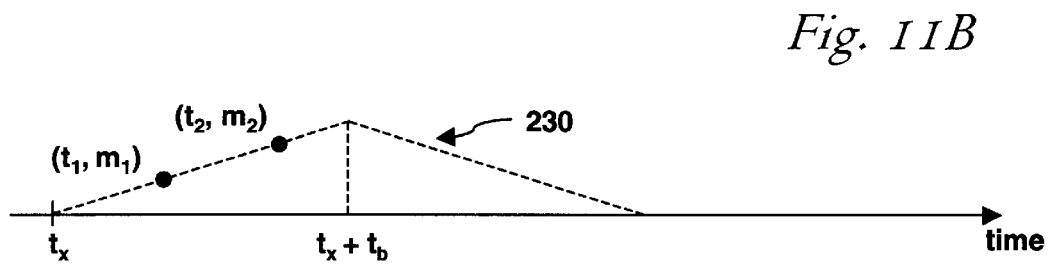
Figure 11C:
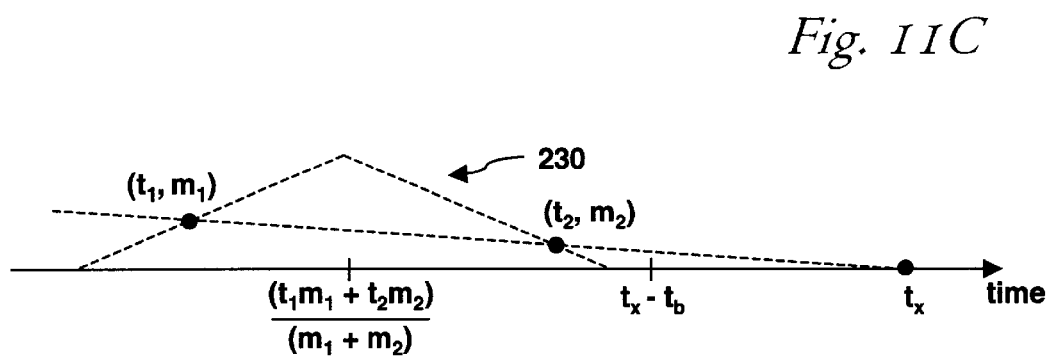
FIGS. 11C and 11D illustrate how the center of the acyclic autocorrelation function is determined using two values which are located on opposite sides of the center of the acyclic autocorrelation function.
Figure 11D:
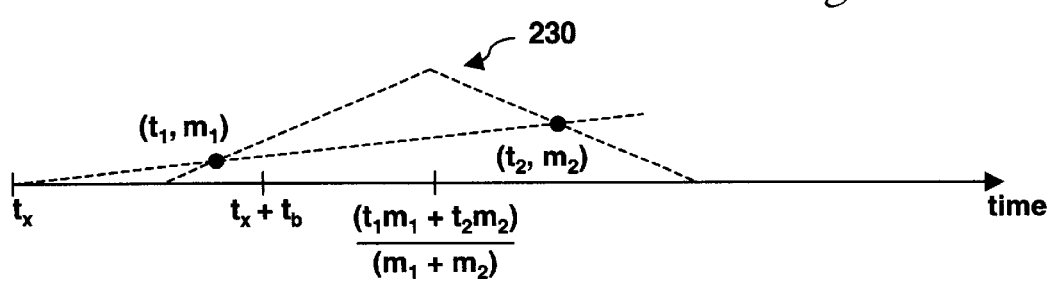

If $(t_x - t_b) < t_1 < t_2 < t_x$, then both measurement times $t_1$ and $t_2$ are on the right side of the acyclic autocorrelation function $\Lambda^a$ 230 and the center of the acyclic autocorrelation function $\Lambda^a$ 230 is located at $(t_x-t_b)$, as shown in FIG. 11A. Similarly, if $t_x<t_1<t_2<(t_x+t_b)$, then both measurement times $t_1$ and $t_2$ are on the left side of the acyclic autocorrelation function $\Lambda^a$ 230 and the center of the acyclic autocorrelation function $\Lambda^a$ 230 is located at $(t_x+t_b)$, as shown in FIG. 11B. However, if $t_1<(t_1-t_b)<t_x$ as shown in FIG. 11C, or $t_{x<(tx}+t_b)<t_2$ as shown in FIG. 11D, then the measurement times $t_1$ and $t_2$ span the maximum of the acyclic autocorrelation function $\Lambda^a$ 230 and the center of the acyclic autocorrelation function $\Lambda^a$ 230 is located at $$(t_1 m_1+t_2 m_2)/(m_1+m_2), \quad (3.6)$$

as shown in FIGS. 11C and 11D. (It should be noted that, as depicted in FIGS. 11A, 11B, 11C, and 11D, the magnitude of the maximum of the acyclic autocorrelation function $\Lambda^a$ 230 may vary, although the width of the acyclic autocorrelation function $\Lambda_a$ 230 is constant. The magnitude of the maximum of the acyclic autocorrelation function $\Lambda_a$ 230 depends on the distance between the two transceivers, which is unknown during the acquisition stage.)

As discussed above, the autocorrelation $\lambda(i)$ of an infinitely repeated series of maximal sequences of length L, if normalized to have a maximum value of L (e.g., due to the periodic nature of the series of sequences, the summation may be taken over only one period of length L), is given by $$\lambda(i)=L \text{ for } (i \bmod L)=0 \text{ and}$$

$$\lambda(i)=-1 \text{ for } (i \bmod L)\neq 0. \quad (4.1)$$

That is, the cyclic autocorrelation $\lambda(i)$ is a repeated series of peaks at regular intervals of L bits (or time $t_m$), with values of −1 between each peak. The off-peak non-zero autocorrelation value of −1 will be termed the 'baseline noise' for maximal sequences and concatenations of maximal sequences.

The autocorrelation of a single finite-length beacon packet 210 must go to zero as the offset approaches the length of the beacon packet, since there is less and less overlap between the beacon packet 210 and the shifted version of itself as the offset increases. Ignoring for the moment phase shifts which are not integer multiples of the bit length L of the small progenitors w which are concatenated to form a beacon packet 210, this is graphically illustrated by the examples of FIGS. 8A and 8B where, for simplicity of depiction, the number M of small progenitors w concatenated to form a beacon packet 210 is five. Both FIG. 8A and FIG. 8B show a first packet 210a of five contiguous small progenitors w, depicted as boxes 511, 512, 513, 514 and 515, next to a second packet 210b of the same five contiguous small progenitors w, depicted as boxes 521, 522, 523, 524 and 525. In FIG. 8A the first and second packets 210a and 210b of maximal sequences 511–515 and 521–525 have no offset, ie., they are aligned with each other. The autocorrelation $\lambda(0)$ is generated by the sum of the product of every bit of the five maximal sequences 511–515 of the first packet 210a with the corresponding bits in the second packet 210b (where bit values of unity and zero and mapped to bit values of unity and negative unity, respectively, prior to calculating the autocorrelation $\lambda$). Therefore, the autocorrelation $\lambda(0)$ has a value of 5*L. In FIG. 8B the second packet 210b of maximal sequences 521–525 is shifted rightwards relative to the first packet 210a of maximal sequences 511–515 by i=2L bits. The autocorrelation $\lambda(2L)$ for this phase shift is generated by sum of the product of every bit of the first three maximal sequences 521, 522 and 523 of the second packet 210b with the corresponding bits in the last three maximal sequences 513, 514 and 515 in the first packet 210a. Therefore, the autocorrelation $\lambda(2L)$ has a value of 3*L. In general, $$\lambda(nL)=[|M-j|]*L, \quad (4.2)$$

when j takes integer values between −M and +M.

The autocorrelation of a finite-length function is termed the acyclic autocorrelation, and is notated as $\Lambda^a$, so as to differentiate from the autocorrelation of an infinitely repeated sequence of a function which is termed the cyclic autocorrelation function and notated as $\Lambda^\infty$. Therefore, as shown in FIG. 6B, from equation (4.2) it follows that the acyclic autocorrelation $\Lambda^a(i)$ of a beacon packet 210 of M maximal sequences of length L is roughly equal to the autocorrelation $\Lambda^\infty$ of an infinite sequence of maximal sequences of length L when modulated by a triangular function which has a maximum value at zero phase shift (i=0) and goes to zero at i=L*M, ie., $$\Lambda^a(i)=\Lambda^\infty(i)[1-(i/L*M)] \text{ for } 0<i\leq L*M \quad (4.3.1)$$

$$\Lambda^a(i)=\Lambda^\infty(i)[1+(i/L*M)] \text{ for } L*M<i\leq 0 \text{ and} \quad (4.3.2)$$

$$\Lambda^a(i)=0 \text{ for } |i|>L*M. \quad (4.3.3)$$

More precisely, the peaks of the acyclic autocorrelation $\Lambda^a$ are modulated by the above-defined triangular function, and between the $j^{th}$ and $(j-1)^{th}$ peaks from the center of the acyclic autocorrelation $\Lambda^a$ the baseline noise has a value of [j−M], plus overhang noise as discussed in detail below. (It should be noted that because the beacon signal 200 is periodic with period $t_c$, the autocorrelation of the series of repeating beacon packets 210 also repeats with period $t_c$. i.e., $$\Lambda^a[i\pm k(t_c/\Delta t)]=\Lambda^a[i], \quad (4.4)$$

where k takes on integer values, and $\Delta t$ is the bit length. However, the time range shown in FIG. 6B is not wide enough to show more than one triangular-enveloped autocorrelation function $\Lambda^a(i)$.)

It should be understood however that the relationships (4.3.1) and (4.3.2) between the acyclic autocorrelation $\Lambda^a(i)$ and the cyclic autocorrelation $\Lambda^\infty(i)$ are not exact equalities due to the effects of 'overhangs.' This is graphically illustrated by the simple examples of FIGS. 9A, 9B and 9C where again, for simplicity of depiction, the number M of concatenated small progenitors w is five. FIGS. 9A, 9B and 9C each show a first group 510 of five contiguous maximal sequences, depicted as boxes 511, 512, 513, 514 and 515, next to a second, shifted group 520 of the same five contiguous maximal sequences, depicted as boxes 521, 522, 523, 524 and 525. In FIG. 9A the second group of maximal sequences 520 is shifted rightwards relative to the first group of maximal sequences by i bit lengths (so that we need not differentiate between the discrete autocorrelation $\lambda$ and the continuous autocorrelation $\Lambda$), where i is less than the length L of the maximal sequences 511–515 and 521–525. Upon bit-by-bit multiplication as required to calculate the autocorrelation $\Lambda(i)$ as per equation (1.10), every bit in the first one 521 of the second group 520 of maximal sequences is adjacent a bit in either the first one 511 or the second one 512 of the first group 510 of maximal sequences. Because the first one 521 of the second group 520 is shifted relative to the first one 511 and the second one 512 of the second group 510, the contribution to the autocorrelation $\Lambda(i)$ from the first one 521 of the second group 520 is negative unity.

Similarly, because the second one 522 of the second group 520 is shifted relative to the second one 512 and the third one 513 of the first group 510 of maximal sequences, the contribution to the autocorrelation Λ(i) from the second one 522 of the second group 520 of maximal sequences is an additional negative unity, and so on. However, the fifth maximal sequence 525 in the second group 520 has a portion 541 which overhangs the fifth maximal sequence 515 in the first group 510 by an amount (L−i). The non-overhanging portion of the fifth maximal sequence 525 in the second group 520 will contribute an overhang noise θ(i) to the autocorrelation Λ(i) which may be as large as min[ i, (L−i)] and, due to the random nature of the bits, the average absolute value of the overhang noise θ(i) will be roughly the square root of min[i, (L−i)].

In FIG. 9B the second group of maximal sequences 520 is shifted rightwards relative to the first group of maximal sequences by (2L+i) bits. The autocorrelation Λ for this phase shift is generated by sum of the product of every bit of the first two maximal sequences 521 and 522 of the second group 520 with the corresponding bits in the first group 510 of maximal sequences, and therefore has a value of −2, plus the contribution of the overhang 541 calculated by taking the product of those bits in the third maximal sequence 523 of the second group 520 with the corresponding bits in the last maximal sequence 515 of the first group 510. Since this overhang 541 is again of length (L−i), the overhang noise θ(i) is the same as that of FIG. 9A. Similarly, in FIG. 9C the second group of maximal sequences 520 is shifted rightwards relative to the first group of maximal sequences by (4L+i) bits, so the autocorrelation λ(j) for this phase shift is only the overhang noise θ(i).

The phase of the repeated sequence used in the beacon signal can affect the magnitudes of the overhang noise θ(i). Therefore, according to the present invention, a phase shift $P^n$ of the small progenitor w is chosen which minimizes the corresponding overhang noise θ($P^n$w, i). According to the preferred embodiment, the total overhang noise $\chi^{(n)}$ for each phase shift $P^n$ is calculated as the sum of the absolute values of the overhang noise θ($P^n$w, i), i.e., $$\chi^{(n)} = \Sigma_i |\theta(P^n w, i)|,$$

and the phase shift $P^n$ which produces the smallest total overhang noise $\chi^{(n)}$ is chosen for use in the beacon signal.

Figure 4B:
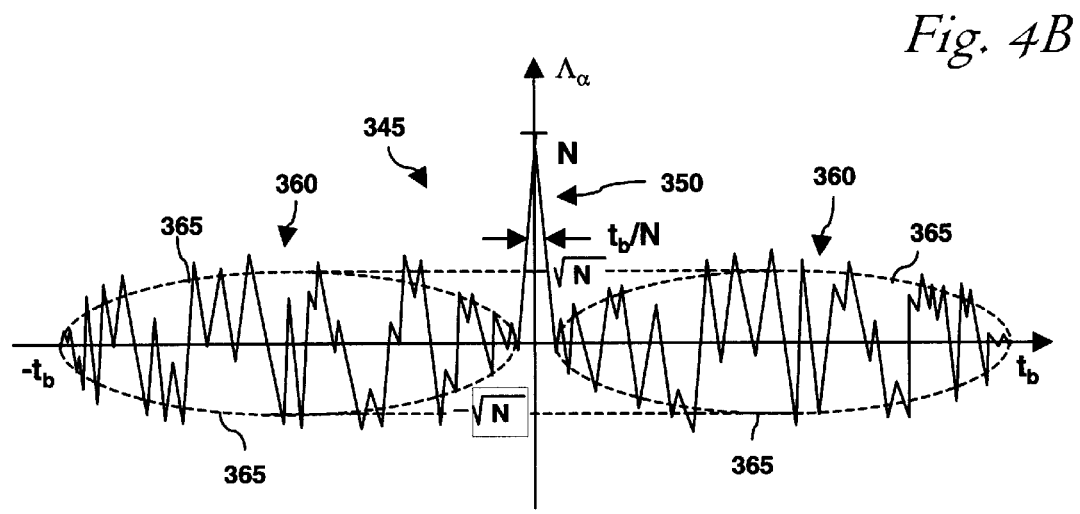
FIG. 4B shows the acyclic autocorrelation function for a beacon packet which consists of a single maximal sequence.
Figure 2:
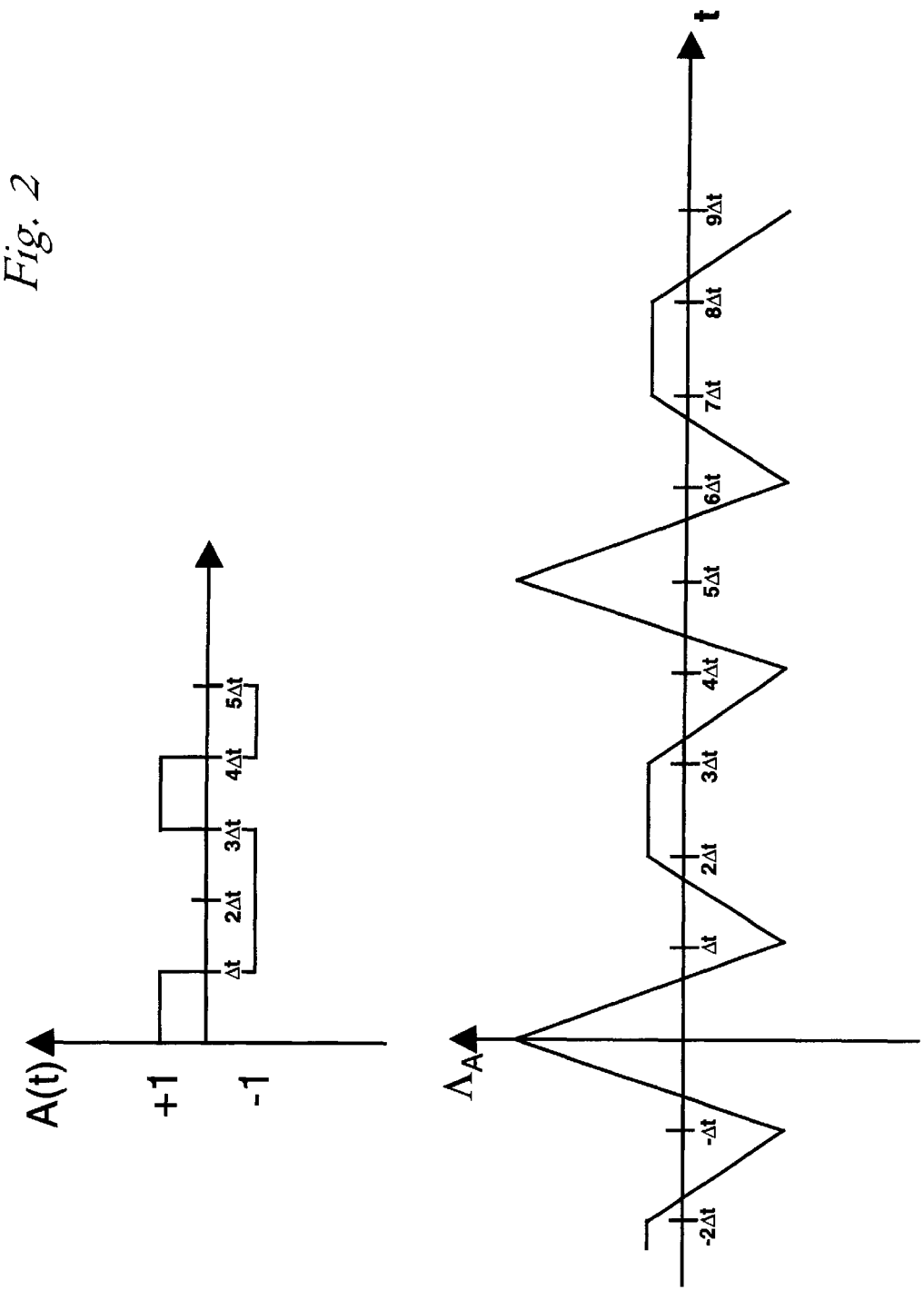
FIG. 2 shows a plot of a continuous cyclic autocorrelation function produced by a function derived from a bit sequence.
Figure 4A:
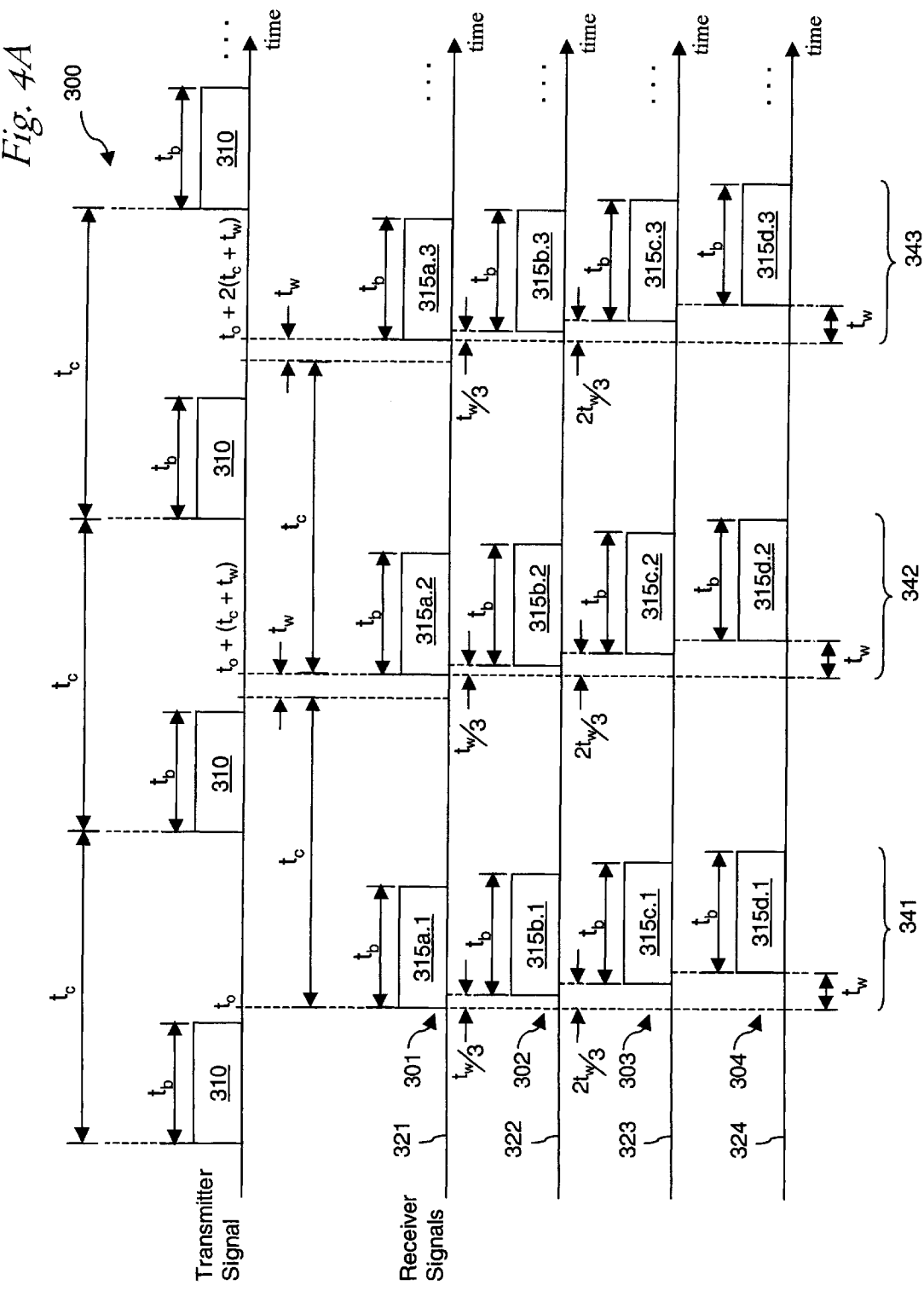
FIG. 4A illustrates how the placement of the reception window is incremented in order to locate the beacon signal which consists of a series of beacon packets transmitted at regular intervals where, contrary to the teachings of the present invention, each beacon packet is a maximal sequence.

The ratio of the magnitude of the peak 350 of the autocorrelation function $\Lambda_\alpha$, 345 of FIG. 4B to the size of the sidelobes 365 may also be improved by shortening or lengthening the internally-generated copy of the group 520 of maximal sequences 521–525 which is used to generate the autocorrelation function $\Lambda_\alpha$ 345. (In the present discussion, the time dimension and the space dimension will be used interchangably, e.g., the earliest internally-generated maximal sequence 521 is also referred to as the leftmost internally-generated maximal sequence 521.) If the internally-generated group 520 of maximal sequences 521–525 is shortened by S bits, the peak 350 of the autocorrelation function $\Lambda_\alpha$ 345 is reduced by S bits. However, the phase used for the maximal sequences 511–515 and 521–525 and the number of S bits by which the internally-generated copy of the group of maximal sequences 520 is shortened may sometimes be chosen such that the overhang noise is also reduced by S or a number close to, and only a little smaller than, S. This can provide a substantial improvement in the signal-to-noise ratio since the percentage change in the overhang noise θ is substantially larger than the percentage change in the signal noise. For instance, consider the situation of FIG. 9D, where, for a particular phase of the maximal sequences 511–515 and 521–525 of the beacon signals 510 and 520, the overhang noise θ(i) has a maximum at a given value i. If the contribution to the autocorrelation function $\Lambda_\alpha$ 345 from the S bits at the lefthand end of the leftmost maximal sequence 521 contribute significantly to make the overhang noise θ(i) large for that problematic amount of overhang i, then the signal-to-noise ratio can be significantly improved by removing S bits from the lefthand side of the leftmost internally-generated maximal sequence 521. Similarly, as depicted in FIG. 9E, improvements in the signal-to-noise ratio may result from truncating the righthand side of the rightmost internally-generated maximal sequence 525 by S bits for a particular phase of the maximal sequences 511–515 and 521–525. Similarly, as depicted in FIG. 9F, improvements in the signal-to-noise ratio may result from appending a final S bits 519 of the maximal sequence to the lefthand side of the leftmost internally-generated maximal sequence 525 bits for a particular phase of the maximal sequences 511–515 and 521–525 as shown in FIG. 9F. Similarly, as depicted in FIG. 9G, improvements in the signal-to-noise ratio may result from appending an initial S bits 526 of a maximal sequence to the righthand side of the rightmost internally-generated maximal sequence 525 for a particular phase of the maximal sequences 511–515 and 521–525. Furthermore, it should be noted that the same results of improving the signal-to-noise ratio may be obtained by shortening or lengthening the transmitted beacon signals in the same manner. (This may be considered to be depicted in FIGS. 9D through 9G as well, if the top groups 510 of maximal sequences 511–515 are considered to be the internally-generated group, and the bottom groups 520 of maximal sequences 521–525, 519 and 526 are considered to be the transmitted groups.)

For a beacon signal 210 which is a concatenation of many, short, complete maximal sequences (i.e., M>>L), the overhang noise θ is small, while the baseline noise (i.e., the off-peak contributions from the cyclic autocorrelation function) is large. Conversely, for a beacon signal 210 which is a concatenation of only a few, long, complete maximal sequences (M<<L), the overhang noise θ is large, while the baseline noise is small. In particular, the baseline noise reaches a maximum magnitude of M near the center of the acyclic autocorrelation function 630, and roughly midway between peaks 235 the overhang noise θ reaches a maximum magnitude of roughly $L^{1/2}$. Therefore, according to the present invention an optimal balance between baseline noise and overhang noise θ is reached when $M \approx L^{1/2}$. For a family of pseudorandom sequences which have a length of $(2^n-1)$, the optimal balance between baseline noise and overhang noise θ is reached when the base sequence has a length of $L \approx 2^{2n/3}$, and the beacon signal consists of a concatenation of $M \approx 2^{n/3}$ repetitions of the base sequence. Furthermore, according to the present invention the length L of the base sequence and the number M of repetitions of the base sequence which form the beacon signal 210 are chosen such that the baseline noise and overhang noise θ are not greater than the maximum magnitude χ of the cross-correlations and off-peak autocorrelations of the sequences in the family. In the case of the Small Kasami sequences where the base sequence is the small progenitor maximal sequence w of length $L \approx 2^{n/2}$, then $M \approx 2^{n/2}$, and, as discussed above, $\chi \approx 2^{n/2}$ for sequences within a Small Kasami family and the small progenitor w of the family. Therefore, in forming the beacon signal 210 from a concatenation of the small progenitor sequence w of the Small Kasami family as taught by the preferred embodiment of the present invention, the baseline noise is about equal to maximum magnitude χ of the cross-correlations and off-peak autocorrelations, and the overhang noise θ is a factor of $2^{n/4}$ smaller than 102. For instance, for n=10 the overhang noise θ is typically 16% as large as the baseline noise and the maximum magnitude χ of the cross-correlations and off-peak autocorrelations.

Figure 10:
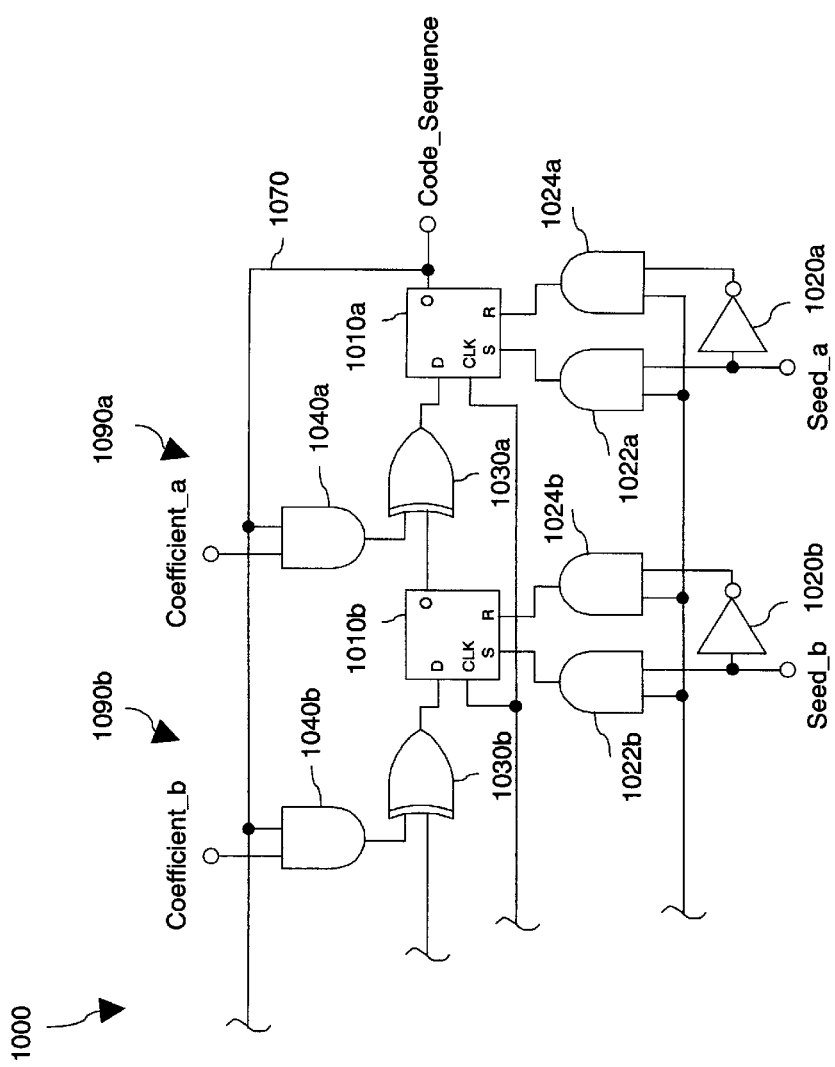
FIG. 10 shows a programmable linear feedback shift register according to the present invention.

According to the present invention, each transceiver utilizes a programmable linear feedback shift register (PLFSR) to allow the transceiver to broadcast or receive a variety of code sequences using a single component. A PLFSR 1000 according to the present invention is shown in FIG. 10. While the first stage 1090n and the last stage 1090a of the PLFSR 1000 are slightly different, each intermediate stage 1090b, 1090c, . . . , and 1090(n−1) of the PLFSR 1000 is configured the same. The first stage 1090n of the PLFSR 1000 (ie., the stage corresponding to the first-most significant-bit of the number stored in the LFSR) consists of D-Q flip-flop 1010n with an XOR gate 1030n feeding the input D of the flip-flop 1010n. The output Q of the flip-flop 1010n is directed to an XOR gate 1030(n−1) in the second stage 1090(n−1) (i.e., the stage corresponding to the second-most significant-bit of the number stored in the LFSR) which feeds the input D of the flip-flop 1010(n−1) in the second stage 1090(n−1). The inputs to the first XOR 1030n are a $\overline{\text{Logic\_0}}$ signal applied on a Logic_0 line 1085 and the output of a feedback AND gate 1040n. A Coefficient_n signal is applied to one input of the feedback AND gate 1040n, and the output Q from the final flip-flop 1010a is applied via a feedback line 1070 to the other input of the feedback AND gate 1040n. A clock signal Clock is applied via clock line 1060 to the clock input CLK on all the flip-flops 1010. (Generic items or the complete set of items of a particular type will be referred to with a reference numeral lacking the letter suffix which identifies a particular stage. Furthermore, generic items from the intermediate stages 1090b–1090(n−1) or the complete set of items of a particular type for the intermediate stages 1090b–1090(n−1) will be referred to with a reference numeral having the letter suffix 'z'.) In each stage 1090, input S and input R are supplied by a pair of AND gates 1022 and 1024 which both have a Load signal applied via a load line 1050 to one input. One AND gate 1022 has a seed signal Seed_applied to the other input, while the other AND gate 1024 receives an inverted version of the seed signal Seed, produced by passing the seed signal Seed_through a NOT gate 1020, applied to the other input.

Similarly, each intermediate stage 1090z of the PLFSR 1000 consists of a D-Q flip-flop 1010z with an XOR gate 1030z feeding the input D of the flip-flop 1010z, and the output Q of the flip-flop 1010z directed to an XOR gate 1030z in the subsequent stage 1090z. The inputs to the XOR 1030z of that stage 1090z are the output of a feedback AND gate 1040z and the output Q of the flip-flop 1010z of the previous stage 1090z. A Coefficient_z signal is applied to one input of the feedback AND gate 1040z, and the output Q from the final flip-flop 1010a is applied via a feedback line 1070 to the other input of the feedback AND gate 1040z.

The final stage 1090a of the PLFSR 1000 also consists of D-Q flip-flop 1010a with an XOR gate 1030a feeding the input D of the flip-flop 1010a. The output Q of the flip-flop 1010a, which is the code sequence Code_Sequence generated by the PLFSR 1000, is supplied to the feedback line 1070 which connects to the inputs of all the feedback AND gates 1040. A Coefficient_a signal is applied to the other input of the final feedback AND gate 1040a. The inputs to the final XOR 1030a are the output of the final feedback AND gate 1040a and the output Q of the flip-flop 1010b of the previous stage 1090b.

The seed applied to the PLFSR 1000 consists of bits from a most significant bit Seed_n to a least-significant bit Seed_a. The most significant bit Seed_n of the seed is applied to one input of AND gate 1022n, and the most significant bit Seed_n of the seed is inverted by inverter 1020n and applied to one input of AND gate 1024n. Similarly, the second-most significant bit Seed_(n−1) of the seed is applied to one input of AND gate 1022(n−1), and the second-most significant bit Seed_(n−1) of the seed is inverted by inverter 1020(n−1) and applied to one input of AND gate 1024(n−1), and so on. While the load signal Load has a value of zero, the outputs of the AND gates 1022 and 1024, which are directed to the S and R inputs of the corresponding flip-flop 1010, also have a value of zero. However, when the load signal Load is raised to a value of one, the outputs of the AND gates 1022 and 1024 directed to the S and R inputs of the corresponding flip-flop 1010 take on the values of the corresponding bit $\overline{\text{Seed}}$ of the seed and its inverse, respectively, thereby loading the flip-flop 1010 with the bit value $\overline{\text{Seed}}$ of the seed.

Figure 3C:
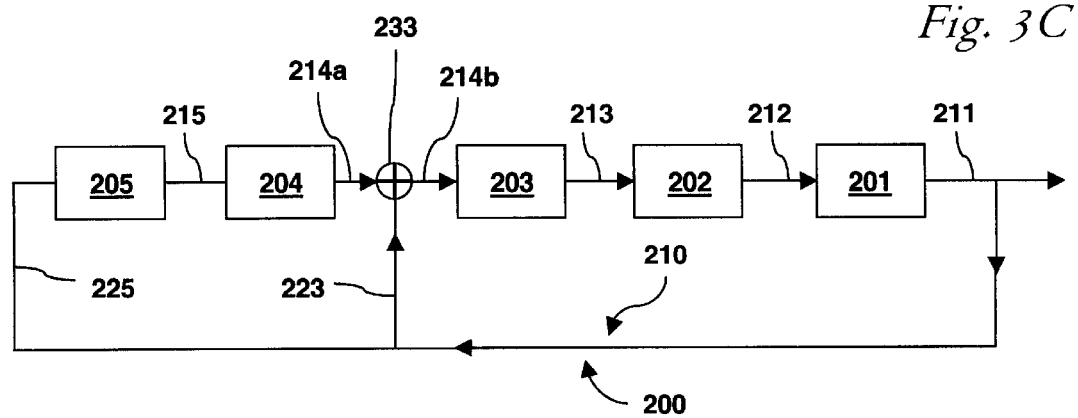
FIG. 3C shows a Galois-type linear feedback shift register.

Upon each rising edge of the clock signal Clock applied to the clock line 1060, the value stored in the first flip-flop 1010n is directed from the output Q to an input on the XOR 1030(n−1) of the next stage 1090(n−1). If the second-most significant bit coefficient Coefficient_(n−1) is zero, then, regardless of the code sequence values Code Sequence applied to the other input of the AND gate 1040(n−1) via the feedback line 1070, the output of the AND gate 1040(n−1) is zero, and the value passed through the second XOR gate 1030(n−1) is the value from the output Q of the most significant-bit flip-flop 1010n. This is equivalent to the relation of the first and second flip-flops 205 and 204 of FIG. 3C, where the output of the first flip-flop 205 is fed directly to the second flip-flop 204. However, if the second-most significant-bit coefficient Coefficient_(n−1) is unity, then the output of the AND gate 1040(n−1) is equal to the code sequence value Code_Sequence on the feedback line 1070, and the value passed through the second XOR gate 1030(n−1) is the exclusive OR of the output Q from the first flip-flop 1010n and the code sequence value CodeSequence. This is equivalent to the relation of the second and third flip-flops 204 and 203 of FIG. 3C, where the output of the second flip-flop 204 is combined with the output of the last flip-flop 201 and directed to the third flip-flop 203.

Similarly, upon the rising edge of the clock signal Clock, the output of the second-most significant-bit flip-flop 1010(n−1) is fed directly to the input D of the third-most significant-bit flip-flop 1010(n−2) if the third-most significant bit of the coefficient Coefficient_(n−2) is zero. However, if the third-most significant bit of the coefficient Coefficient_(n−2) is unity, then the output of the second flip-flop 1010(n−1) is combined with the output Q of the final flip-flop 1010a by an exclusive OR and directed to the third flip-flop 1010(n−2). And so on for each of the succeeding stages 1090a–1090(n−3). It should be noted that the operation of the first stage 1090n differs slightly from the operation of the other stages 1090a–1090(n−1), in that the output of the AND gate 1040n is combined with a logic signal Logic_0 by XOR gate 1030n and directed to the input D of the first flip-flop 1010n. The logic signal $\overline{\text{Logic\_0}}$ is held at a value of zero, so the output of the AND gate 1040n is effectively fed directly to the input D of the first flip-flop 1010n. This is equivalent to the situation shown in FIG. 3C where the output of the last flip-flop 201 is fed directly to the input of the first flip-flop 205.

Bit values of the coefficients Coefficient_1 through Coefficient_n directed to the AND gates 1040 therefore determine which stages include an exclusive OR in a Galois construction LFSR, thereby allowing the programming of the PLFSR 1000 to generate a code sequence Code_Sequence based on a desired generating polynomial. It should also be noted that the PLFSR 1000 can also be made to function as an LFSR having less than n stages. To have the PLFSR 1000 operate as an m-stage LFSR, where m<n, the values in the flip-flops 1010 of the (n−m) most significant bit stages 1090$n$ through 1090(m+1) are held at zero by setting the seeds Seed_n through Seed_(m+1) and the coefficients Coefficient_n through Coefficient_(m+1) to zero. Therefore, the output of the flip-flop 1010(m+1) in the (m+1)$^{th\ stage}$ 1090(m+1) of the PLFSR 1000 is always zero. This is analogous to the function played by the Logic_0 input when the PLFSR 1000 acts as an n-stage LFSR. Furthermore, Coefficient_m is set to zero, so the output of the last flip-flop 1010$a$ is the value received at the D-input of the m$^{th}$ flip-flop 1010$m$.

A C-language program MSeq_Gen.c for generation of primitive polynomials, i.e., polynomials which generate maximal sequences, is provided on pages 53–54 of the present specification. (In the present specification, program names, variable names, and C-language commands are written in bold face type.) In addition, octal representations of primitive polynomials with lengths from two bits (corresponding to order-two polynomials, three-bit binary numbers, and two-stage LFSRs) to sixteen bits (corresponding to order-sixteen polynomials, seventeen-bit binary numbers, and sixteen-stage LFSRs) generated by the program MSeq_Gen.c are provided in the microfiched appendix of the present specification for both Galois construction LFSRs, and their corresponding Fibonacci constructions. (For ease of discussion of the C-language programs herein, a generating polynomial, its binary integer representation, and the corresponding LFSR will be referred to interchangeably.)

The C-language code uses an exhaustive search method to determine all LFSR constructions which generate maximal sequences for bit lengths of n=2 to n=nmax, where nmax is defined to have a value of 16 (line 29). The variable N is set equal to 2n (line 61). For each length n of the LFSR (line 59), the for loop beginning at line 72 investigates all Galois-construction LFSRs corresponding to polynomials of order n for which the coefficient of x$^n$ is unity and the coefficient of x$^0$ is unity, i.e., all odd integers between 2$^n$+1 and 2$^{n+1}$−1. The array hits, which has a length of 2$^n$, will be used to keep track of states occupied by the LFSR. The array hits is initialized such that each entry has a value of FALSE in lines 74–77. It should be noted that the most-significant bit of binary numbers is the leftmost bit, and, to be consistent with that fact, the present specification has elsewhere depicted LFSRs where shifts occur to the right. However, at line 78 the C-language program bit MSeq_Gen.c reverses the bit order of the polynomial poly using a supporting procedure Rev (lines 115–123). This is done for programming convenience, so that left shifts may be used to generate successive LFSR states. The sequence of states lfsr of the LFSR is generated in the for loop beginning at line 79, with the state lfsr of the LFSR being updated (line 81) according to the particular feedback construction Rpoly of the LFSR under investigation. In particular, the state lfsr is updated by an exclusive OR of a left shift of lfsr with a string of zero bits (i.e., the exclusive OR leaves the left-shifted version of lfsr unchanged) if the (pre-shifted) leftmost bit of lfsr is zero. Or, if the (pre-shifted) leftmost bit of lfsr is unity, the state lfsr is updated by an exclusive OR of a left shift of lfsr with Rpoly. The (n+1)$^{th}$ bit is then discarded by an AND with Nmask, which is a string of n unity bits. At the end of each loop of the for loop of line 79, the state lfsr occupied by the LFSR is recorded by setting the value at the corresponding location in the hit array to TRUE. If (line 82) on a pass through the for loop of line 79 it is determined that the state lfsr of the LFSR is a state which has already been reached, then that particular polynomial poly does not generate a maximal sequence, so the for loop is exited (line 83). If the for loop was not exited early via line 83, then the if statement at line 86 determines that i is equal to (N−1), and that particular polynomial poly is recorded to be a primitive polynomial by setting the value of the corresponding entry in the array mseqs to TRUE. After each possible Galois polynomial has been investigated by the for loop beginning at line 72 for lengths from n=2 to 16, the polynomials poly which generated maximal sequences are printed (lines 93–106).

In the C-language program SKSeq_Gen.c provided on pages 55–58 of the present specification, Small Kasami sequences are generated by an exhaustive search method similar to that described above for maximal sequences. In addition, octal representations of polynomials with lengths from six bits to twenty-four bits generated by the program SKSeq_Gen.c are provided in the microfiched appendix of the present specification for both Galois construction LFSRs and their corresponding Fibonacci constructions. As described above, Small Kasami sequences are generated by the product of an order-n primitive polynomial and an order-n/2 primitive polynomial. Although the two primitive polynomials which generate a Small Kasami sequence are related, the C-language code SKSeq_Gen.c implements an exhaustive search by all generating order-n primitive polynomials (line 87) and all order-n/2 primitive polynomials (line 86), taking the Galois product (line 98) and investigating the products to determine which ones produce Small Kasami sequences. The for loop beginning at line 72 investigates polynomial bit lengths n from four to sixteen, and the for loops beginning at lines 94 and 96 cycle through all maximal sequences of size n0 and n, where n0=n/2.

To determine whether the polynomial qKpoly generates a Small Kasami sequence, the program SKSeq_Gen.c tests whether the polynomial qKpoly satisfies two conditions. The first condition, which is tested in the for loop at line 106, and is described above in reference to FIGS. 5A–5C, is that all the cycles of states lfsr generated by the polynomial qKpoly must have a length of N=2$^n$−1, or a length of 2$^{n0}$−1 if the sequence is the small progenitor w. The second condition, which is tested in the for loop beginning at line 142, is that the off-peak values of the autocorrelation of each sequence generated by the polynomial qKpoly must have no values greater than Max_Allowed=2$^{n0}$+1. For ease of explanation, the two conditions are tested in separate for loops in the C-language program SKSeq_Gen.c. However, it should be noted that it would be possible to implement tests of both conditions in a single for loop. As in the program MSeq_Gen.c, for programming convenience the C-language program SKSeq_Gen.c reverses the bit order of the polynomial qKpoly to produce the bit-reversed qRKpoly using a supporting procedure Rev (lines 258–266) so that left shifts can be used to generate successive LFSR states.

Testing of the first condition is begun by setting the first K=2$^{n+n0}$ entries of the array hits to FALSE (lines 106–109), and initializing the state lfsr of the LFSR to n+n0 unity bits, i.e., the binary number K−1 (line 111). The state lfsr of the LFSR is updated at line 113 upon each pass through the for loop beginning at line 111. In particular, at line 113 the state lfsr is updated by an exclusive OR of a left shift of lfsr with a string of zero bits (i.e., the exclusive OR leaves the left-shifted version of lfsr unchanged) if the (pre-shifted) leftmost bit of lfsr is zero. Or, if the (pre-shifted) leftmost bit of lfsr is unity, the state lfsr is updated by an exclusive OR of a left shift of lfsr with qRKpoly. The $(n+n0+1)^{th}$ bit is then discarded by an AND with Kmask, which is a string of $n+n0$ unity bits. The array hits is used to record which states lfsr the LFSR has already taken. If the state lfsr has not been reached before, then at line 114 it is determined that the value of hits[lfsr] is FALSE, so the statements in the braces between lines 116 and 126 are bypassed, and hits[lfsr] is set to have a value of TRUE at line 127. However, if it is determined at line 114 that the value of hits[lfsr] is TRUE, then the state lfsr has been reached before, and so at line 116 it is tested whether the state lfsr has returned to the seed value polyStart, and whether the LFSR has cycled through $2^n-1$ or $2^{n0}-1$ states.

If the number of states that the LFSR has cycled through is not $2^n-1$ or $2^{n0}-1$, or if the state lfsr which has been returned to is not polyStart, then the polynomial qKpoly does not generate Small Kasami sequences. When this happens, that iteration of the for loop beginning at line 111 is exited via the break at line 125 with a values of i and polyStart that are not equal to zero, the if condition of line 133 is true, and so the program returns to line 96 via the continue at line 135, and another polynomial qKpoly is tested by another pass through the for loops beginning at lines 94 and 96 to determine whether it generates Small Kasami sequences. However, if the number of states lfsr that the LFSR has cycled through is $2^n-1$ or $2^{n)}-1$, then it is possible that the polynomial qKpoly does generate Small Kasami sequences, and so a new seed value polyStart is selected (line 119) by repeatedly decrementing polyStart, and testing the value of hits[polyStart] until it has a value of FALSE. When the value of hits[polyStart] is FALSE, then the state lfsr is set to have a value of polyStart, and hits[lfsr] is set to have a value of TRUE at line 121, i will be set to a value of negative unity at line 122, and the continue at line 123 sends control back to the top of the for loop beginning at line 111 (i.e., the new value of polyStart is used as the seed) where i will be incremented to have a value of zero.

When there have been enough passes through the for loop beginning at line 111 that the LFSR has reached all state values from unity to $K-1=2^{n+n0}-1$, then upon repeated decrements of polyStart at line 119 the value of polyStart will reach a value of zero. In this case, the state lfsr will be set to zero at line 121, and the continue statement of line 123 will return control to the top of the for loop beginning at line 111. Since lfsr has a value of zero, the for loop beginning at line 111 will be exited, and since polyStart and i do both have values of zero, the continue statement at line 135 will not be reached, and control will proceed to the test of sieve 3 for the polynomial qRKpoly under investigation.

Testing in sieve 3 of the second condition begins by again setting the first $K=2^{n+n0}$ entries of the array hits to FALSE (lines 142–145), and initializing the state lfsr of the LFSR to $K-1$ (line 146). The state lfsr of the LFSR is updated at line 149 upon each pass through the for loop beginning at line 146 in the same manner as discussed above for Sieve 1. Because the autocorrelation is to be calculated, for each iteration through the for loop beginning at line 146 the leftmost bit of the state lfsr of the LFSR is stored in the array Seq at line 148. For convenience in calculating the autocorrelation, a copy of the bit values from Seq[0] to Seq[n−2] is stored from Seq[n−1] to Seq[2n−3]. It should be noted that at line 148 bit values of unity and zero in the LFSR are mapped to values of positive unity and negative unity, respectively, in the array Seq for the purpose of calculating the autocorrelation. The array hits is used to record which states lfsr the LFSR has already taken. If the state lfsr has not been reached before, then at line 150 it is determined that the value of hits[lfsr] is FALSE, so hits[lfsr] is set to have a value of TRUE at line 176, and the next state lfsr of the LFSR is generated.

However, if it is determined at line 150 that the value of hits[lfsr] is TRUE, then the state lfsr has been reached before, and so at line 152 it is tested whether the state lfsr has returned to the seed value polyStart, and the LFSR has cycled through $2^n-1$ or $2^{n0}-1$ states. This should be the case since Sieve 1 has already insured that both these conditions will be satisfied whenever a cycle is completed, so now the array Seq stores two copies of a complete Small Kasami sequence. Autocorrelation values ACorr are calculated at lines 158–161 for each offset i from unity to (Ncycle-1), where Ncycle is the length of the cycle (line 155). Upon completion of the for loop beginning at line 158, the autocorrelation ACorr for an offset of i is equal to $$ACorr = \sum_{j=0}^{Ncycle} Seq(j)*Seq(i+j),$$

where Ncycle is equal to (Nsqrt−1) or (n−1) depending on whether a standard Small Kasami sequence or the small progenitor w, respectively, is under investigation. If for any offset i, the autocorrelation value ACorr is greater than Max_Allowed, which has a value of $2^{n0}+1$, then the polynomial qKpoly does not produce Small Kasami sequences, so the for loop beginning at line 146 is exited via a break at line 163 and a break at line 166, and another iteration of the for loop beginning at line 96 is performed to investigate whether another polynomial qKpoly generates Small Kasami sequences. However, if for each offset i, the autocorrelation value ACorr is less than or equal to Max_Allowed, then the polynomial qKpoly may produce Small Kasami sequences, so another sequence generated from polynomial qKpoly is investigated by decrementing polyStart at line 168 until a value of polyStart is found for which hits[polyStart] is FALSE (i.e., the polyStar$^{th}$ entry in hits has not been reached by any of the cycles of the LFSR yet investigated). Then, the state lfsr of the LFSR is set to have the value polyStart at line 170, hits[lfsr] is set to have a value of TRUE at line 170, i will be set to a value of negative unity at line 171, and the continue at line 172 sends control back to the top of the for loop beginning at line 146 (i.e., the new value of polyStart is used as the seed) where i will be incremented to have a value of zero.

If for each offset i, the autocorrelation value ACorr was determined to be less than or equal to Max_Allowed at lines 162 and 165, and if there have been enough passes through the for loop beginning at line 146 that the LFSR has reached all state values from unity to $K-1=2^{n0}-1$, then upon repeated decrements of polyStart at line 168 its value will reach zero. In this case, the state lfsr will be set to zero at line 170, and the continue statement of line 172 will return control to the top of the for loop beginning at line 146. Since lfsr has a value of zero, the for loop beginning at line 146 will be exited, and control will proceed to line 178 where it will be determined that polyStart and i do both have values of zero, the continue statement at line 180 will not be reached, and control will proceed to lines 186 through 191 where the polynomial qKpoly will be printed since it has passed the tests which determine whether it is a Small Kasami code. After the printing of a Small Kasami code, another polynomial qKpoly is tested if the tests at the beginning of the for loops at lines 96 and 94 determine that mseq_n remains less than Large and mseq n0 remains less than Small, respectively.

In the C-language program LKSeq_Gen.c provided on pages 59–62 of the present specification, Large Kasami sequences are generated by an exhaustive search method similar to that described above for Small Kasami sequences. In addition, octal representations of polynomials with lengths from ten bits to twenty-five bits generated by the program LKSeq_Gen.c are provided in the microfiched appendix of the present specification for both Galois construction LFSRs, and their corresponding Fibonacci constructions. As described above, Large Kasami polynomials are generated by the product of three polynomials h(x), h'(x) and h"(x), where h(x) is a primitive polynomial of degree n (where n is even) which generates a maximal sequence u, h'(x) is a primitive polynomial of degree n/2 which generates a maximal sequence w produced by decimation of u by $(2^{n/2}+1)$, and h"(x) is a primitive polynomial of degree n which generates a maximal sequence v produced by decimation of u by $(2^{(n+2)/2}+1)$. However, as noted above, the C-language code LKSeq_Gen.c implements an exhaustive search for Large Kasami and Large Kasami-like codes by generating all order-n primitive polynomials (line 98), all order-n/2 primitive polynomials (line 97), and all order-n polynomials (line 105), whether primitive or not, and taking their Galois product (lines 117–119). In particular, the for loop beginning at line 105 cycles through all odd order-n polynomials XSeqs_Large, since, as mentioned in the text following equation (2.3), all LFSR polynomials have a unity coefficient for the order-n term and a unity coefficient for order-0 term. In the for loop at lines 107–108, a flag XSeq_is_MSeq is set if the order-n polynomial XSeqs_Large is a primitive polynomial by testing if the order-n polynomial XSeqs_Large is equal to any of the maximal sequences MSeqs_Large[i]. If none of the maximal sequences MSeqs_Large[i] is equal to the order-n polynomial XSeqs_Large, then the end of the series of values stored in the maximal sequences array MSeqs_Large is reached, so MSeqs_Large[i] has a value of zero, and the for loop at lines 107–108 terminates without having set the flag XSeq_is_MSeq. The number of order-n primitive polynomials is Large (line 98), and the number of order-n0 primitive polynomials is Small (line 97), where n0=n/2. The for loop beginning at line 110 cycles through all Large of the order-n primitive polynomials, and the for loop beginning at line 115 cycles through all Small of the maximal sequences of size n0. However, the for loop beginning at line 110 is exited via the continue statement at line 113 if the flag XSeq_is_MSeq has been set and the current order-n polynomial MSeqs_Large has a value less than or equal to XSeqs_Large as tested at lines 107–108, thereby avoiding redundant investigations since Galois multiplication is commutative and three different polynomials are required.

To determine whether the polynomial qKpoly generates a Large Kasami or Large Kasami-like sequence, the program LKSeq_Gen.c tests whether the polynomial qKpoly satisfies two conditions. The first condition, which is tested in the for loop beginning at line 132, is that the majority of sequences generated by the polynomial qKpoly have a length of n−1, where $N=2^n$. In particular, the program LKSeq_Gen.c tests whether at least $15/16^{ths}$ of the sequences generated by the polynomial qKpoly have a length of N−1. It should be noted that this first condition differs somewhat from the first condition used in testing for Small Kasami sequences in the program SKSeq_Gen.c, where all but one of the sequences has a length of $2^n-1$, and one sequence has a length of $2^{n/2}-1$. In the case of Large Kasami-like codes, it has been found that in cases where n is even but not divisible by four, polynomials which satisfy the correlation properties discussed above for standard Large Kasami sequences also produce a relatively small number of sequences of other lengths, although the majority of sequences produced by Large Kasami-like polynomials are of length N−1. Using the program LKSeq_Gen.c it has been found that a small number of sequences, in addition to the small progenitor sequence w of length $2^{n/2}-1$, are produced by Large Kasami-like polynomials when (n+2) is divisible by four. For (n+2) divisible by four, those polynomials which are produced by the program LKSeq_Gen.c, but are not produced according to the mathematics of "Crosscorrelation Properties of Pseudorandom and Related Sequences," by Dilip V. Sarwate & Michael B. Pursley, Proceedings of the IEEE, Vol. 68, No. 5, May 1980, are not marked with asterisks in the microfiched appendix. (For n divisible by four, all polynomials produced by the program LKSeq_Gen.c are standard Large Kasami polynomials, and none of them are marked with asterisks.) It should also be noted that the particular ratio close to but less than unity (in this case, $15/16$) which is used in the program LKSeq_Gen.c is somewhat arbitrary. The second condition, which is tested in the for loop beginning at line 174, is whether at least $15/16^{th}$ f the off-peak values of the autocorrelation of the sequences generated by the polynomial qKpoly have values less or equal to the Large Kasami limit Max_Allowed=$2^{n/2+1}+1$. For ease of explanation, the two conditions are tested in separate for loops in the C-language program LKSeq_Gen.c. However, it should be noted that it would be possible to implement tests of both conditions in a single for loop. As in the program SKSeq_Gen.c, for programming convenience the C-language program LKSeq_Gen.c reverses the bit order (line 131) of the polynomial qKpoly to produce the bit-reversed qRKpoly using a supporting procedure Rev (lines 290–298) so that left shifts may be used to generate successive LFSR states.

Testing of the first condition is begun by setting the first K entries of the array hits to FALSE at lines 126–129, and initializing the state lfsr of the LFSR at line 132 to 2n+n0 unity bits, i.e., the binary number K−1. (At lines 87 and 88, the variable K has been assigned a value of $2^{2n+n0}$, the number of states available to two n-bit shift registers, and an n0-bit shift register.) The state lfsr of the LFSR is updated at line 134 upon each pass through the for loop beginning at line 132, as was done in the program SKSeq_Gen.c. The array hits is used to record which states lfsr the LFSR has already taken, and the variable polyStart is the beginning state of a cycle. If the state lfsr has not been reached before, then at line 135 it is determined that the value of hits[lfsr] is FALSE, and the state lfsr is not equal to polyStart, so the statements in the braces between lines 136 and 156 are bypassed, and hits[lfsr] is set to have a value of TRUE at line 157. However, if it is determined at line 135 that the value of hits[lfsr] is TRUE, or the state lfsr is equal to polyStart, then the state lfsr has been reached before, and so the length of the cycle is investigated. At line 138 it is tested whether the length Ncycle of the current cycle is equal to $2^n-1$. If so, then the variable N1cycles, which counts how many cycles of length $2^n-1$ have occurred, is incremented by unity, and the variable N1cycleStates, which tallies the sum of the lengths of all the cycles of length $2^n-1$, is incremented by $2^n-1$. Otherwise, if the length Ncycle of the current cycle is not equal to $2^n-1$, then the variable notN1cycles, which counts how many cycles of lengths other than $2^n-1$ have occurred, is incremented by unity, and the variable notN1cycleStates, which tallies the sum of the lengths of all the cycles of lengths other than $2^n-1$, is incremented by the length Ncycle of the current cycle. At line 148, it is then tested whether N1cycleStates, the number of states lfsr which have been in cycles of size $2^n-1$, is greater than or equal to N1threshold, which has been assigned a value of $(^{15}\!/_{16})*2^{2n+n0}$, at line 93. On line 149, in the same if statement, it is also tested whether notN1cycleStates, the number of states lfsr which have not been in cycles of size $2^n-1$, is greater than or equal to notN1threshold, which has been assigned a value of $(^1\!/_{16})*2^{2n+n0}$ at line 94. If either of these conditions is TRUE, then a decision can be made as to whether the polynomial qKpoly generates Large Kasami or Large Kasami-like sequences, so that iteration of the for loop beginning at line 132 is exited via the break at line 150. If the if condition of line 159 is TRUE, then the for loop beginning at line 132 was not exited via the condition at line 148 (but may have been exited via the condition at line 149), so the program returns to line 115 via the continue at line 160, and another polynomial qKpoly is tested by another pass through the for loops beginning at line 160. However, if the condition tested at lines 148–149 is FALSE, then it has not yet been determined whether the condition of Sieve 1 has been satisfied, and so a new seed value polyStart is selected at line 151 by repeatedly decrementing polyStart and testing the value of hits[polyStart] until it has a value of FALSE. When the value of hits[polyStart] is FALSE, then another pass through the for loop beginning at line 132 is performed using the new value of polyStart as the seed. If, upon exiting the for loop beginning at line 132 naturally at line 158, the variable N1cycleStates, which tallies the sum of the lengths of all the cycles of length $2^n-1$, is greater than N1threshold, then the condition of Sieve 1 has been satisfied and control continues on to the condition of Sieve 2 which begins at line 166.

Testing in Sieve 2 of the second condition begins by again initializing the first $K=2^{2/n+n0}$ entries of the array hits to FALSE (lines 166–169), and initializing the first $2^n$ entries of the array ACorrs which stores autocorrelation values to zero (lines 170–173). The state lfsr of the LFSR is updated at line 177 upon each pass through the for loop beginning at line 174 in the same manner as discussed above for Sieve 1 of the program SKSeq_Gen.c. Because the autocorrelation is to be calculated, for each iteration through the for loop beginning at line 174 the leftmost bit of the state lfsr of the LFSR is stored in the array Seq at line 176 as a value of positive unity or negative unity if the state value lfsr is unity or zero, respectively. If the state lfsr has not been reached before, then at line 178 it is determined that the value of hits[lfsr] is FALSE and the state lfsr is not equal to polyStart, so hits[lfsr] is set to have a value of TRUE at line 201, and the next state lfsr of the LFSR is generated.

However, when it is determined at line 178 that a cycle has been completed, then, for convenience in calculating the autocorrelation, at lines 181–182 a copy of the sequence of bit values from Seq[0] to Seq[Ncycle-1] is stored in the array Seq from Seq[Ncycle] to Seq[2*Ncycle-1], where Ncycle is the length of the cycle (line 180). Autocorrelation values ACorr are calculated at lines 184–191 for each offset i from unity to (Ncycle-1), as discussed above in the discussion of the program SKSeq_Gen.c. The largest autocorrelation value for a cycle is stored as the variable localMax (line 190), and, upon completion of each cycle, at line 192 the values of localMax are tallied in the array ACorrs, where the $j^{th}$ entry of ACorrs, for $j<2^n$, is the number of autocorrelations of magnitude j which have occurred. To reduce the computation time, only a fraction of the cycles are investigated by providing an early termination of the for loop beginning at line 174 via the break at line 194 when the number numACorrs of cycles is greater than ACorrSamples, which is set at line 95 to have a value of $2^n$, resulting in cutting the computation time by a factor of $2^{n/2}$. If a break at line 194 is not performed, then another sequence generated from polynomial qKpoly is investigated by decrementing polyStart at line 195 until a value of polyStart is found that is greater than zero and for which hits[polyStart] is FALSE (i.e., the polyStart$^{th}$ entry in hits has not been reached by any of the cycles of the LFSR yet investigated), setting the state lfsr of the LFSR to polyStart and the entry polyStart of hits to TRUE at line 197, and starting another pass through the for loop beginning at line 174 via the continue statement at line 199.

When the for loop beginning at line 174 has been exited via the break at line 194, the number AboveCount of entries of the array ACorrs which are larger than Max_Allowed, which has a value of $2^{n/2+1}+1$, and the number BelowCount of entries of the array ACorrs which are less than or equal to Max_Allowed are tabulated in the for loop beginning at line 204. Since, as discussed above, it has been found that the exhaustive search method of the program LKSeq_Gen.c produces some codes which are of length $(2^n/p-1)$, where p is a prime integer which evenly divides $2^n$, the program LKSeq_Gen.c requires that the majority, but not all, of the sequences produced by the polynomial qKpoly have maximum off-peak autocorrelation values less than the limit Max_Allowed. Therefore, if the number BelowCount of entries of the array ACorrs which were less than or equal to Max_Allowed is not at least fifteen times greater than the number AboveCount of entries which were larger than Max_Allowed, then it is determined that the polynomial qKpoly does not generate Large Kasami or Large Kasami-like sequences, and, via the continue at line 212, another polynomial is investigated. However, if BelowCount is at least fifteen times greater than AboveCount, then it is determined that the polynomial qKpoly does generate Large Kasami or Large Kasami-like sequences, and so that polynomial qKpoly is printed at lines 217–225.

The foregoing descriptions of specific embodiments of the present invention have been presented for purposes of illustration and description. They are not intended to be exhaustive or to limit the invention to the forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many variations are within the scope of the present invention. For instance: the length of the time window may be longer than the length of the small progenitor w; maximal sequences may be used to generate other types of pseudo-random codes, such as Large Kasami codes, Gold codes, Gold-like codes, Dual-BCH codes, etc.; the transmission codes need not be strings of binary digits, e.g., the transmission codes may be strings of three-valued or four-valued digits; the autocorrelation of the beacon packets may have a non-triangular envelope; a beacon packet may be composed of a series of base sequences which are not maximal sequences, and the cyclic autocorrelation of the base sequences may have more than one peak per period and/or a central peak with a greater width; only receptions from an interior portion of each time window may be used if measurements using the exterior portions of the time windows are deemed to be inaccurate or unreliable, thereby decreasing the effective width of the time windows; the location of the center of the acyclic autocorrelation of the beacon signal can be calculated from the magnitude of the peaks of the acyclic autocorrelation using any of a variety of methods; once the beacon signal is located, the peaks of the acyclic autocorrelation function can be obtained in any of a variety of orders, such as by starting at the beginning or end of the acyclic autocorrelation function; the location of the center of the acyclic autocorrelation of the beacon signal can be calculated from as few as two peak magnitudes; the beacon signal can be composed of more than one progenitor of a Small Kasami code; other functions may be used to calculate the total overhang noise based on the overhang noise for various amounts of overhang; the computer programs used to generate the maximal sequences, Small Kasami codes or Large Kasami codes may differ from those described herein; differential logic may be used in the programmable linear feedback shift register to minimize noise; etc. In summary, it is intended that the scope of the invention be defined by the Claims appended hereto and their equivalents.

```c
//***********************************************************************************/
// FILE:            MSeq_Gen. c
// AUTHORS:         Bob Fleming, Cherie Kushner
// DATE:            18 April 2000
// DESCRIPTION:     Generate all Maximal Sequence Polynomials for n=2 thru 16
//                  (ie. with periods from (2 ^ 2) - 1 = 3 thru (2 ^ 16) -1 = 65535).
//***********************************************************************************/
#include <stdio.h>
#include <string.h>
#include <stdlib.h>
//==========================
#define INT8         char
#define UINT8        unsigned char
#define INT16        short
#define UINT16       unsigned short
#define INT32        long
#define UINT32       unsigned long
#define INT          int
#define UINT         unsigned int
#define TRUE         1
#define FALSE        0
//==========================
#define FNAME        "Maximal Sequences.txt"
#define nmax         16                   // Size of largest MSeq, in bits.
#define NMAX         (1<<(nmax))          // 'N' for largest MSeq (ie. 2 ^ nmax).
INT8                 hits [NMAX];         // Tally of 'used' LFSR register states.
INT8                 mseqs [NMAX];        // Tally of acceptable maximal sequences.
// Supporting Procedure functional prototypes
UINT32    Rev(UINT32, INT);               // Bit-reverse binary number.
void      PrintLine(INT8 *, INT8 *);      // Print a line to StdOut and to named file.
/*****************/
/** Main Program **/
/*****************/
main(int argc, char *argv[ ], char *envp[ ])
{
    INT           i, poly, Rpoly, lfsr;
    INT           n, N, Ndiv2, Nmask;
    UINT32        MCount, Digits;
    INT8          filename[256], buf0[256], buf1[256];
    if (argc > 1)                         // Setup "filename" to command line argument
      strcpy(filename, argv[1]);          // if there is one; or
    else                                  // to FNAME if no command argument.
      strcpy(filename, FNAME):            //  /
    PrintLine(filename, " ");             // Flush any existing file by that name.
    for (n=2; n<=nmax; n++)               // Go thru n from 2 thru 16.
    {
       N     = 1<<n;
       Ndiv2 = N>>1;
       Nmask = N-1;
       sprintf(buf1, " %d-bit Maximal Sequences:   ", n);
       PrintLine(filename, buf1);
       for (i=0; i<N; i++)
       {
         mseqs[i] = FALSE;                // Initialize acceptable mseq array to FALSEs.
       }
       for (poly=N+1, MCount=0; poly<2*N; poly+=2)   // Go thru all possible polynomials of n bits.
       {
          for (i=0; i<N; i++)
          {
            hits[i] = FALSE;              // Initialize hit array to FALSEs.
          }
          Rpoly = Rev(poly, n+1);
          for (i=0, lfsr=N-1; i<(N-1); i++)
          }                               // Galois formulation of LFSR.
```

```
            lfsr = (lfsr << 1) ^ ((lfsr & Ndiv2)? Rpoly:0)) & Nmask;      // Update LSFR value.
            if (hits[lfsr])                                 // If State is repeated, leave loop.
               break;
            hits[lfsr] = TRUE;                              // Else, knock off latest State.
         }
         if (i==(N-1))                                     // Did we just have (N-1)-bit subcycle?
         {
            mseqs[poly-N] = TRUE;                           // Yes; indicate acceptable mseq (Galois form),
            ++MCount;                                       // and update total count.
         }
      }
      Digits = sprintf(buf0, "%d", MCount);
      sprintf(buf0, "MSeq #%%%dd = %%oog / %%oof ", Digits);
      for (poly=N+1, i=1; poly<2*N; poly+=2)
      {
         if (mseqs[poly-N])                                 // Print out all acceptable mseq's for n.
         {
            sprintf(buf1, buf0, i++, poly, Rev(poly, n+1));
            PrintLine(filename, buf1);
         }
      }
   }
   return 0;
}
//*************************************************************************************/
// Supporting Procedures.
//*************************************************************************************/
// Bit-reverse binary number.
UINT32 Rev(UINT32 data, INT size)
{
   INT     i;
   UINT32  temp;
   for (i=temp=0; i<size; i++, data>>=1)
      temp = (temp<<1) + (data & 1);
   return (temp);
}
// Print out line both to stdout and to "filename", closing file to force an immediate write.
void PrintLine(INT8 *filename, INT8 *string)
{
   FILE    *stream;
   if (*string == 0)
   {
      stream = fopen(filename, "w");       // Flush any exisiting file by that name.
   }
   else
   {
      stream = fopen(filename, "a");       // Re-open the file,
      fprintf(stream, string);             // add the latest line to it, and
   }                                       // /
   flcose(stream);                         // close the file to force file-writing.
   printf(string);                         // Send the string to stdout, as well.
}
//*************************************************************************************/
// FILE:          SKSeq_Gen.c
// AUTHORS:       Bob Fleming, Cherie Kushner
// DATE:          1 May 2000
// DESCRIPTION:   Generate all Small Kasami Polynomials which can be used with a 25-bit LFSR.
//*************************************************************************************/
#include <stdio.h>
#include <string.h>
#include <stdlib.h>
//==========================
#define INT8         char
#define UINT8        unsigned char
#define INT16        short
#define UINT16       unsigned short
#define INT32        long
#define UINT32       unsigned long
#define INT          int
#define UINT         unsigned int
#define TRUE         1
#define FALSE        0
#define min(a,b)     (((a)<(b)) ? (a):(b))
#define max(a,b)     (((a)>(b)) ? (a):(b))
#define abs(a)       (((a)<0) ? (-a):(a))
//==========================
#define FNAME        "SmallKasamiCodes.txt"
#define nmax         16             // Size of largest MSeq
#define NMAX         (1<<(nmax))    // 'N' for largest MSeq
```

-continued

```
#define KMAX        (1<<(nmax=(nmax/2)))    // 'N' for largest Small KSeq (=K)
INT8     hits [KMAX];                        // Tally of 'used' LFSR register states.
INT8     Seq [NMAX*2];                       // Twice-repeated Kasami code seq. values, for Autocorrelation.
UINT32   MSeqs_Small[NMAX/8],                // Storage for Small Maximal Sequence progenitor polynomials.
         MSeqs_Large[NMAX/8];                // Storage for Large Maximal Sequence progenitor polynominals.
INT8     Digits[(nmax/2)+1] = {0, 0, 1, 1, 2, 2, 3, 3, 4};
// Supporting Procedure functional prototypes
INT      MSeqs_Gen(INT, UINT32(*));          // Generate all Maximal Sequences for given n.
UINT32   Galois_Mult(UINT32, UINT32);        // Perform GF(2) Multiplication of 2 binary numbers.
UINT32   Rev(UINT32, INT);                   // Bit-reverse binary number.
void     PrintLine(INT8*, INT8*);            // Print a line to StdOut and to named file.
/*****************/
/** Main Program **/
/*****************/
main(int argc, char *argv[ ], char *envp[ ])
{
    INT      i, j, n0, n, k;
    INT      Small, Large, mseq_n0, mseq_n;
    UINT32   N, Nmask, Nsqrt;
    UINT32   K, Kmask, Kdiv2;
    UINT32   lfsr, qKpoly, qRKpoly, polyStart, Ncycle;
    INT      kCount, ACorr, Max_Allowed;
    INT8     filename[256], buf0[256], buf1[256];
    if (argc > 1)                                       // Setup "filename" to command line argument
        strcpy(filename, argv[1]);                      // if there is one; or
    else                                                // to FNAME if no command argument.
        strcpy(filename, FNAME);                        // /
    PrintLine(filename, " ");                           // Flush any existing file by that name.
    for (n0=2; n0<=(nmax/2); n0++)                      // Go thru all possible Small Kasami polynomials
    {                                                   // that fit in a LFSR register of (3/2)*nmax bits.
        n     = 2*n0;                                   // Initialize size paramters, all derived from n0.
        N     = 1<<n;                                   //           /
        Nsqrt = 1<<n0;                                  //          /
        Nmask = N-1;                                    //         /
        k     = n + n0;                                 //        /
        K     = 1<<k;                                   //       /
        Kdiv2 = K>>1;                                   //      /
        Kmask = K-1;                                    //     /
        kCount = 0;
        Small = MSeqs_Gen(n0, &MSeqs_Small[0]);         // Generate all n-bit Small MSeqs.
        Large = MSeqs_Gen(n, &MSeqs_Large[0]);          // Generate all 2n-bit Large MSeqs.
        Max_Allowed = (1<<n0) + 1;                      // Max sidelobe allowed for Small Kasami codes.
        springf(buf1, " %d-bit Small Kasami Sequences (%d x %d):  ", k, n, n0);
        PrintLine(filename, buf1);
        for (mseq_n0=0; msez_n0<Small; mseq_n0++)       // Go thru all small MSeqs.
        {
            for (mseq_n=0; mseq_n<Large; mseq_n++)      // Go thru all large MSeqs.
            {
                qKpoly = Galois_Mult(MSeqs_Small[mseq_n0],      // qKpoly is potential
                                     MSeqs_Large[mseq_n]);       // Small Kasami polynomial.
//*********************************************************************************************/
// Sieve 1: Go thru sub-cycles of qKpoly-generated LFSR, looking for all (N-1)-length sequences,
// except for the one (N/2-1)-length Maximal sequence progenitor.
// If there are any exceptions, loop to try next potential Small Kasami polynomial.
//*********************************************************************************************/
                for (i=0; i<K; i++)
                {
                    hits [i] = FALSE;                   // Start with no hits for any LFSR value.
                }
                qRKpoly = Rev(qKpoly, k+1);             // qRKpoly = left-shifting-LFSR vers of Galois poly.
                for (i+0, hits[lfsr=polyStart=K-1]=TRUE; (i<N-1)&&(lfsr!=0); i++)
                {                                       // Loop thru all states of K-bit LFSR
                    lfsr = ((lfsr<<1) ^ ((lfsr & Kdiv2) ? qRKpoly:0)) & Kmask;  // Update LSFR value.
                    if (hits[lfsr])                     // Have we hit this value before?
                    {                                   // Yes.
                        if ((lfsr=polyStart)            // KSeq, large MSeq, or small MSeq?
                            && ((i=(Nsqrt-2)) || (i=(N-2))))
                        {
                            for (polyStart--; (polyStart>0)&&(hits[polyStart]); polyStart--)
                                ;                       // Yes; find next unused LFSR seed,
                            hits[lfsr=polyStart] = TRUE; // and keep looking for next sub-cycles.
                            i = -1;                     // /
                            continue;                   // /
                        }
                        break;                          // No; definitely not an acceptable poly.
                    }
                    hits[lfsr] = TRUE;                  // No; knock this state off the list.
                }
//*********************************************************************************************/
```

```
// Sieve 2; Make sure all K LFSR states are used.
//*****************************************************************************/
            if ((polyStart != 0) || (i != 0))         // Did it go thru all LFSR states?
            {
                continue;                              // No; get more MSeq's and try again!
            }
//*****************************************************************************/
// Sieve 3: Perform Autocorrelation on latest sequence and check if any sidelobe is greater than
// Max_Allowed.
//*****************************************************************************/
            for (i=0; i<K; i++)
            {
                hits [i] = FALSE;                      // Start with no hits for any LFSR value.
            }
            for (i=0, hits[lfsr=polyStart=K-1]=TRUE; (i<N-1)&&(lfsr!=0); i++)
            {                                          // Loop thru all states of K-bit LFSR.
                Seq[i] = Seq[i+N-1] = (lfsr & Kdiv2) ?+1:-1;         // Update sequence.
                lfsr = (lfsr<<1) ^ ((lfsr & Kdiv2) ? qRKpoly:0)) & Kmask;  // Update LSRF value.
                if (hits[lfsr])                        // Have we hit this value before?
                {                                      // Yes.
                    if ((lfsr=polyStart)               // Sub-cycle boundary?
                        && ((i=Nsqrt-2)) || (i=(N-2))))
                    {
                        Ncycle = ++i;                  // Yes; Ncycle = (N-1) or (Nsqrt-1).
                        for (i=1; i<Ncycle; i++)       // Loop thru latest sequence, checking
                        {                              // autocorrelation sidelobes (ignoring
                            for (j=ACorr=0; j<Ncycle; j++)  // first value, since it's the peak).
                            {
                                ACorr += Seq[j] * Seq[i+j];
                            }
                            if (abs(ACorr) > Max_Allowed)   // No good, if sidelobes are too big!
                                break;
                        }
                        if (abs(ACorr) > Max_Allowed)
                            break;                     // No good, if sidelobes are too big!
                        for (polyStart--; (polyStart>0)&&(hits[polyStart]); polyStart--)
                            ;                          // Find next unused LFSR seed,
                        hits[lfsr=polyStart] = TRUE;   // & keep looking for next sub-cycles.
                        i = -1;                        // /
                        continue;                      // /
                    }
                    break;                             // No; must be finished with LFSR states.
                }
                hits[lfsr] = TRUE;                     // No; knock this state off the list.
            }
            if ((polyStart != 0) || (i != 0))          // Did it go thru all LFSR states?
            {
                continue;                              // No; get more MSeq's and try again!
            }
//*****************************************************************************/
// Print out verified Small Kasami polynomial.
//*****************************************************************************/
            sprintf(buf0, "KSeq #%%%dd = %%oog/%%oof (%%oog x %%oog) ", Digits[n0]);
            sprintf(buf1, buf0,
                ++kCount,
                qKpoly, Rev(qKpoly, k+1),
                MSeqs_Large[mseq_n], MSeqs_Small[mseq_n0]):
            PrintLine(filename, buf1);
            }
        }
    }
    return 0;
}
//*****************************************************************************/
// Supporting Procedures.
//*****************************************************************************/
// Generate all Maximal Sequences which can be formed using a LFSR of n bits, using a
// Galois formulation of the LFSR.
INT MSeqs_Gen(INT n, UINT32 MSeqs[ ])
{
    INT       i, mCount;
    UINT32    poly, Rpoly, lfsr, N, Ndiv2, Nmask;
    N =       1<<n;
    Ndiv2 =   N>>1;
    Nmask =   N-1;
    for (poly=N+1, mCount=0; poly<2*N; poly+=2)        // Go thru all possible (2 ^ N) - 1 poly's.
    {
        for (i=0; i<N; i++)
        {
```

```
                hits[i] = FALSE;                              // Start with no hits for an LFSR value.
            }
            Rpoly = Rev(poly, n+1);                           // Rpoly = left-shifting-LFSR vers of Galois poly.
            for (i=0; hits[lfsr=N-1]=TRUE; i<N; i++)          // Go thru all possible n-bit LFSR values
            {                                                 // (except 0).
                lfsr = ((lfsr << 1) ^ ((lfsr & Ndiv2) ? Rpoly:0)) & Nmask;   // Update LSFR register value.
                if (hits[lfsr])                               // Potential MSeq, if repeated LFSR value.
                    break;
                hits[lfsr] = TRUE;                            // Else, knock out current LFSR value.
            }
            if (i=(N-2))                                      // Does Potential MSeq repeat after N-1 clocks?
            {
                MSeqs[mCount++] = poly;                       // If Yes, it's an MSeq. Store in MSeqs array.
            }
        }
    }
    MSeqs[mCount] = 0;                                        // Zero last MSeqs poly to indicate end.
    return (mCount);
}
// Perform Galois Field of order 2 Multiplication of 2 binary numbers.
UINT32 Galois_Mult(UINT32 multA, UINT32 multB)
{
    INT         i;
    UINT32      product;
    for (i=product=0; i<32; i++)
    {
        product ^= (multA & 1) ? multB:0;
        multA >>= 1;
        multB <<= 1;
    }
    return (product);
}
// Bit-reverse binary number.
UINT32 Rev(UINT32 data, INT size)
{
    INT         i;
    UINT32      temp;
    for (i=temp=0; i<size; i++, data>>=1)
        temp = (temp<<1) + (data & 1);
    return (temp);
}
// Print out line both to stdout and to "filename", closing file to force an immediate write.
void PrintLine(INT8 *filename, INT8 *string)
{
    FILE        *stream;
    if (*string = 0)
    {
        stream = fopen(filename, "w");      // Flush any existing file by that name.
    }
    else
    {
        stream = fopen(filename, "a");      // Re-open the file,
        fprintf(stream, string);            // add the latest line to it, and
    }                                       // /
    fclose(stream);                         // close the file to force file-writing.
    printf(string);                         // Send the string to stdout, as well.
}
//***************************************************************************************/
// FILE:          LKSeq_Gen.c
// AUTHORS:       Bob Fleming, Cherie Kushner
// DATE:          1 May 2000
// DESCRIPTION:   Generate all Large Kasami (and Large Kasami-like) Polynomials, both (2 mod 4) and
//                (0 mod 4), which can be formed with a 25-bit LFSR.
//***************************************************************************************/
#include <stdio.h>
#include <string.h>
#include <stdlib.h>
//==========================
#define INT8        char
#define UINT8       unsigned char
#define INT16       short
#define UINT16      unsigned short
#define INT32       long
#define UINT32      unsigned long
#define INT         int
#define UINT        unsigned int
#define TRUE        1
#define FALSE       0
#define min(a,b)    (((a)<(b)) ? (a):(b))
#define max(a,b)    (((a)>(b)) ? (a):(b))
```

-continued

```
#define abs(a)          (((a)<0) ? (-a):(a))
//============================
#define FNAME         "LargeKasamiCodes.txt"
#define nmax          10                          // Size of largest MSeq
#define NMAX          (1<<(nmax))                 // 'N' for largest MSeq
#define KMAX          (1<<(2*nmax+(nmax/2)))      // 'N' for largest Large KSeq (=K)
INT8    hits [KMAX];                              // Tally of 'used' LFSR register states.
INT8    Seq [NMAX*2];                             // Twice-repeated Kasami code seq. values, for Autocorrelation.
UINT32  ACorrs [NMAX+1];                          // Count of abs(Autocorrelation value) within a polynomial.
UINT32  MSeqs_Small [NMAX/4];                     // Storage for Small Maximal Sequence progenitor polynomials.
        MSeqs_Large[NMAX/4];                      // Storage for Large Maximal Sequence progenitor polynominals.
        LKSeqs     [NMAX/4];                      // Storage for successful Large Kasami polynomials.
INT8    Digits[(nmax/2)+1] = {0, 1, 1, 2, 2, 3};
// Supporting Procedure functional prototypes
INT     MSeqs_Gen(INT, UINT32(*));                // Generate all Maximal Sequences for given n.
UINT32  Galois_Mult(UINT32, UINT32);              // Perform GF(2) Multiplication of 2 binary numbers.
UINT32  Rev(UINT32, INT);                         // Bit-reverse binary number.
void    PrintLine(INT8*, INT8*);                  // Print a line to StdOut and to named file.
/******************/
/** Main Program **/
/******************/
main(int argc, char *argv[ ], char *envp[ ])
{
    INT     i, j, n0, n, k;
    INT     Small, Large, mseq_n0, mseq_n1;
    UINT32  N, Nmask, Nsqrt;
    UINT32  K, Kmask, Kdiv2;
    UINT32  lfsr, qKpoly, qRKpoly, polyStart, Ncycle;
    UINT32  N1cycles, notN1cycles, N1cycleStates, notN1cycleStates, N1threshold, notN1threshold;
    UINT32  numACorrs, ACorrSamples;
    UINT32  XSeqs_Large;
    INT     kCount, ACorr, Max_Allowed, BelowCount, AboveCount, localMax;
    INT8    XSeq_is_MSeq;
    INT8    filename[256], buf0[256], buf1[256];
    if (argc > 1)                                 // Setup "filename" to command line argument
        strcpy(filename, argv[1]);                // if there is one; or
    else                                          // to FNAME if no command argument.
        strcpy(filename, FNAME);                  // /
    PrintLine(filename, " ");                     // Flush any existing file by that name.
    for (n0=1; n0<=(nmax/2); n0++)                // Go thru all possible Large Kasami polynomials
    {                                             // that fit in a LFSR register of (5/2)*nmax bits.
        n     = 2*n0;                             // Initialize size paramters, all derived from n0.
        N     = 1<<n;                             //          /
        Nsqrt = 1<<n0;                            //          /
        Nmask = N-1;                              //          /
        k     = 2*n + n0;                         //      /
        K     = 1<<k;                             //     /
        Kdiv2 = K>>1;                             //   /
        Kmask = K-1;                              // /
        kCount = 0;                               // Count of acceptable Large Kasami sequences.
        N1threshold = (15*K)/16;                  // Initialize "good enough to work" threshold.
        notN1threshold = K - N1threshold;         // Initialize "poor enough to not work" threshold.
        ACorrSamples = N;                         // Do ~(1/Nsqrt) times max #ACorrs = ~K/(N-1)/sqrt(N).
        Small = MSeqs_Gen(n0, &MSeqs_Small[0]);   // Generate all n-bit Small MSeqs.
        Large = MSeqs_Gen(n, &MSeqs_Large[0]);    // Generate all 2n-bit Large MSeqs.
        Max_Allowed = 2*(1<<n0) + 1;              // Maximum sidelobe allowed for Large Kasami codes.
        sprintf(buf1, " %d-bit Large Kasami Sequences (%d x %d x %d):  ", k, n, n, n0);
        PrintLine(filename, buf1);
        for (XSeqs_Large=N+1; XSeqs_Large<2*N; XSeqs_Large+=2)       // Try all possible odd XSeqs for poly1.
        {
            for (i=0, XSeq_is_MSeq=FALSE; !((MSeqs_Large[i]=0) || XSeq_is_MSeq); i++)
                XSeq_is_MSeq = (XSeqs_Large = MSeqs_Large[i]);       // Set flag if XSeqs_Large is an MSeq.
            for (mseq_n1<Large; mseq_n1++)                           // Go thru all large MSeqs for 2nd poly.
            {
                if ((MSEqs_Large]mseq_n1] <= XSeqs_Large) && XSeq_is_MSeq)  // Remove redundant qKpoly's
                    continue;                                               // as soon as possible.
                printf("%o %o[r]", XSeqs_Large,MSeqs_Large[mseq_n1]);       // Print progress info to screen.
                for (mseq_n0=0; mseq_n0<Small; mseq_n0++)                   // Go thru all small MSeqs for 3rd poly.
                {
                    qKpoly = Galois_Mult(MSeqs_Small[mseq_n0],      // qKpoly is potential
                             MSeqs_Large[mseq_n1]);                 // Large Kasami
                    qKpoly = Galois_Mult(MSeqs_Large, qKpoly);      // polynomial.
//*************************************************************************************/
// Sieve 1: Go thru sub-cycles of qKpoly-generated LFSR, looking for all (N-1)-length sequences.
// If 15/16 or more of the LFSR states are part of (N-1)-length sequences, then continue.
// If less than 1/16 belong to (N-1)-length sequences, then loop to try next potential poly.
//*************************************************************************************/
                    for (i=0; i<K; i++)
                    {
```

-continued

```
            hits [i] = FALSE;                      // Start w/ no hits for any LFSR value.
    }
    N1cycles = notN1cycles = N1cycleStates = notN1cycleStates = 0;
    qRKpoly = Rev(qKpoly, k+1);                    // qRKpoly = left-shifting-LFSR vers of Galois poly.
    for (i+0, hits[lfsr=polyStart=K-1]=TRUE; (i<K)&&(lfsr!=0); i++)
    {                                              // Loop thru all states of K-bit LFSR
        lfsr = ((lfsr<<1) ^ ((lfsr & Kdiv2) ? qRKpoly:0)) & Kmask;   // Update LSFR val.
        if ((lfsr=polyStart) || (hits[lfsr]))      // Are we at a sub-cycle boundary, or
        {                                          // have we hit this value before?
            Ncycle = ++1;                          // Yes; increment sub-cycle count.
            if (Ncycle = N-1)                      // Tally up number of sub-cycles of
            {                                      // (N-1) or anything else, as well
                ++N1cycles;                        // as how many LFSR-states are taken
                N1cycleStates += N-1;              // up by those subcycles.
            }                                      //       /
            else                                   //      /
            {                                      //     /
                ++notN1cycles;                     //    /
                notN1cycleStates += Ncycle;        //   /
            }                                      // /
            if (( N1cycleStates >= N1threshold) || // Take an early-out if a decision
                (notN1cycleStates >= notN1threshold)) ^ // can be made now . . .
                break;
            for (polyStart--; (polyStart>0)&&(hits[polyStart]); polyStart--)
                ;                                  // find next unused LFSR seed,
            hits[lfsr=polyStart] = TRUE;           // and keep looking for next
            i = -1;                                // sub-cycles.
            continue;                              // /
        }
        hits[lfsr] = TRUE;                         // No; knock this state off the list.
    }
    if (N1cycleStates < N1threshold)               // If 15/16 states weren't involved in
        continue;                                  // N-1 sub-cycles, try another poly.
//*********************************************************************************************/
// Sieve 2: Perform Autocorrelation on latest sequence and check if any sidelobe is greater than
Max_Allowed.
//*********************************************************************************************/
    for (i=0; i<K; i++)
    {
        hits [i] = FALSE;                          // Start w/ no hits for any LFSR value.
    }
    for (i=0, (i<=N; i++)
        ACorrs[i] = 0;                             // Start w/NCorrs counts all 0.
    }
    for (i=numACorrs=0, hits[lfsr=polyStart=K-1]=TRUE; (i<K)&&(lfsr!=0); i++)
    {                                              // Loop thru all states of K-bit LFSR.
        Seq[i] = (lfsr & Kdiv2) ?+1:-1;            // Update sequence.
        lfsr = ((lfsr<<1) ^ ((lfsr & Kdiv2) ? qRKpoly:0)) & Kmask;   // Update LSRF val.
        if ((lfsr=polyStart) || (hits[lfsr])       // Are we at a sub-cycle boundary, or
        {                                          // have we hit this value before?
            Ncycle = ++i;                          // Yes; Ncycle = (N-1), (Nsqrt- 1). . .
            for (i=0; i<Ncycle; i++)               // Dup sequence for cyclic
                Seq[i+Ncycle] = Seq[i];            // autocorrelation (modulo Ncycle).
            for (i=1, localMax=0; i<Ncycle; i++)   // Loop thru the latest sequence,
            {                                      // checking the autocorrelation
                for (j=ACorr=0; j<Ncycle; j++)     // sidelobes (ignoring the first
                {                                  // Value, since it's the peak).
                    ACorr += Seq[j] * Seq[i+j];    //       /
                }
                local Max = max(abs(ACorr),localMax);  //     /
            }
            ++ACorrs[min(localMax, N)];            // Incr. the abs(ACorr-value) count.
            if (++numACorrs > ACorrSamples)        // Only do a fraction of possible
                break;                             // ACorrs (to speed things up). . .
            for (polyStart--; (polyStart>0)&&(hits[polyStart]); polyStart--)
                ;                                  // Find next unused LFSR seed,
            hits[lfsr=polyStart] = TRUE;           // and keep looking for next
            i = -1;                                // subcycles.
            continue;                              //   /
        }
        hits[lfsr] = TRUE;                         // No; knock this state off the list.
    }
    for (i=AboveCount=BelowCount=0; i<=N; i++)     // Tabulate the ACorr sidelobe values
    {                                              // and divide into 2 groups;
        if (i > Max_Allowed)                       // those greater than the Maximum
            AboveCount += ACorrs[i];               // value allowed, and those which
        else                                       // are acceptable for Large Kasami
            BelowCount += ACorrs[i]:               // code sidelobe levels.
```

```
                    }                                     // }
                    if (15*AboveCount > BelowCount)       // If less than 15/16 of the sidelobes
                        continue;                         // are low enough, abort this poly.
//***********************************************************************************************/
// Print out verified Large Kasami polynomial.
//***********************************************************************************************/
                    sprintf(buf0, "KSeq #%%%dd = %%oog/%%oof (%%oog x %%oog x %%oog)%%s ", Digits[n0]);
                    sprintf(buf1, buf0,
                        ++kCount,
                        qKpoly, Rev(qKpoly, k+1),
                        XSeqs_Large,
                        MSeqs_Large[mseq_n1],
                        MSeqs_Small[mseq_n0],
                        XSeq_is_MSeq? "*":" ");
                    PrintLine(filename, buf1);
                }
            }
        }
    }
    return 0;
}
//***********************************************************************************************/
// Supporting Procedures.
//***********************************************************************************************/
// Generate all Maximal Sequences which can be formed using a LFSR of n bits, using a
// Galois formulation of the LFSR.
INT MSeqs_Gen(INT n, UINT32 MSeqs[ ])
{
    INT         i, mCount;
    UINT32      poly, Rpoly, lfsr, N, Ndiv2, Nmask;
    N =         1<<n;
    Ndiv2 =     N>>1;
    Nmask =     N-1;
    for (poly=N+1, mCount=0; poly<2*N; poly+=2)           // Go thru all possible (2 ^ N) - 1 poly's.
    {
        for (i=0; i<N; i++)
        {
            hits[i] = FALSE;                              // Start with no hits for an LFSR value.
        }
        Rpoly = Rev(poly, n+1);                           // Rpoly = left-shifting-LFSR vers of Galois poly.
        for (i=0; hits[lfsr=N-1]=TRUE; i<N; i++)          // Go thru all possible n-bit LFSR values
        {                                                 // (except 0).
            lfsr = ((lfsr << 1) ^ ((lfsr & Ndiv2) ? Rpoly:0)) & Nmask;   // Update LSFR register value.
            if (hits[lfsr])
                break;                                    // Potential MSeq, if repeated LFSR value.
            hits[lfsr] = TRUE;                            // Else, knock out current LFSR value.
        }
        if (i=(N-2))                                      // Does Potential MSeq repeat after N-1 clocks?
        {
            MSeqs[mCount++] = poly;                       // If Yes, it's an MSeq. Store in MSeqs array.
        }
    }
    MSeqs[mCount] = 0;                                    // Zero last MSeqs poly to indicate end.
    return (mCount);
}
// Perform Galois Field of order 2 Multiplication of 2 binary numbers.
UINT32 Galois_Mult(UINT32 multA, UINT32 multB)
{
    INT         i;
    UINT32      product;
    for (i=product=0; i<32; i++)
    {
        product ^= (multA & 1) ? multB:0;
        multA >>= 1;
        multB <<= 1;
    }
    return (product);
}
// Bit-reverse binary number.
UINT32 Rev(UINT32 data, INT size)
{
    INT         i;
    UINT32      temp;
    for (i=temp=0; i<size; i++, data>>=1)
        temp = (temp<<1) + (data & 1);
    return (temp);
}
// Print out line both to stdout and to "filename", closing file to force an immediate write.
void PrintLine(INT8 *filename, INT8 *string)
```

```
{
    FILE     *stream;
    if (*string = 0)
    {
        stream = fopen(filename, "w");      // Flush any existing file by that name.
    }
    else
    {
        stream = fopen(filename, "a");      // Re-open the file,
        fprintf(stream, string);            // add the latest line to it, and
    }                                       // /
    fclose(stream);                         // close the file to force file-writing.
    printf(string);                         // Send the string to stdout, as well.
}
```

What is claimed is:

1. A method for signal acquisition between a first spread spectrum transceiver and a second spread spectrum transceiver, comprising the steps of:

transmission by said first spread spectrum transceiver of a beacon signal which includes beacon packets each having a beacon packet length, said beacon packets being transmitted at regularly spaced beacon transmission times, each of said beacon transmission times being separated by a beacon cycle interval, said beacon packet length being shorter than said beacon cycle interval so that there is a period of nontransmission between each of said beacon packets, each of said beacon packets having an acyclic auto-correlation function with sidelobes having sidelobe values that are not small relative to a peak value of said acyclic auto-correlation function, said sidelobes having a structure which allows a sampling of a number of said sidelobe values to be used to provide an estimate of a location of said peak value of said acyclic auto-correlation function;

initial-stage reception by said second spread spectrum transceiver over an initial-stage reception window which begins at an initial-stage reception time which is a first integer multiple of said beacon cycle interval augmented in a first direction by a first fraction of twice said beacon packet length later than a previous initial-stage reception time of said second spread spectrum transceiver if initial-stage test values from a previous execution of said initial-stage reception are less than a cut-off value, said initial-stage reception being performed by calculation of correlations between time delayed versions of said beacon packet and a received signal to produce said initial-stage test values;

first intermediate-stage reception by said second spread spectrum transceiver over a first intermediate-stage reception window which begins at a first intermediate-stage reception time which is a second integer multiple of said beacon cycle interval augmented in a second direction by a second fraction of twice said beacon packet length later than said previous initial-stage reception time of said second spread spectrum transceiver if any of said initial-stage test values from said previous execution of said initial-stage reception are greater than said cut-off value, said first intermediate-stage reception being performed by calculation of correlations between said time delayed versions of said beacon packet and said received signal to produce first intermediate-stage reception values;

second intermediate-stage reception by said second spread spectrum transceiver if all said first intermediate-stage reception values from said first intermediate-stage reception are less than said cut-off value, second intermediate-stage reception being performed over a second intermediate-stage reception window which begins at a second intermediate-stage reception time which is a third integer multiple of said beacon cycle interval augmented in a third direction, opposite said second direction, by said second fraction of twice said beacon packet length later than said first intermediate-stage reception time of said second spread spectrum transceiver, said second intermediate-stage reception being performed by said calculation of said correlations between said time delayed versions of said beacon packet and said received signal to produce second intermediate-stage reception values, some of said second intermediate-stage reception values being greater than said cut-off value; and determination of a location of a maximum value of a beacon packet isolated-sequence autocorrelation using said initial-stage test values which are greater than said cut-off value, using said first intermediate-stage reception values if some of said first intermediate-stage reception values are greater than said cut-off value, and using said second intermediate-stage reception values if some of said second intermediate-stage reception values are greater than said cut-off value.

2. The method of claim 1 wherein each of said beacon packets includes consecutive repeated beacon segments each having a segment length, said beacon segments having a beacon segment cyclic autocorrelation function with sidelobes which are substantially smaller than a maximum value of said beacon segment cyclic autocorrelation function, so that said beacon packet acyclic autocorrelation function includes a series of peaks which are separated by said segment length and decrease linearly in magnitude with distance from said maximum value of said beacon packet acyclic autocorrelation function.

3. The method of claim 2 wherein an initial portion of an initial one of said beacon segments in said time delayed versions of said beacon packet is omitted to produce a truncated , beacon packet, such that off-peak values of an acyclic correlation between a complete one of said beacon segments and said truncated beacon packet are reduced.

4. The method of claim 2 wherein a final portion of a final one of said beacon segments in said time delayed versions of said beacon packet is omitted to produce a truncated beacon packet, such that off-peak values of an acyclic correlation between a complete one of said beacon segments and said truncated beacon packet are reduced.

5. The method of claim 2 wherein a final portion of one of said beacon segments is appended to a beginning of an initial one of said beacon segments in said time delayed versions of said beacon packet to produce an extended beacon packet, such that off-peak values of an acyclic correlation between a complete one of said beacon segments and said extended beacon packet are reduced.

6. The method of claim 2 wherein a initial portion of one of said beacon segments is appended to an end of a final one of said beacon segments in said time delayed versions of said beacon packet to produce an extended beacon packet, such that off-peak values of an acyclic correlation between a complete one of said beacon segments and said extended beacon packet are reduced.

7. The method of claim 2, 3, 4, 5 or 6 wherein a phase of said beacon segments is selected such that off-peak values of a beacon segment acyclic autocorrelation function are reduced.

8. The method of claim 2 wherein said code sequences are Small Kasami sequences generated by a product of a degree-(n) polynomial h(x) and a degree-(n/2) polynomial h'(x) whose roots are $(2^{n/2}-1)$th powers of roots of said degree-(n) polynomial h(x), and each of said beacon segments is a maximal sequence generated by said degree-(n/2) polynomial h'(x).

9. The method of claim 1 further comprising the step of:
a third intermediate-stage reception if any of said first intermediate-stage reception values, from said first intermediate-stage reception are greater than said cut-off value, said third intermediate-stage reception being performed by said second spread spectrum transceiver over a third intermediate-stage reception window which begins at a third intermediate-stage reception time which is a fourth integer multiple of said beacon cycle interval augmented in a fourth direction by a third fraction of twice said beacon packet length later than said first intermediate-stage reception time, said third intermediate-stage reception being performed by said calculation of said correlation of said time delayed versions of said beacon packet with said received signal to produce third intermediate-stage reception values, and wherein said determination of said location of said maximum value of said beacon packet acyclic autocorrelation also uses said third intermediate-stage reception values; and
a fourth intermediate-stage reception if all of said first intermediate-stage reception values from said first intermediate-stage reception are less than said cut-off value, said fourth intermediate-stage reception being performed by said second spread spectrum transceiver over a fourth intermediate-stage reception window which begins at a fourth intermediate-stage reception time which is a fifth integer multiple of said beacon cycle interval augmented in a fifth direction by a fourth fraction of twice said beacon packet length later than said first intermediate-stage reception time, said fourth intermediate-stage reception being performed by said calculation of said correlation of said time delayed versions of said beacon packet with said received signal to produce fourth intermediate-stage reception values, and wherein said determination of said location of said maximum value of said beacon packet acyclic autocorrelation also uses said fourth intermediate-stage reception values.

10. The method of claim 9 wherein said third fraction is less than said second fraction, said fourth fraction is less than said second fraction, said fourth direction is opposite said second direction, and said fifth direction is opposite said third direction.

11. The method of claim 1 wherein said initial-stage reception window includes a plurality of initial-stage reception window frames which, modulo said beacon cycle interval, are substantially contiguous, wherein said first intermediate-stage reception window includes a plurality of first intermediate-stage reception window frames which, modulo said beacon cycle interval, are contiguous, and wherein said second intermediate-stage reception window includes a plurality of second intermediate-stage reception window frames which, modulo said beacon cycle interval, are contiguous.

12. The method of claim 1 wherein said beacon packet length is substantially shorter than said beacon cycle interval.

13. The method of claim 12 wherein said beacon packet length is at least ten times shorter than said beacon cycle interval.

14. The method of claim 1 wherein said first and second fractions are less than one and greater than zero.

15. The method of claim 14 wherein said first fraction is greater than said second fraction.

16. The method of claim 1 wherein said first integer multiple is unity, said second integer multiple is unity, and said third integer multiple is unity.

17. The method of claim 1 wherein said sidelobes of said beacon packet acyclic auto-correlation function have values which are roughly of the same magnitude as said peak value of said beacon packet isolated-sequence auto-correlation function.

18. The method of claim 1 wherein said first spread spectrum transceiver and said second spread spectrum transceiver are in the vicinity of a number of additional spread spectrum transceivers which communicate with each other using a class of code sequences which have low cross-correlations and have auto-correlations with small off-peak values.

19. The method of claim 1 wherein said code sequences have a code sequence bit length, and said cross-correlations and said off-peak values of said cyclic auto-correlations have a maximum value which is less than a small multiple of a square root of said code sequence bit length.

20. The method of claim 19 wherein said small multiple is less than 5.

21. The method of claim 19 wherein said small multiple is less than 4.

22. The method of claim 19 wherein said small multiple is less than 3.

23. The method of claim 19 wherein said small multiple is less than 2.

* * * * *